US011245534B2

(12) United States Patent
Brownlee et al.

(10) Patent No.: US 11,245,534 B2
(45) Date of Patent: Feb. 8, 2022

(54) SYSTEM AND METHOD FOR SECURING A RESOURCE

(71) Applicant: NB Research LLC, Bedford, NH (US)

(72) Inventors: Johnathan W. Brownlee, Tucson, AZ (US); Charles Northrup, Bedford, NH (US)

(73) Assignee: NB Research LLC, Bedford, NH (US)

( * ) Notice: Subject to any disclaimer, the term of this patent is extended or adjusted under 35 U.S.C. 154(b) by 232 days.

(21) Appl. No.: 16/268,795

(22) Filed: Feb. 6, 2019

(65) Prior Publication Data

US 2019/0253254 A1 Aug. 15, 2019

Related U.S. Application Data

(60) Provisional application No. 62/626,917, filed on Feb. 6, 2018, provisional application No. 62/636,303, filed on Feb. 28, 2018.

(51) Int. Cl.

| | |
|---|---|
| ***H04L 9/32*** | (2006.01) |
| ***G06K 19/07*** | (2006.01) |
| ***H04L 9/08*** | (2006.01) |
| ***H04L 9/06*** | (2006.01) |

(52) U.S. Cl.

CPC ........ *H04L 9/3242* (2013.01); *G06K 19/0725* (2013.01); *H04L 9/0618* (2013.01); *H04L 9/0869* (2013.01); *H04L 2209/12* (2013.01); *H04L 2209/38* (2013.01)

(58) Field of Classification Search

CPC . H04L 9/3242; H04L 9/0869; H04L 2209/12; G06K 19/0725

See application file for complete search history.

(56) References Cited

U.S. PATENT DOCUMENTS

| | | | |
|---|---|---|---|
| 4,730,259 | A | 3/1988 | Gallant |
| 5,327,515 | A | 7/1994 | Anderson et al. |
| 5,495,548 | A | 2/1996 | Bilodeau et al. |
| 7,092,160 | B2 | 8/2006 | Putnam et al. |

(Continued)

FOREIGN PATENT DOCUMENTS

| | | |
|---|---|---|
| CA | 2891883 | 1/2016 |
| GB | 685286 | 12/1952 |
| WO | 2014107263 | 7/2014 |

OTHER PUBLICATIONS

Berners-Lee, et al.; Network Working Group; Uniform Resource Identifier; Jan. 2005 https://tools.ietf.org/html/rfc3986.

(Continued)

*Primary Examiner* — Ellen Tran

(74) *Attorney, Agent, or Firm* — Sheehan Phinney Bass & Green PA

(57) ABSTRACT

A system and method for securing a resource includes a combination code generator configured to receive a first input sequence and a first panel context and generate a first computed combination code. A second computed combination code is generated from a received second input sequence and a second panel context. A set panels module receives the first computed combination code and the first panel context and re-orders the panels of the first panel context to set the second panel context. a hash key generator converts the received second panel context and the second combination code into a first hash key.

23 Claims, 67 Drawing Sheets

Optical IOT-SIM Card (OI) Not Shown To Scale

(56) References Cited

U.S. PATENT DOCUMENTS

| | | | |
|---|---|---|---|
| 7,433,123 B2 | 10/2008 | Putnam et al. | |
| 8,463,449 B2 | 6/2013 | Sanders | |
| 8,498,052 B2 | 7/2013 | Moon et al. | |
| 9,077,716 B2 | 7/2015 | Myers et al. | |
| 9,280,515 B2 | 3/2016 | Gaede et al. | |
| 9,779,227 B1 * | 10/2017 | Ramos Carneiro | G06F 21/34 |
| 2005/0223032 A1 | 10/2005 | Shan et al. | |
| 2006/0026550 A1 | 2/2006 | Tzu | |
| 2006/0265508 A1 | 11/2006 | Angel et al. | |
| 2007/0255530 A1 | 11/2007 | Wolff | |
| 2009/0201129 A1 | 8/2009 | Lane et al. | |
| 2016/0364553 A1 | 12/2016 | Smith et al. | |
| 2017/0075941 A1 | 3/2017 | Finlow-Bates | |

OTHER PUBLICATIONS

Duerst, et al; Network Working Group; Internationalized Resource Identifiers IRIs; Jan. 2005.

Kogelnik, Bell System Technical Journal vol. 48, Issue 9, pp. 2909-2947, Nov. 1969.

One-step holographic grating inscription in polymers, Proc. SPIE 7233, Practical Holography XXIII: Materials and Applications, 72330M (Feb. 3, 2009).

R. Paschotta, article on 'vertical cavity surface-emitting lasers' in the Encyclopedia of Laser Physics and Technology, 1. edition Oct. 2008, Wiley-VCH, ISBN 978-3-527-40828-3.

Maxim Integrated, Optical Microcontroller DS4830; 2017; http://datasheets.maximintegrated.com/en/ds/DS4830.pdf.

Maxim Integrated, Integrated, Low-Power SFP+ Limting Amplifier and VCSEL Driver, Oct. 2008; https://datasheets.maximintegrated.com/en/ds/MAX3798.pdf.

The Turtle Language is described in RDF 1.1 Turtle, Terse RDF Triple Language, W3C Recommendation Feb. 25, 2014.

Open Group Base Specification Issue 6, IEEE Std 1003.1 2004 Edition.

EPC Tag Data Standard, Version 1.9, Ratified, Nov. 2014.

Mohram et al. : "Rigorous coupled-wave analysis of planargrating diffraction" vol. 71, No. 7 Jul. 1981 J.Opt.Soc.Am.

Bessis et al.; Internet of Things and Inter-Cooperative Computational Technologies for Collective Intelligence, Springer, 2013.

Extended European Search Report dated Nov. 11, 2021 for Application 19751668.5.

Aafaf Ouaddah et al; "FairAccess: a new Blockchain-based access control framework for the Internet of Things: FairAccess: a new access control framework for IoT"; Security and Communication Networks, vol. 9, No. 18; Dec. 1, 2016.

Puthal, Deepak et al; "DLSEF," ACM Transactions on Embedded Computing Systems, ACM, New York vol. 16, No. 2, Dec. 19, 2016.

Lee Sang-Hyun, Shin Kyung-Wook; "An area-efficient Design of SHA-256 Hash Processor for IOT Security"; KJIICE, Jan. 1, 2018 pp. 109-116.

Barker, Elaine; "Recommendation for Random Number Generation Using Deterministic Random Bit Generators NIST SP 800-90 Ar1" NIST, National Institute of Standards and Technology, Jun. 23, 2015 pp. 1-110.

* cited by examiner

FIG. 1A Optical IOT-SIM Card (OI) Not Shown To Scale
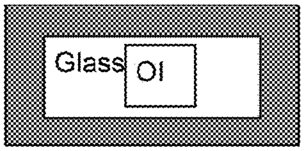
FIG. 1B Optical Reader components with illumination source L-1, Optical Identifier OI, optical receiver R-1, Optical Driver OD, Analog to Digital Converter ADC, Output Port, and, optional Input Port.
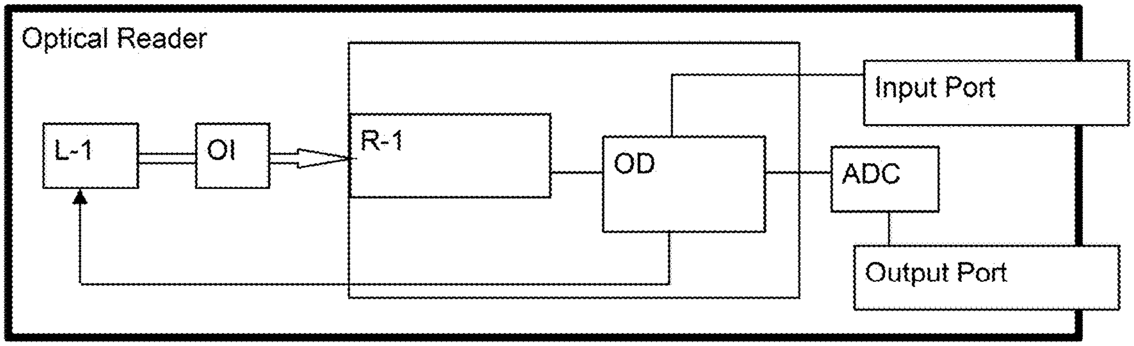
FIG. 1C MAX3798 VECSEL with DS4830 Microcontroller with optional input port.
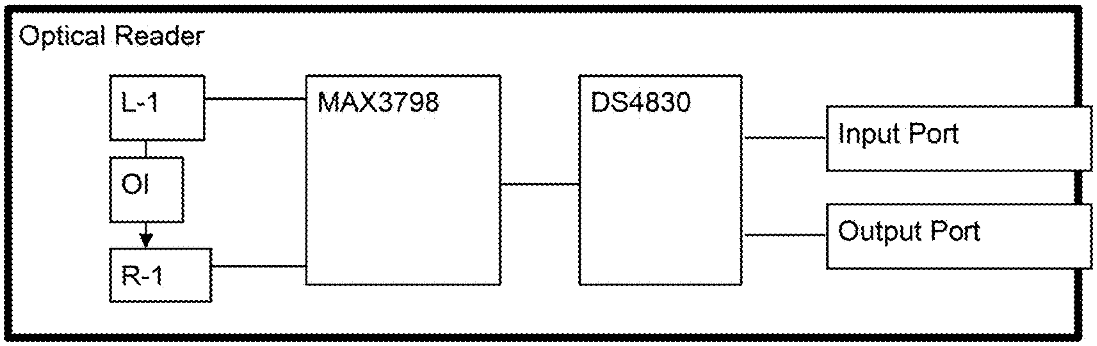

FIG. 1D Optical Identifier inserted into Optical Reader OI-Slot with optional actuator.
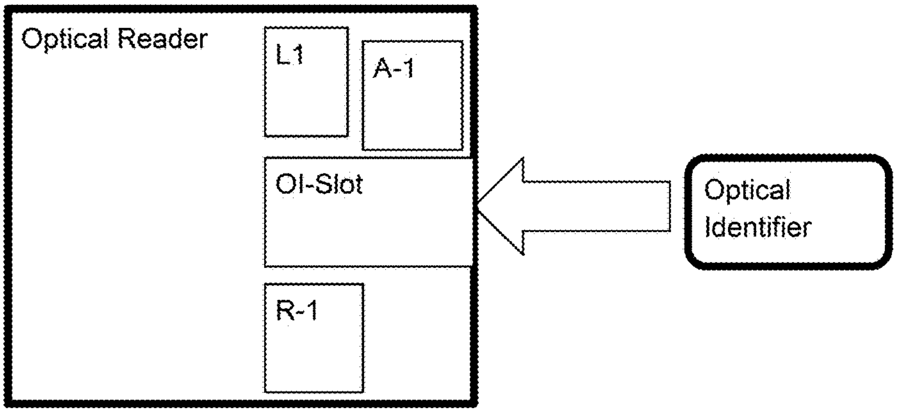
FIG. 1E Bi-directional Optical Identifier card swipe with actuators.
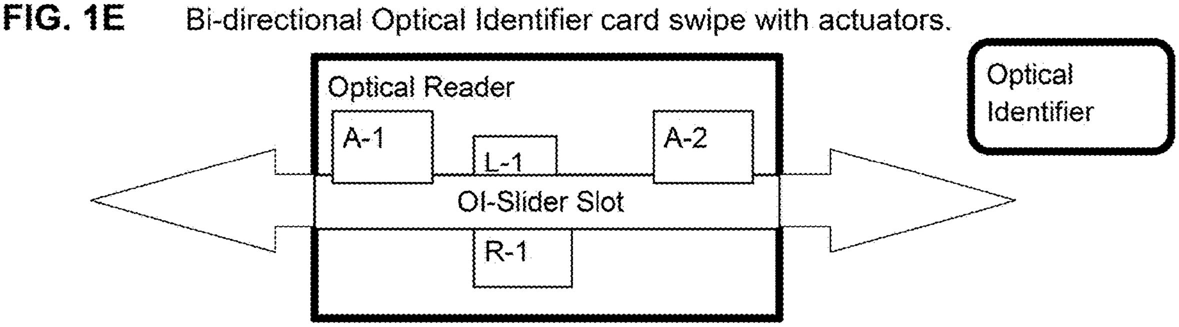
FIG. 1F Reflective Reading of Optical Identifier
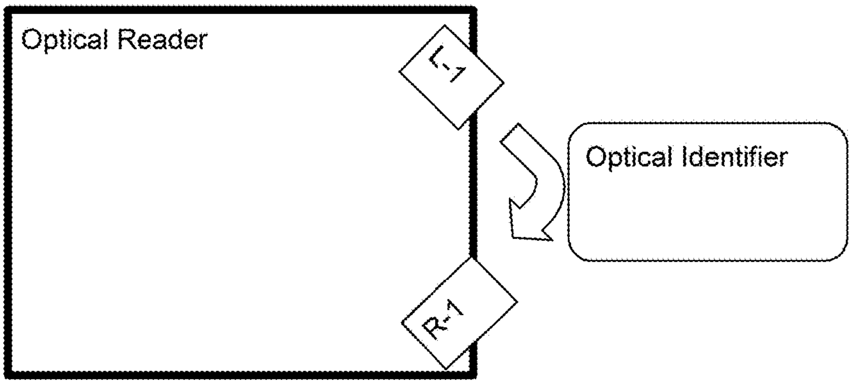

FIG. 1G USB Enabled
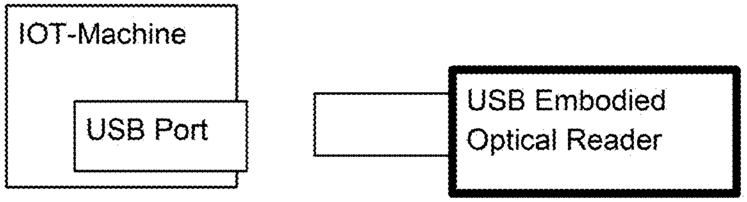
FIG. 1H ADC Data Out to FPGA Interface
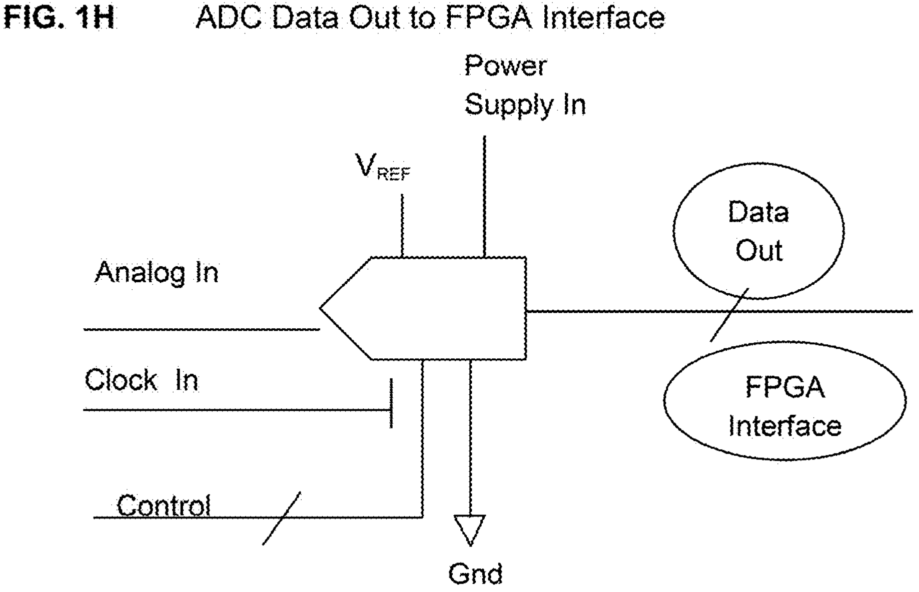
FIG. 1I Communicating with Optical Reader
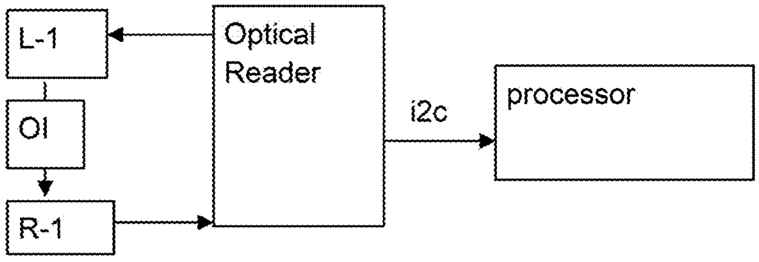

FIG. 2 Memory IOT-Module administers IOT-Things in Non-Volatile Memory
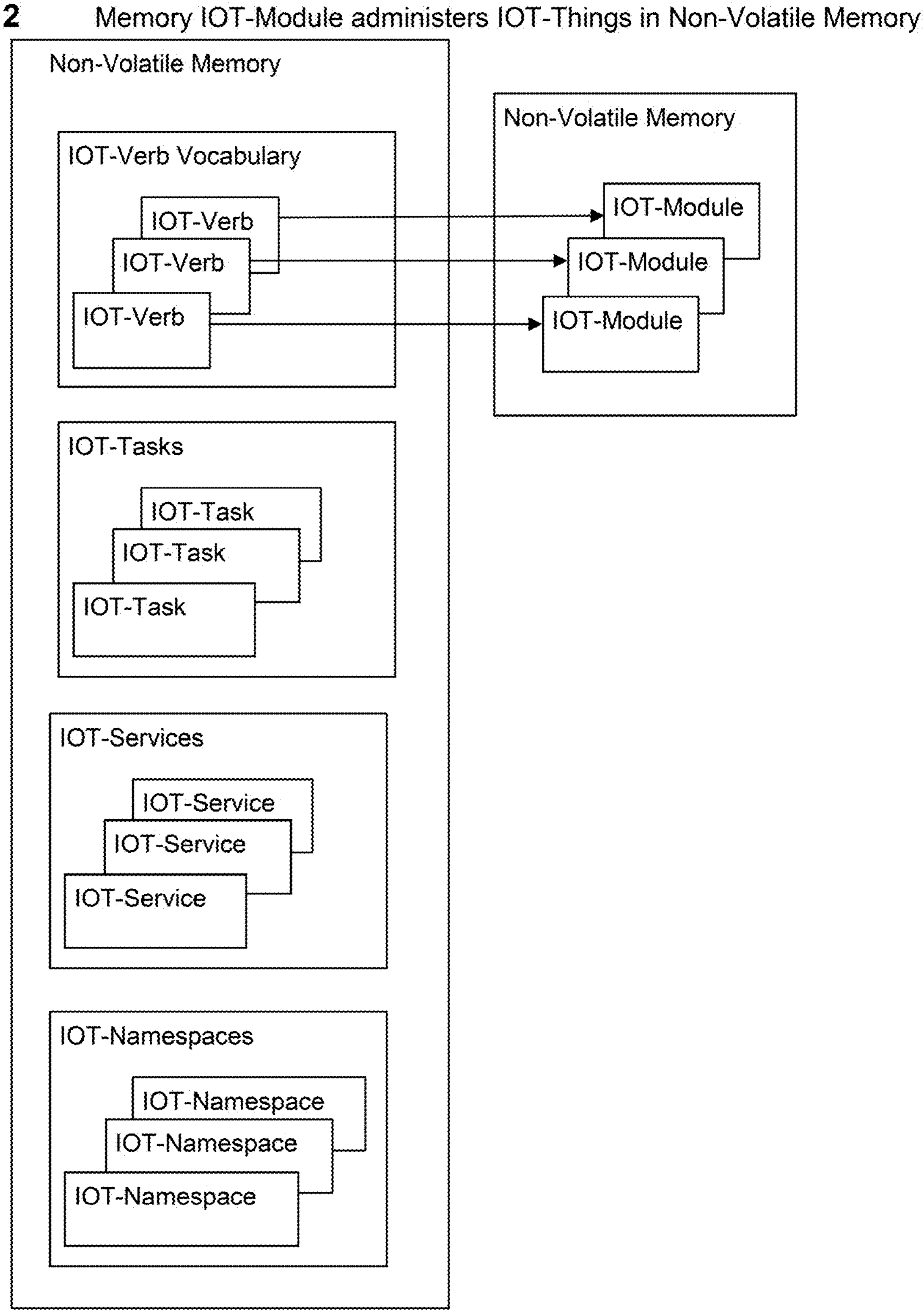

FIG. 3A IOT-Thing
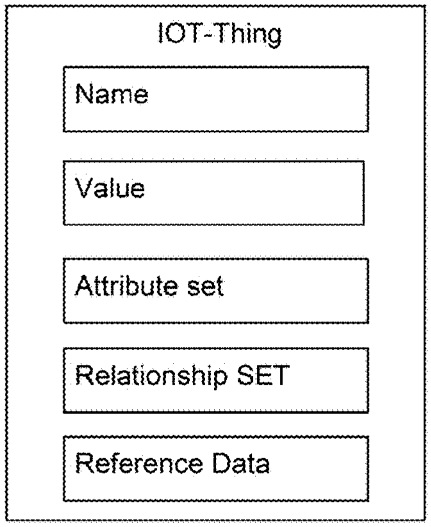
FIG. 3B IOT-Verb with representation of reference to an embodiment that the IOT-Machine processor can perform.
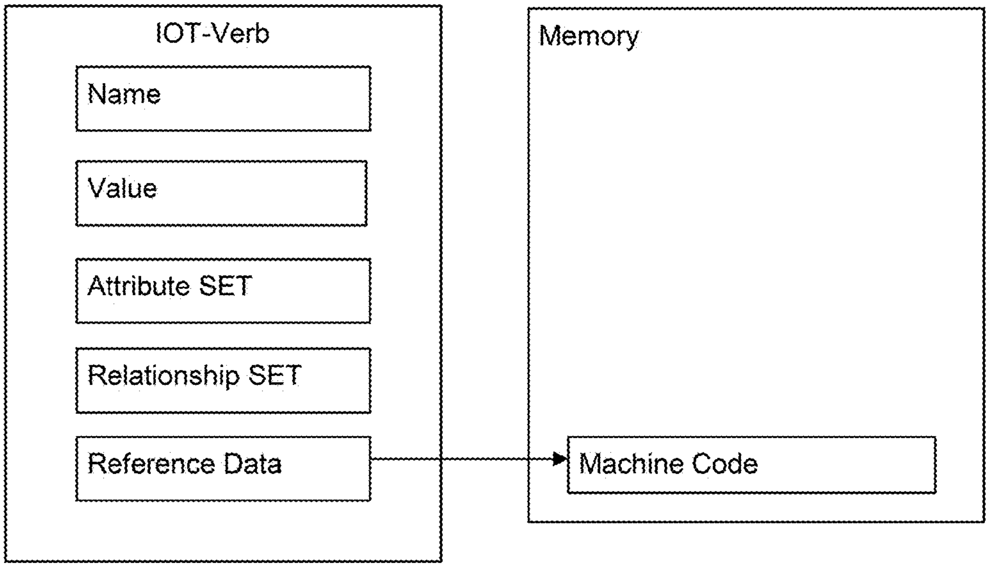

FIG. 3C Verb specification

```
<declare      iot-listing="verb:connect">
<IOT-Artifacts>
              <this   iotType="IOT-Listing"/>
              <that   iotType="IOT-URR"/>
</IOT-Artifacts>
<IOT-Example>
Connect       :       IOT-Listing   to     URR
Connect       :       [to]    URR   as     IOT-Listing
</IOT-Example>
</declare >
```

FIG. 3D Registering IOT-Verbs

```
<configure>
<comment>
The Get.URL task sets the value of response:content to the content returned by the
evaluation of request:url using the w
</comment>
<configure.verbs  dll="stdfile.dll" initialization="comprimInit" />
</configure>
```

FIG. 3E Sample Statement

Connect www.oitnamespaces.com:80 as local: connection

| Connect<br>Type: Verb | www.oitnamespaces.com:80<br>Type: IOT-URR | local:connection<br>Type: IOT-Listing |
|---|---|---|

FIG. 4 IOT-Thing Relationships
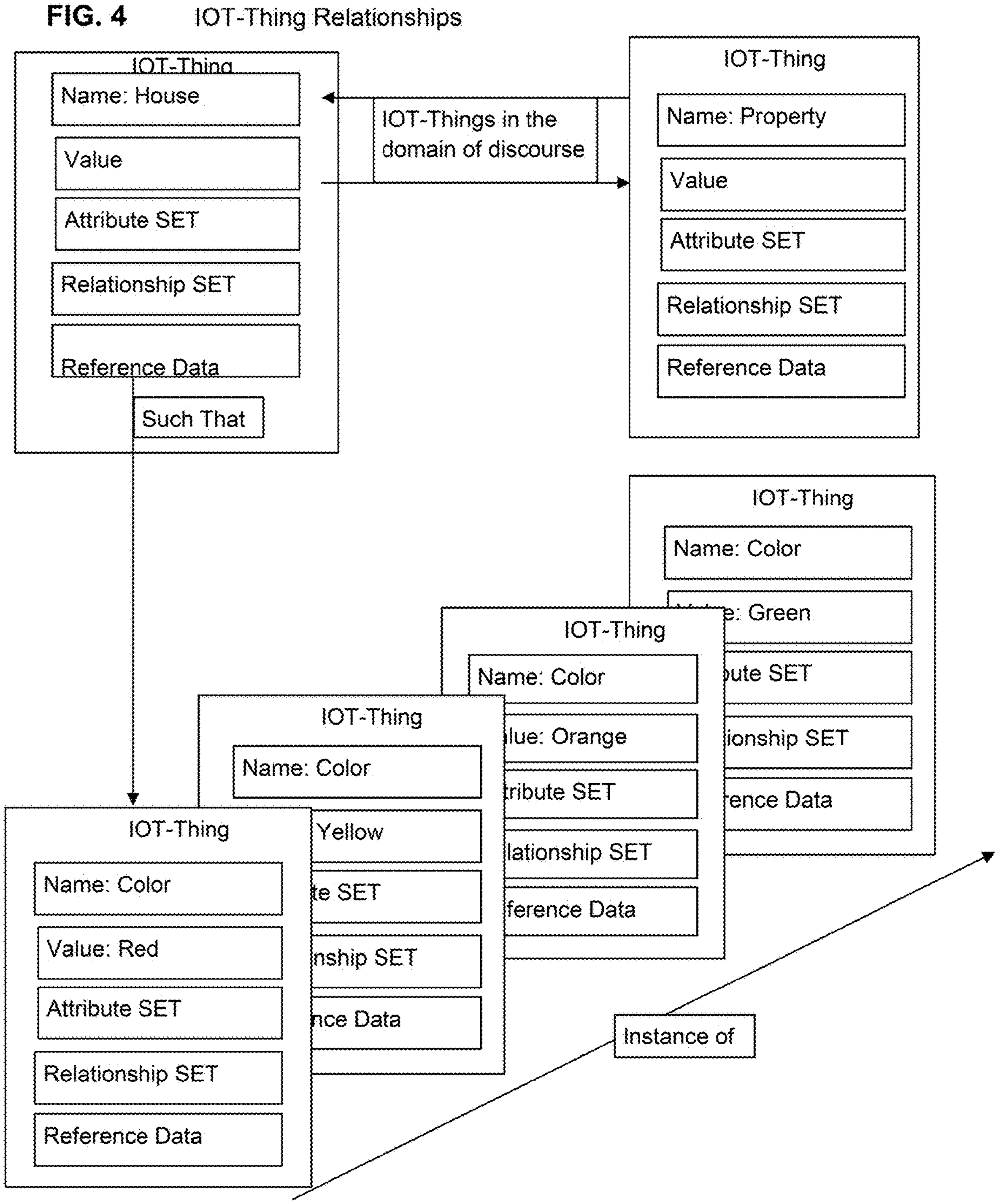

FIG. 5 IOT-Verb Relationships
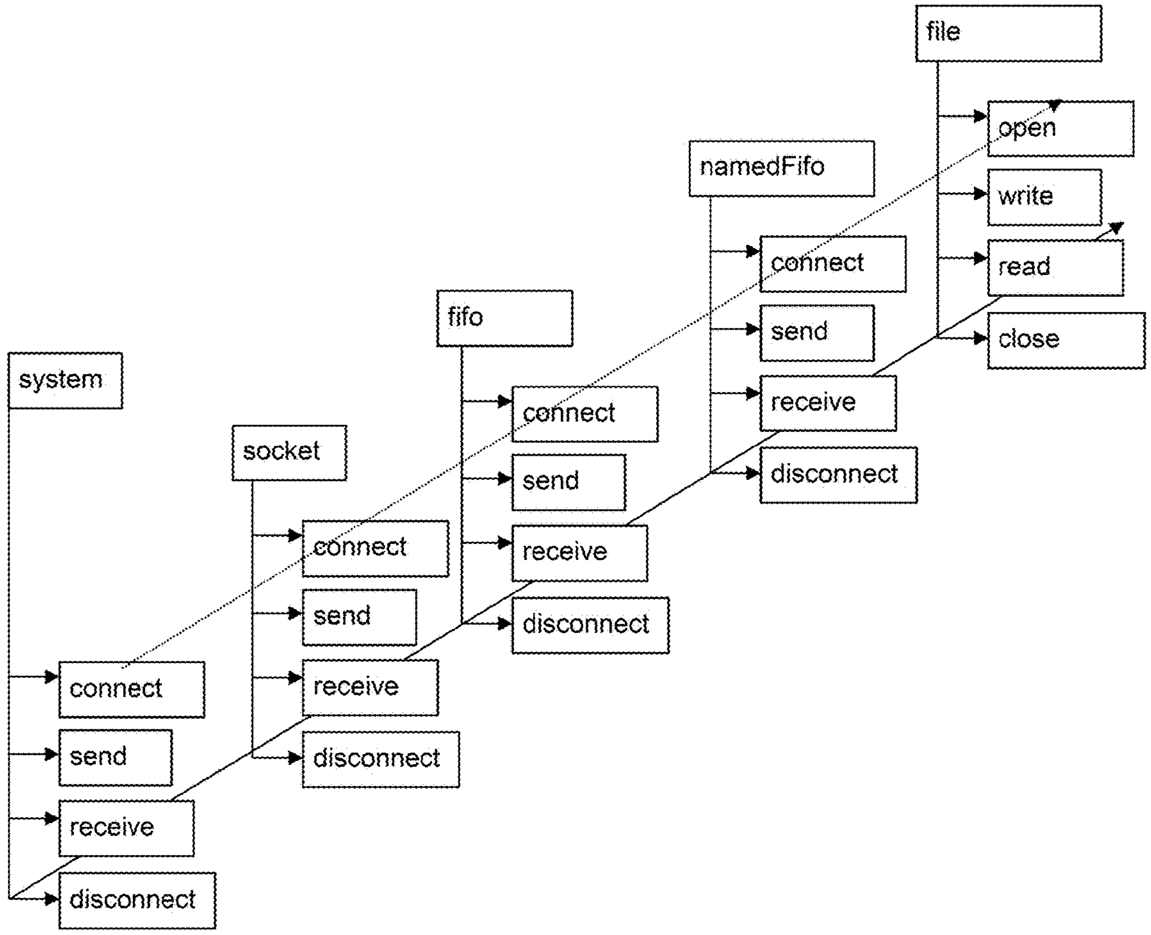

FIG. 6 Core IOT-Verbs
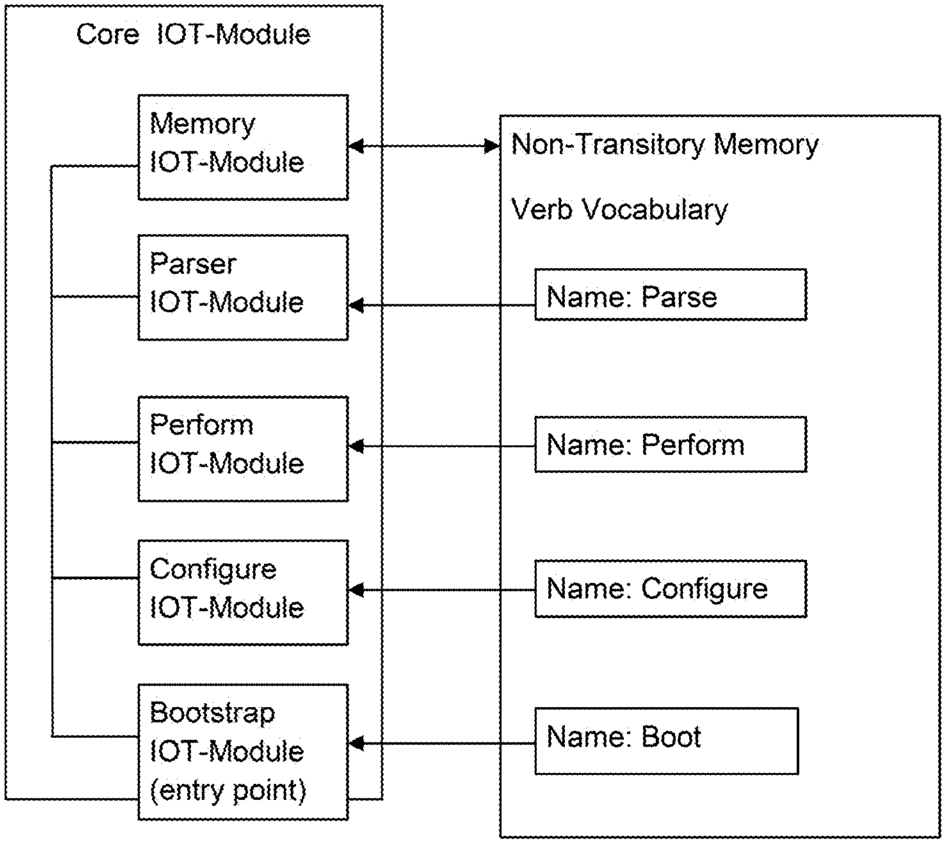

FIG. 7 Perform action interacting with IOT-Statement and causes load.dll embodiment to be performed.
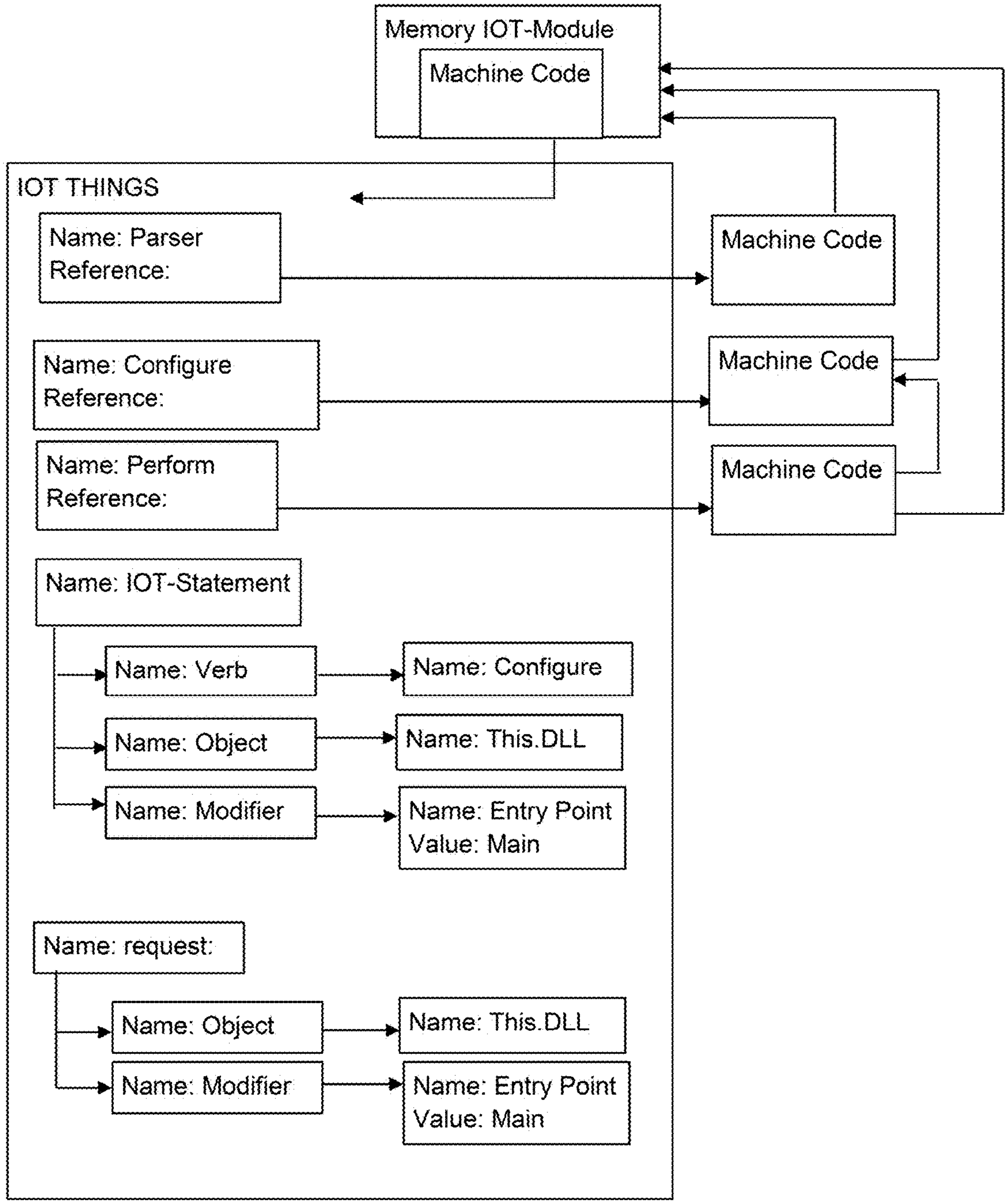

FIG. 8A Shared Library Embodiment Specific Data
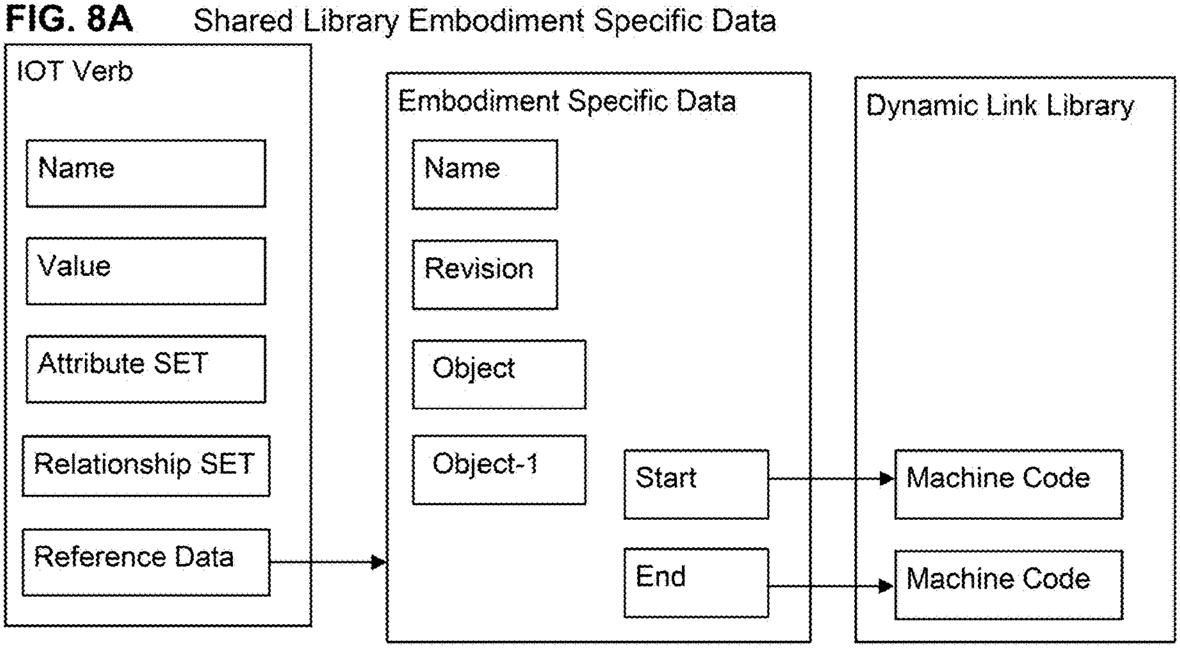
FIG. 8B An IOT-Verb With Modifier
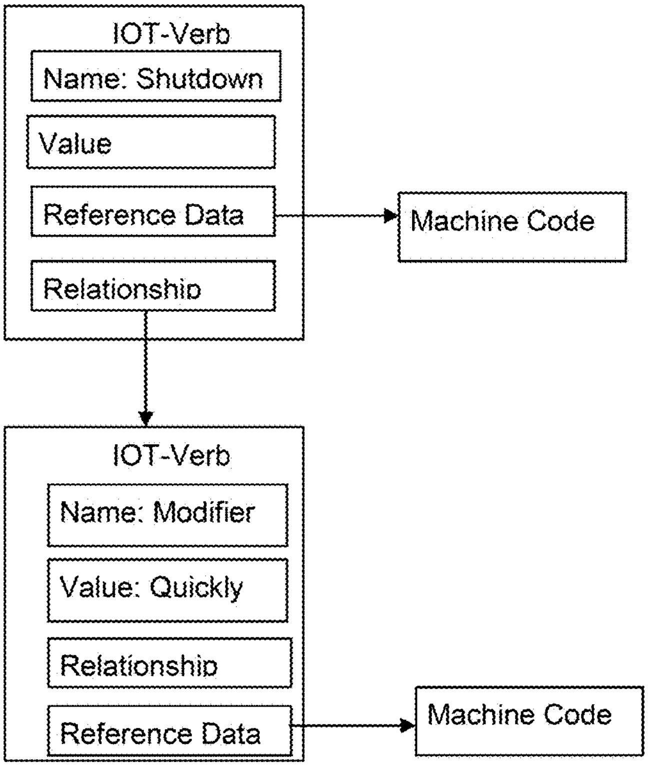

FIG. 9 Embodiment using a communication bus between IOT-Modules.
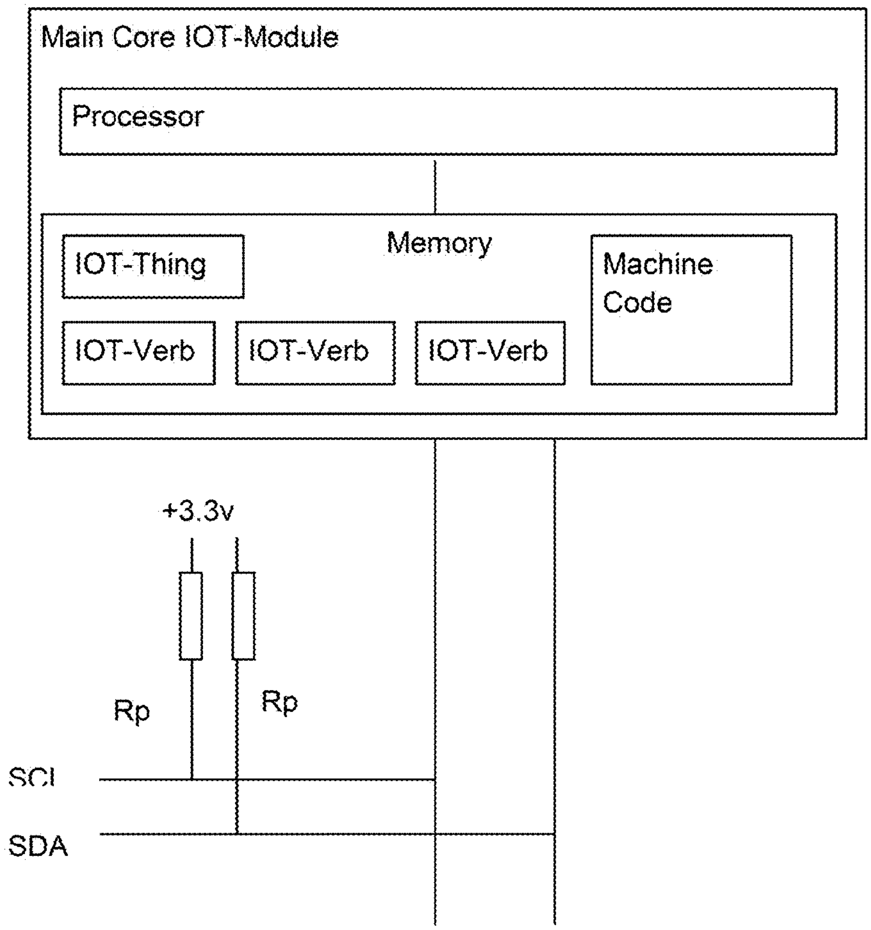

FIG. 10 Get File IOT-Task.
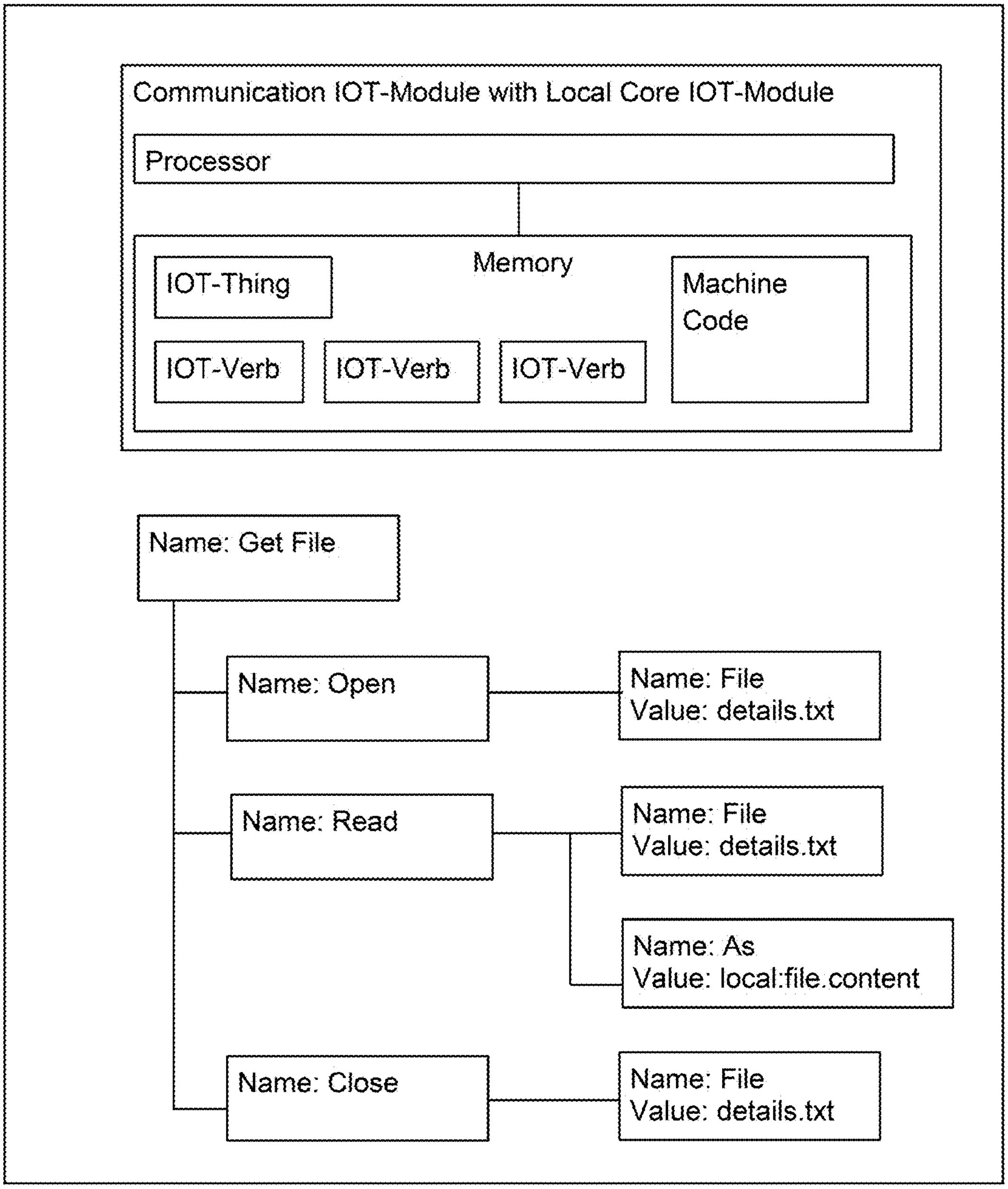

FIG. 11 Email Message Represented as IOT-Things.
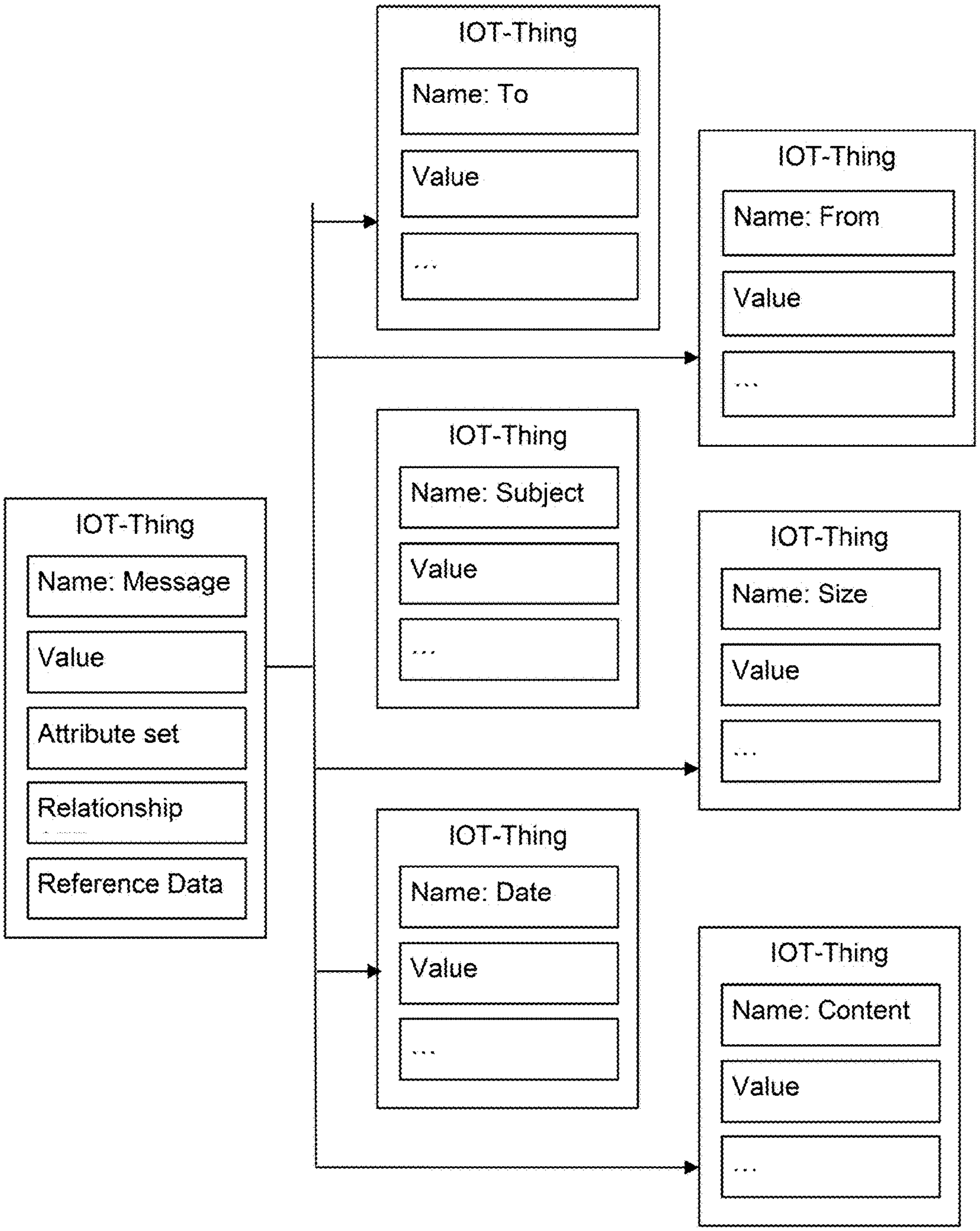

FIG. 12 Get File Configuration Request

```
Configure task Get.File
actionBlock start
        get file type of {request:file.name} as local:file.type
        if {local:file.type} is equal to "text"
        then
                open  {request:file.name} as response:content
                read  response:content
                close response:content
        end
actionBlock end
```

FIG. 13 Registering IOT-Verbs

```
<configure>
<comment>
The Get.URL task sets the value of response:content to the content returned by the
evaluation of request:url
</comment>
<actionBlock>
<configure.verbs  using.URR="verb:load//dll=stdfile.dll&initialization=comprimInit" />
</actionBlock>
</configure>
```

FIG. 14 The IOT-Loader. (boot-1)
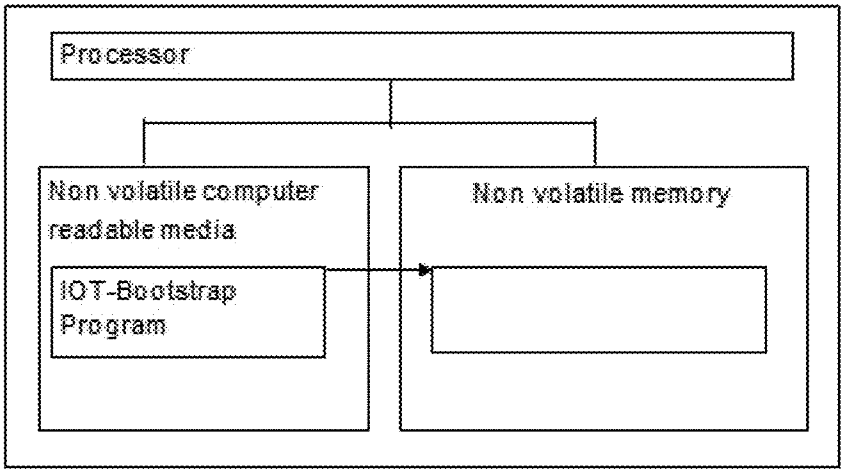
FIG. 15 Initializing IOT-System (boot-2)
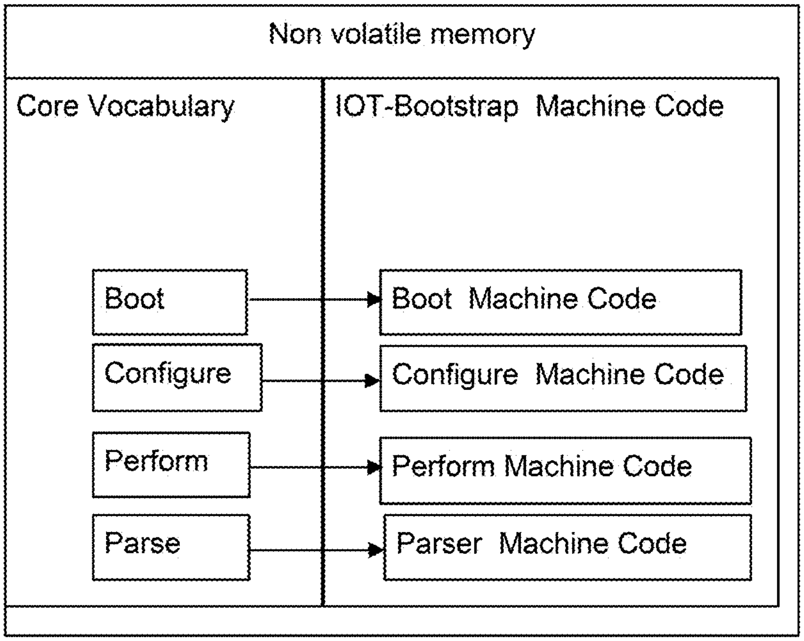

FIG. 19 ExecutiveStart (Boot-6)
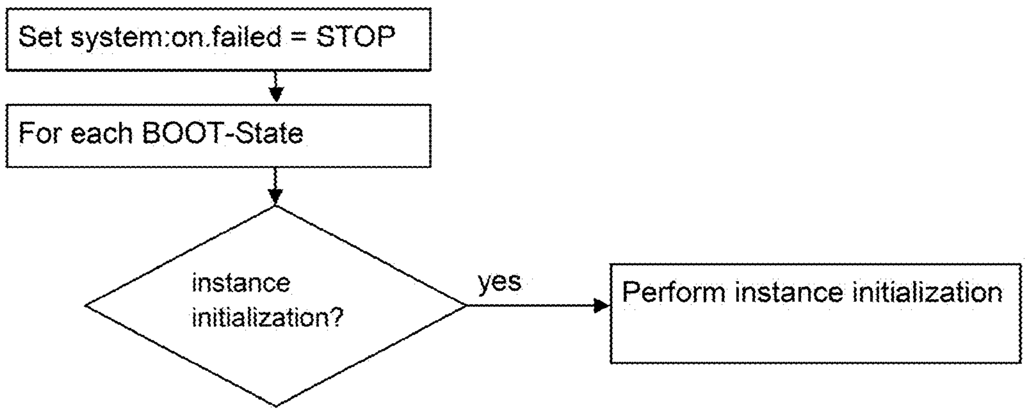
FIG. 20 ExecutiveStop (boot-7)
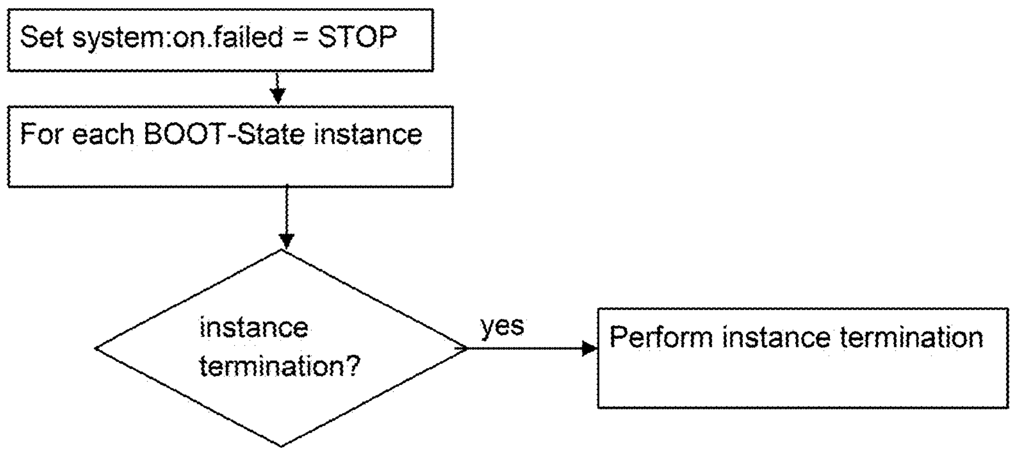

FIG. 21 IOT-System and Optical Reader (boot-8)
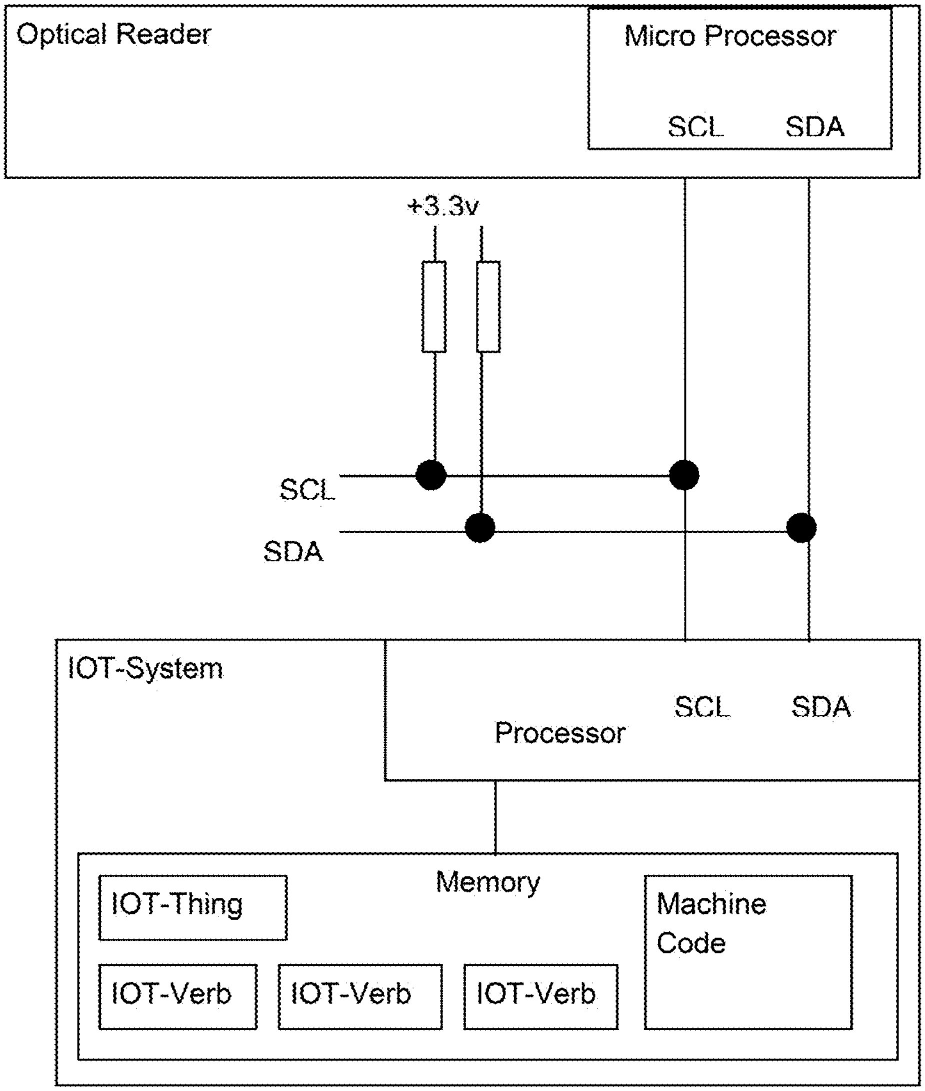

FIG. 22 URI Form of the EPC URI (EPC-1)

urn:epc:id:scheme:component1.component2…etc.

FIG. 23 SGTIN EPC General Syntax. (EPC-2 )

urn:epc:id:sgtin:companyPrefix.ItemRefAndIndicator.SerialNumber

FIG. 24 Exemplary IOT-Thing Relationships (Memory-1)
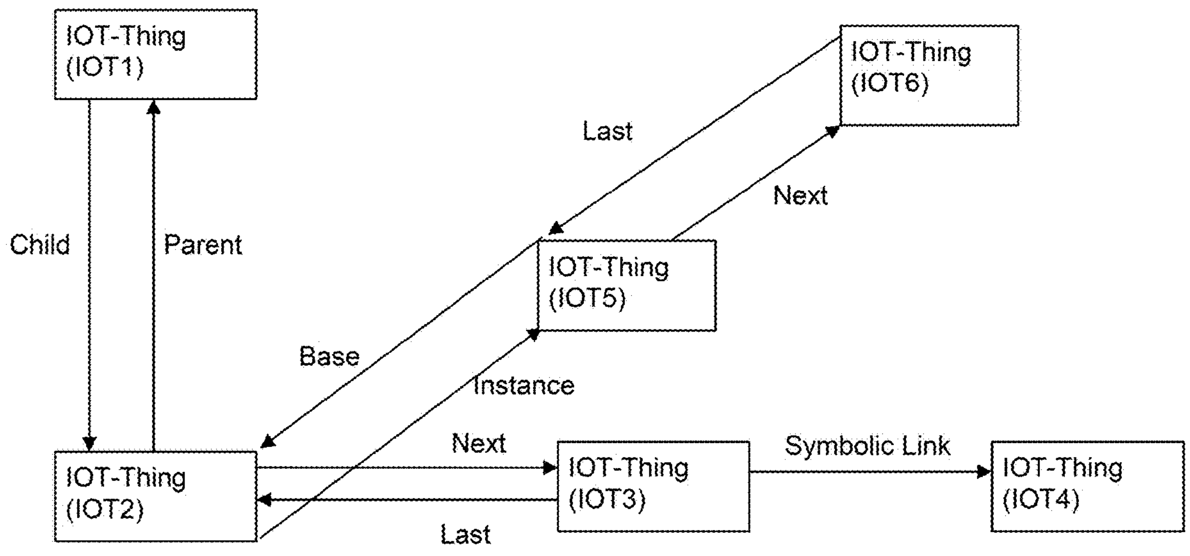

FIG. 25 Verb Vocabulary Context (NSPI-1)
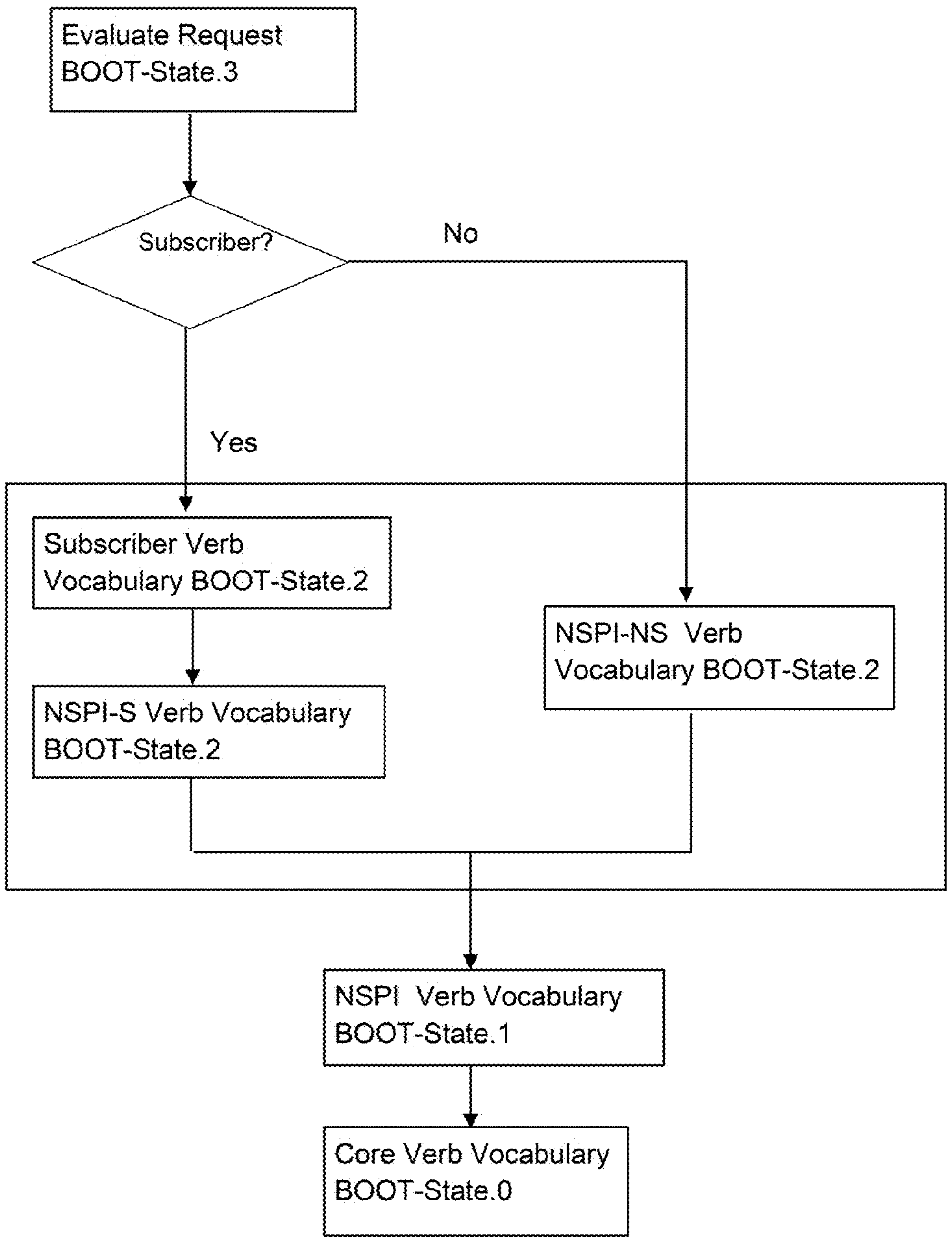

FIG. 26 NSPI-S Verbs

Advertise - The advertise request is representative of an advertisement describing a service offering provided by a subscriber, said request including a subscriber identifier; the action validates the request, sets one or more IOT-Things representative of the service offered in an advertisement IOT-Namespace, and sets the response to indicate if the request is satisfied. In the preferred embodiment, the advertisement includes information representative of: a description of the service offered, a uniform resource request for requesting the service, a representation of a reference to an IOT-Schema describing the service request, and, a representation of a reference to an IOT-Schema describing the service response.

Assert - The request is representative of a request to test if an assertion about an IOT-Listing is true, said request including a subscriber identifier; the action validates the request, and sets the response to indicate if the assertion is true or false. In an embodiment the request can be encrypted content, and the actions include receiving encrypted content and decrypting encrypted content.

Configure - The request is a configuration request to be evaluated in the context of a subscriber IOT-Context, said request comprising one or more IOT-Statements. The action comprises the steps of validating the configuration request; saving configuration in non-transitory media; evaluating IOT-Statements, and setting the response to indicate if the request was satisfied. A configuration request can be stored in non-transitory storage and subsequently evaluated to restore the configuration, such as after a reboot.

Declare - The request is representative of a request to declare information about an IOT-Listing, said request including a subscriber identifier; the action validates the request. If the declaration declares a statement is true, then the action sets on or more IOT-Things so that an assertion about the IOT-Thing is true. If the declaration declares a statement is no longer true, then the action sets one or more IOT-Things to that an assertion about the IOT-Thing is false.

Denied - The request is representative of a request that the Interference rules have denied. The action comprises the steps of setting value of response:message to a representative message indicating the request cannot be satisfied.

Lookup - The request is representative of a request for an action to lookup information in a provisioned IOT-Namespace, said request including a subscriber identifier. The action comprises the steps of validating the request, interacting with one or more IOT-Things to satisfy the request; and, setting the response to indicate if the request was satisfied.

Provision - The request is representative of an IOT-Listing to set on behalf of someone, or something, such as a second IOT-Machine, said request including an identifier and a public key. The action comprises the steps of validating the request; setting one or more IOT-Things so that an assertion about the IOT-Listing is true; generating a digital identity certificate binding the IOT-Listing to a public key; and, setting the response to indicate if the request was satisfied.

FIG. 27 NSPI-NS Verbs NSPI-3

Denied - The request is representative of a request that the Interference rules have denied. The action comprises the steps of setting value of response:message to a representative message indicating the request cannot be satisfied.

Subscribe - The request is representative of a subscription request including an identifier and a certificate signing request. The action comprises the steps of validating the request satisfies the requirements for being a member subscriber, provisioning an IOT-Listing representative of said identifier; and, generating a response including a digital certificate including an identifier representative of said IOT-Listing. In the preferred embodiment, requirements for being a member include the request having a representation of a certificate signing request. In the preferred embodiment, the digital certificate is an X509 certificate issued by the NSPI.

Unsubscribe - The request is representative of a request to unsubscribe from a service, said request including a subscriber identifier. The action comprises the steps of validating the request; unsetting the IOT-Listing representative of the subscriber identifier as a subscriber of the specified service, and setting the response to indicate if the request was satisfied.

FIG. 28 Inference Rules. (NSPI-4)

Rule 1 In the event of system:status unsatisfied, perform deny.

If ever there is a system:status equal to "unsatisfied", then, perform set request:content.body.verb="deny".

Rule 2 Set the content.header.verified to unknown.

If ever there is a request: then,
perform set request:content.header.verified=unknown.

Rule 3 Decrypt the content.seal.

If ever there is a request: where content.header.from is set and content.header.digital.signature is set, and content.seal is set and content.body is set, and content.seal.password is not set, and public:device.{request:content.header.from}.publickey is set, then,
perform openssl.rsautl.decrypt using content={content.seal} and private.key={private:device.private.key}, and perform parse using content={content.seal} and format=xml, as content.seal,
and conclude that content.seal.password is set and content.seal.cipher is set.

Rule 4 Decrypt the content body.

If ever there is a request: where content.header.from is set and content.header.digital.signature is set, and content.seal.password is set, and content.seal.cipher is set, and content.body is set, then,
perform openssl.{cntent.seal.cipher}.decrypt using password={content.seal.password} and content={content.seal.body} as content.body.

Rule 5 Verify the signature.

If ever there is a request: where content.header.from is set and content.header.digital.signature is set, then,
perform openssl.rsautl.verify
inkey={public:device.{request:content.header.from}.publickey}
in={request:content.header.digital.signature}, and set request:content.header.verified={system:status}.

FIG. 28 (continued) Inference Rules.

Rule 6 Set the request IOT-Statement.

If ever there is a request: where {content.body} matches "^<xml " then perform parse using format=xml content={request:content.body} as request:content.body, and set request:content.body="".

Rule 7 The requested action of unknown request must be subscribe.

If ever there is a request: where content.header.verified is equal to unknown and content.body.verb is equal to subscribe, then,
perform set content.header.verified equal to satisfied.

Rule 8 Verify the requested action.

If ever there is a request: where content.header.verified is equal to satisfied and content.body.verb is not equal to one of: subscribe, configure, register, lookup, unregister, declare, provision, assert, advertise, or unsubscribe, then, perform set content.body.verb to deny.

Rule 9 Perform the IOT-Statement.

If ever there is a request: where content.header.verified is equal to satisfied and content.body.verb is set, then, perform verb={request:content.verb} using content=request:content.

Rule 10 Format the response.

If ever there is a response:, then,
perform format.xml content=response: as content:body, and
renew content=response:.

FIG. 29 Networked Devices (NSPI-5)
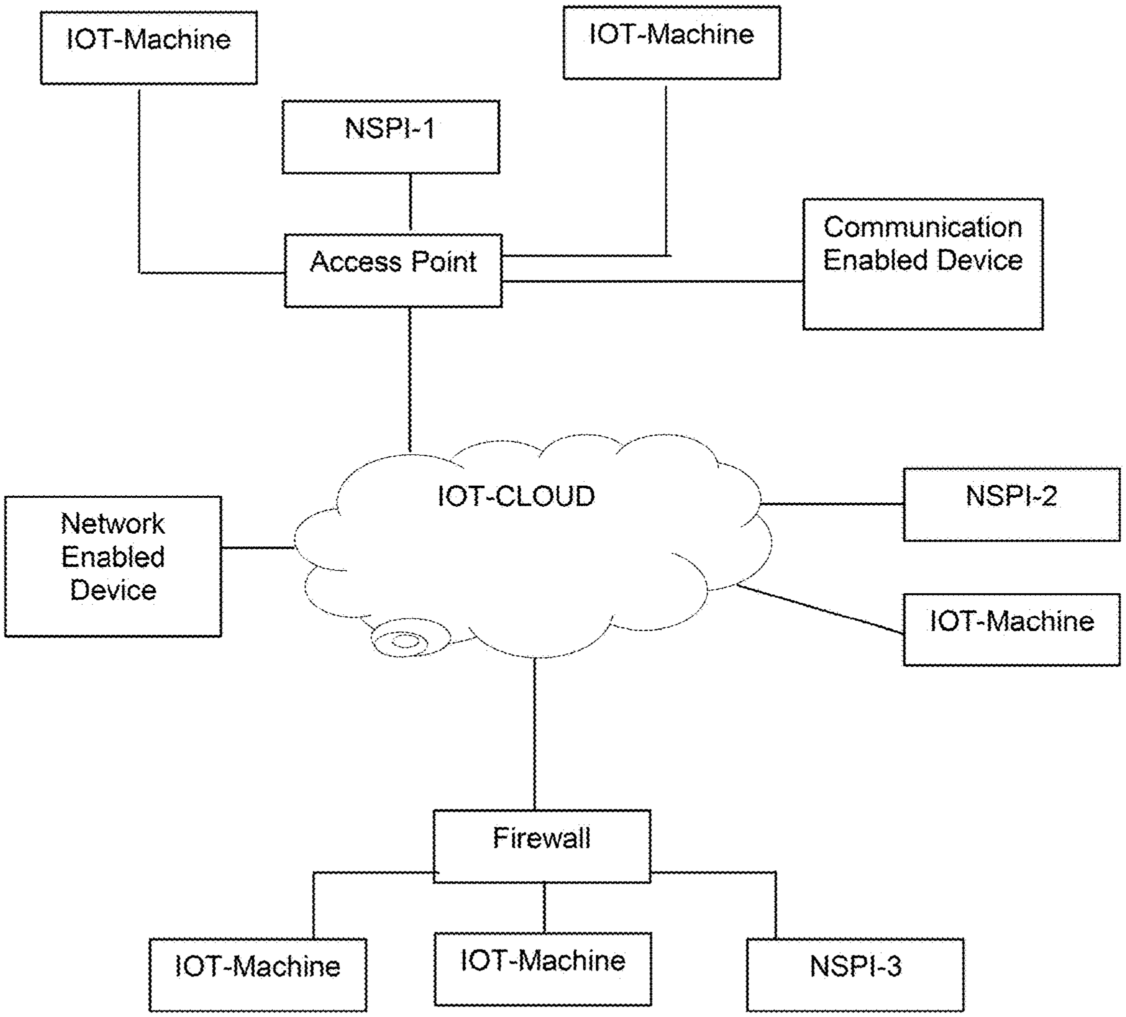

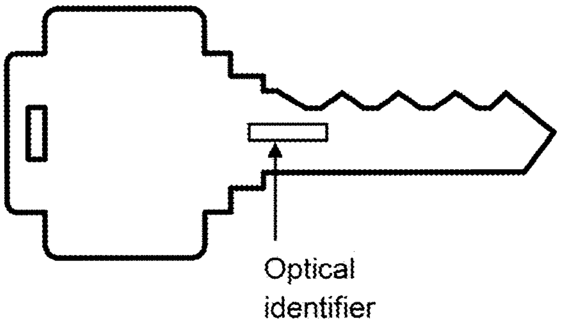
FIG. 30 Tumbler Key Lock
FIG. 31
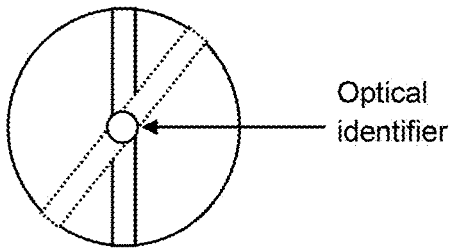
FIG. 32
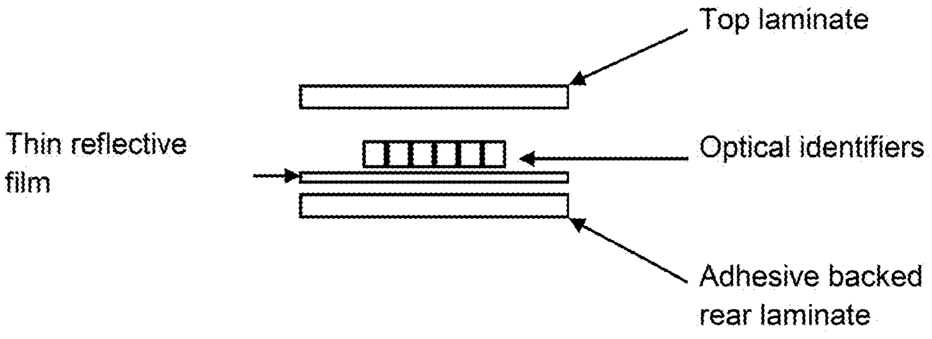

FIG. 33

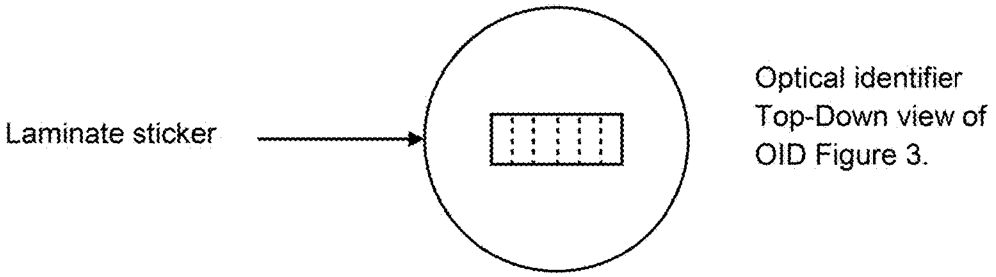

FIG. 34

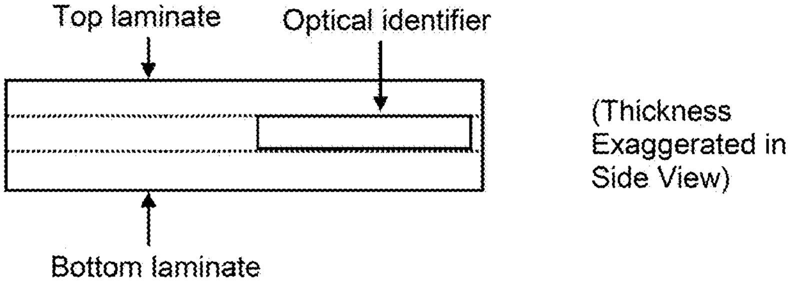

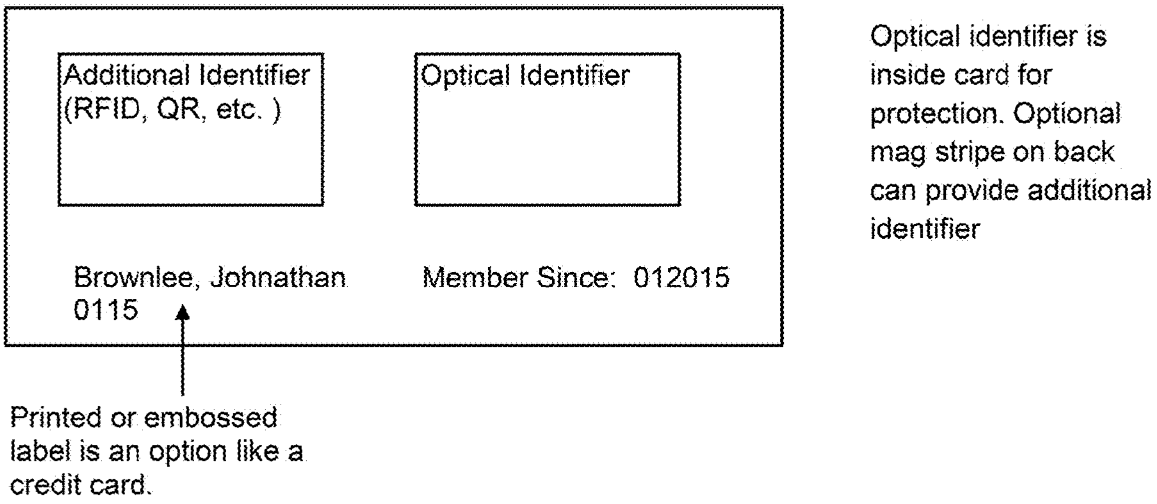

Laminate sticker

Optical identifier Top-Down view of OID Figure 3.

Top laminate

Optical identifier (Thickness Exaggerated in Side View)

Bottom laminate

Additional Identifier (RFID, QR, etc. )

Optical Identifier

Brownlee, Johnathan 0115

Member Since: 012015

Printed or embossed label is an option like a credit card.

Optical identifier is inside card for protection. Optional mag stripe on back can provide additional identifier FIG. 37 Block removed spring releases driving ram to destroy optical identifier.
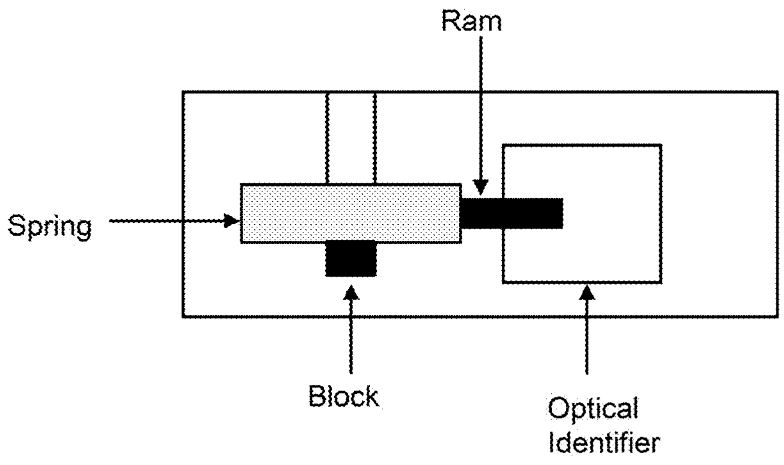
FIG. 38
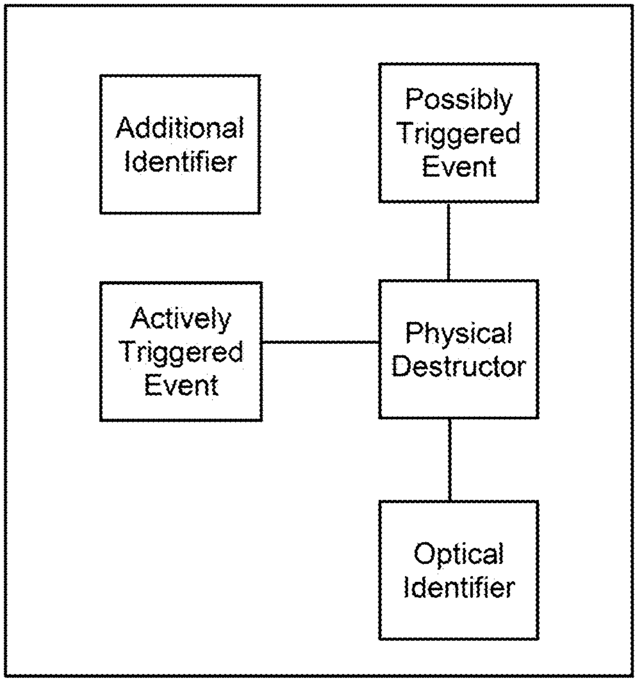

FIG. 39
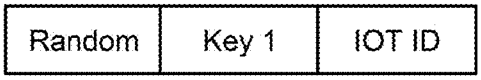
FIG. 40
FIG. 41 (OID Figure 12)
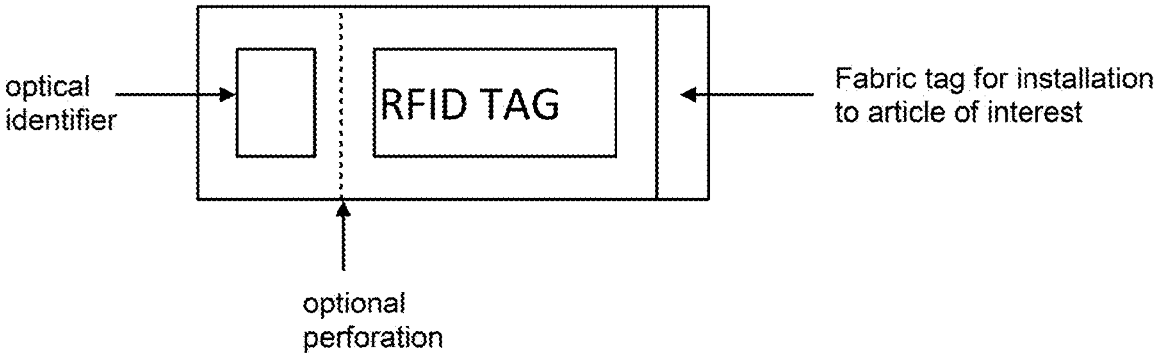

FIG. 42 (OID Figure 13)
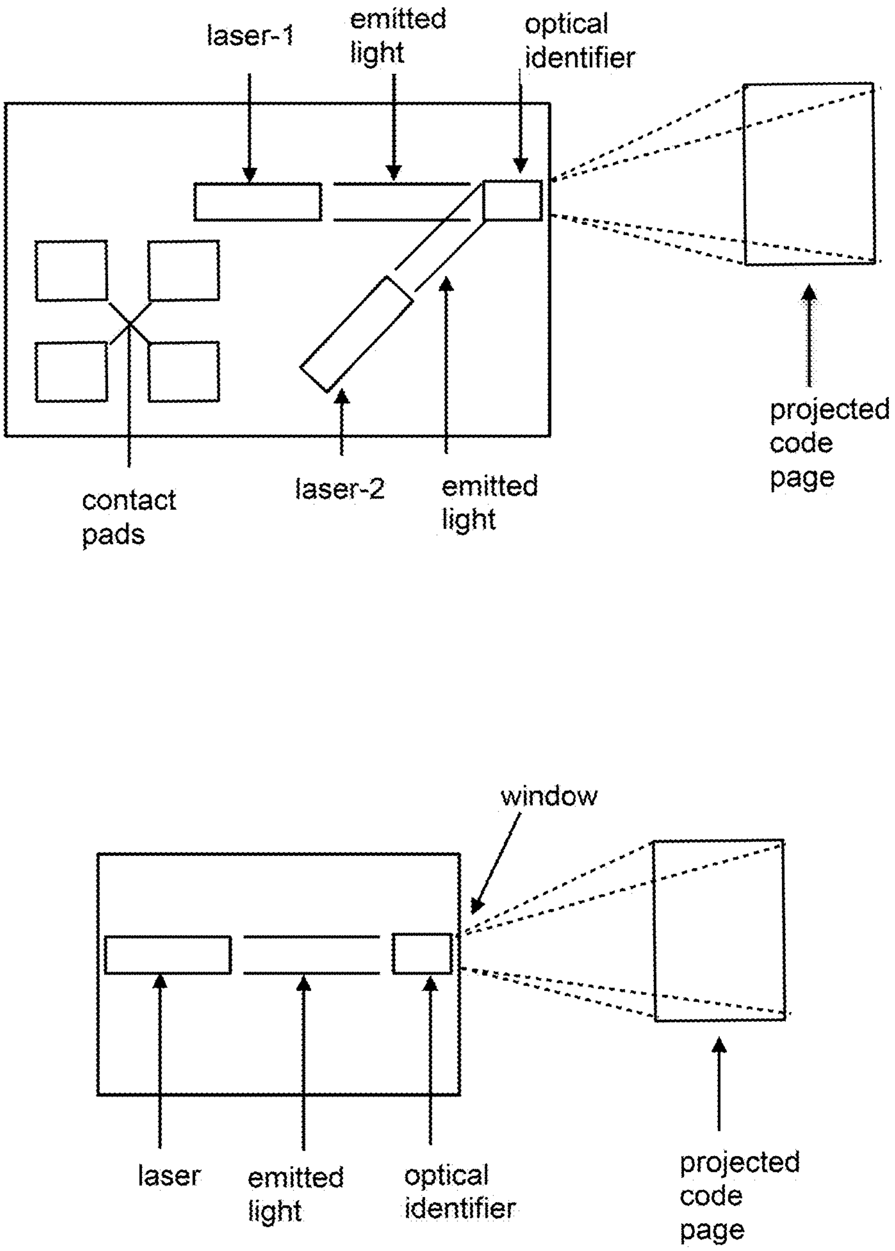

Holographic multiplexing methods: (a) angle multiplexing, in-plane; (b) angle multiplexing, out-of-plane; (c) peristrophic multiplexing; (d) wavelength multiplexing; (e) phase-code multiplexing; (f) shift multiplexing, in-plane (*Cont.*) Holographic multiplexing methods: (g) shift multiplexing, out-of-plane; (h) spatial and angle multiplexing combined; (i) spatial and shift multiplexing combined; (j) spatial multiplexing combined with angle and peristrophic multiplexing Source for the above Figures 14 and 15: Holographic Data Storage. 2001. Springer- Verlag, edited by Coufal, Psaltis et al.

Method of recording gratings and holograms directly into optical fibers as they are formed. The fiber are later diced into optical identifiers in bead form factor.

FIG. 47 Setting IOT-Thing content (OK-1)

request:content.identifier="Test Message"
request:content.seal.cipher="aes-256-cfb"
request:content.seal.password="%d92_.Tgak+5F@1f%NDe"
request:content.body="This is the content"

FIG. 48 Encrypting IOT-Thing content:body using IOT-Thing cipher:seal request:content.identifier="TestMessage"
request:content.seal.cipher="aes-256-cfb"
request:content.seal.password="%d92_.Tgak+5F@1f%NDe"
request:content.body="U2FsdGVkX1+A+scZ9sycX5uyws8KGp1ZhXQljeAFfPq3BlKR"

FIG. 49 Formatting the Seal (OK-3)

request:content.identifier="TestMessage"
request:content.seal="<seal><cipher>aes-256-cfb</cipher>
<password>%d92_.Tgak+5F@1f%NDe</password></seal>"
request:content.body="U2FsdGVkX1+A+scZ9sycX5uyws8KGp1ZhXQljeAFfPq3BlKR"

FIG. 50 Encrypting the Seal (OK-4)

request:content.identifier="TestMessage"
request:content.seal="
tg7oGiS7cy0OFwCwzLmDSPOWgSo3+WqMtt4Hnx0PeK5/0TJq1uqRA536xEf+Juqs
rhV0e27NnO7WynWbJFyPMV1TH94s/ADLTcrXKZm9S9pL8irlCxuXxm8S2iMJp5kj
JZ4gHA6lvGOqM5yLyoSbysAJIBtAbe9A6Dwl0Dw/0NnCOhymhNHVQ3fvSBeQpqd2
z5fHHSRGNpsh5xfxQ6D8WBQzvobqtbz5Ahan66oDQa6hYvF4b5JK6W4diNGEJGX1
zsPmo7Rt8Azyly+gZo7MU0OiOn5383bttaE+q5n9jQpoh1Hv6StcOcUhkRifB3KE
YP2US0E2ZlCmaAmiDauBJg=="
request:content.body="U2FsdGVkX1+A+scZ9sycX5uyws8KGp1ZhXQljeAFfPq3BlKR"

FIG. 51 Formatting content request:content:="<content><identifier>TestMessage</identifier><seal>
tg7oGiS7cy0OFwCwzLmDSPOWgSo3+WqMtt4Hnx0PeK5/0TJq1uqRA536xEf+Juqs
rhV0e27NnO7WynWbJFyPMV1TH94s/ADLTcrXKZm9S9pL8irlCxuXxm8S2iMJp5kj
JZ4gHA6lvGOqM5yLyoSbysAJIBtAbe9A6Dwl0Dw/0NnCOhymhNHVQ3fvSBeQpqd2
z5fHHSRGNpsh5xfxQ6D8WBQzvobqtbz5Ahan66oDQa6hYvF4b5JK6W4diNGEJGX1
zsPmo7Rt8Azyly+gZo7MU0OiOn5383bttaE+q5n9jQpoh1Hv6StcOcUhkRifB3KE
YP2US0E2ZlCmaAmiDauBJg==
</seal><body>U2FsdGVkX1+A+scZ9sycX5uyws8KGp1ZhXQljeAFfPq3BlKR</body></
content>"

FIG. 52

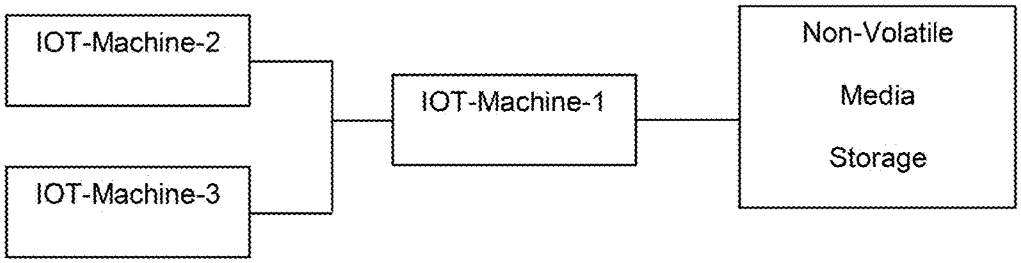

FIG. 53

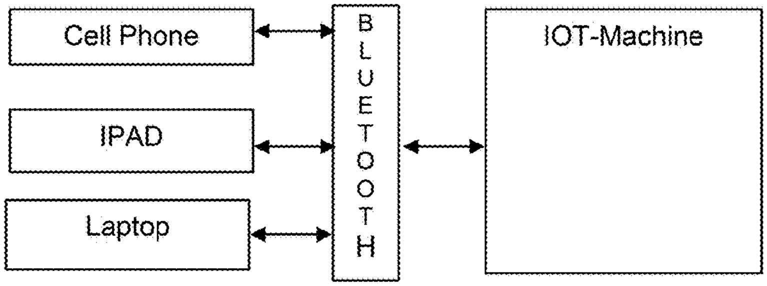

FIG. 54 Protection Rings
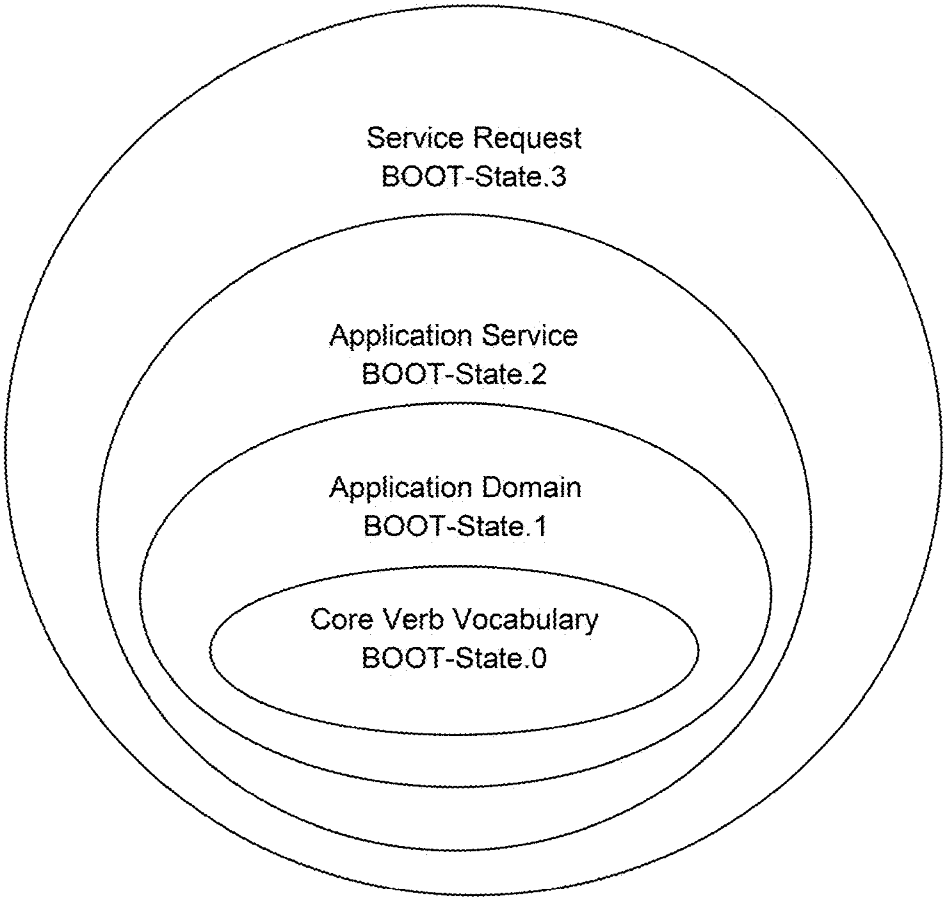

FIG. 55 Verb Vocabulary
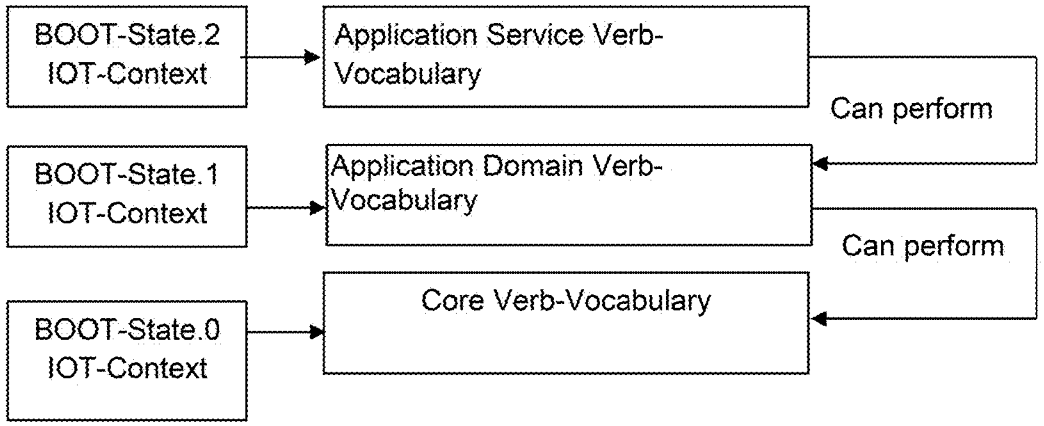

FIG. 56 Security Capabilities
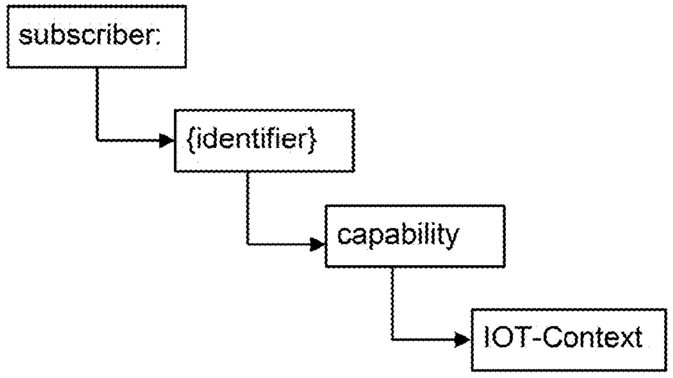

FIG. 57 Configure IOT-System to be response to get HTTP request

```
<verb:configure xmlns:verb='http://www.iotnamespaces.com/iotverb/xmldef'>
<!--    ==============================================================
        HTTP Task (c) 2015   C. Northrup
        This document describes how to configure the IOT-System to be responsive to get/post
        HTTP services
        ========================================================== -->
<verb:configure.task   task="task:mini.web.server">
<verb:action>
        <!--    ==========================================================
                Set the default for formatting to html.
                ====================================================== -->
        <verb:setvalue          iotthing="verb:active.consumer.format" value="html"/>
        <!--    ==========================================================
                Renew the request and response namespaces so that they are empty.
                ====================================================== -->
        <verb:renew   iotthing="request:"/>
        <verb:renew   iotthing="response:"/>
        <!--    ==========================================================
                Receive the first input line from the default communication channel.
                ====================================================== -->
        <verb:receive.line  as.value.of.iotthing="request:line"/>
        <!--    ==========================================================
                Use the case.of to select the web.get, or web.post task
                ========================================================== -->
        <verb:case.of iotthing="request:line">
        <verb:where.value.is.like value="GET /.* HTTP/1.[10]"/>
        <verb:action>
                <verb:perform task="task:mini.web.get" />
        </verb:action>
        <verb:break/>
        </verb:case.of>
        <verb:disconnect/>
        </verb:action>
</verb:configure.task>
</verb:configure>
```

FIG. 58 HTTP GET Task Specification

```
<verb:configure xmlns:verb='http://www.iotnamespaces.com/iotverb/xmldef'>
<!--    ==========================================================
        HTTP Get Task
        (c) 2015 C. Northrup

        This document describes how to configure the IOT-System to
        be responsive to HTTP GET request
        ======================================================= -->
<verb:configure.task  task="task:mini.web.get">
<verb:action>
        <verb:renew         iotthing="local:get" and.iotthing="local:pending" />
        <verb:setvalue      iotthing="local:get.criteria" to.value.of="request:line"/>
        <verb:substitute    iotthing="local:get.criteria" pattern="HTTP/[0-9].[0-9]" value=""/>
        <verb:substitute    iotthing="local:get.criteria" pattern="^GET "          value=""/>
        <verb:substitute    iotthing="local:get.criteria" pattern="/verb://"   value="service:" />
        <!--    ==========================================================
                The criteria is everything upto the question mark, and the content is
                everything to the right of the question mark. For example:
                        verb:request service='xsms'?for.edge='pete'
                The above criteria is:          verb:request service='xsms'
                and the content is:             for.edge='pete'
                ========================================================== -->
        <verb:setvalue      iotthing="local:get.content"   value="{local:get.criteria}"/>
        <verb:substitute    iotthing="local:get.criteria"  pattern="\?.*"  value=""/>
        <verb:substitute    iotthing="local:get.content"   pattern="^.*\?" value=""/>
        <verb:convert.fromhexseq iotthing="local:get.criteria" and.iothing="local:get.content" />
        <!--    ==========================================================
                Using the local:get.criteria, save the first token as the path. Everything
                else should be in name-value pairs.
                ========================================================== -->
        <verb:setvalue      iotthing="local:get.path"  value="{local:get.criteria}"/>
        <verb:substitute    iotthing="local:get.path"  pattern=" .*"  value=""/>
        <!--    ==========================================================
                Remove the path from the criteria
                ========================================================== -->
        <verb:substitute    iotthing="local:get.criteria" pattern="^.* " options="left|min"
                            value=""/>
        <!--    ==========================================================
                Use the setmember to convert the criteria name-value pairs into composite
                members of name=value
                ========================================================== -->
        <verb:set.member as.iotthing="local:get.criteria"    value="{local:get.criteria}"/>
        <verb:set.member as.iotthing="local:get.content"     delimiter="&"
                        value="{local:get.content}"/>
        <verb:renew   iotthing="local:pending"/>
        <verb:setvalueiotthing="local:index" value="1"/>
```

FIG. 58 (continued)

```
<verb:setvalue iotthing="local:pending[{local:index}]" value="1"/>
<!--    ===========================================================
        The HTTP header includes one or more lines followed by a blank line.  The
        following foreach will read each line into an autoindexed iotthing until it finds the
        blank line
=========================================================== -->
<verb:foreach><verb:condition>
        <verb:isnot.equal       iotthing="local:pending[{local:index}]" value=""/>
</verb:condition>
<verb:action>
        <verb:increment         iotthing="local:index"/>
        <verb:receive.line      iotthing.value="local:pending[{local:index}]"/>
</verb:action>
</verb:foreach>
<verb:remove iotthing="local:pending[1]"/>
<verb:remove iotthing="local:pending[{local:index}]"/>
<!--    ==============================================================
        Each line that we read should have a token:value, as in:
        User-Agent: Mozilla
        Connection: Keep-Alive
        ....
        We use the reindex service to reset the index names to the first part upto the :,
        and the value as the value to the right of the colon. This will set the equivalent
        of:     local:pending[Connection]=Keep-Alive
        ========================================================== -->
<verb:reindex iotthing="local:pending" delimiter=":" />
<!--    ==============================================================
        Now that we have read in all of the lines, we need to
        change the local:pending from indices to composites
        ========================================================== -->
<verb:convert from="IOT-List" to="IOT-Composites" iotthing="local:pending"/>
<verb:send.line value="HTTP/1.0 200 OK"/>
<!--    ============================================================
        Now setup the request: namespace.
        ========================================================== -->
<verb:renew   iotthing="request:"/>
<verb:copy    composites.of="local:get.content" into.iotthing="request:"/>
```

FIG. 58 (continued)

```
<!--    =======================================================
        If a verb.format parameter was specified, then set the
        active.consumer.format to this value.  This could have
        been written as a verb:condition, but the verb:when is
        just a bit more concise.
        ======================================================= -->
<verb:when    iotthing="local:get.parameter.verb.format"
              condition="isnot.empty"
              action="verb:setvalue
                     iotthing='verb:active.consumer.format'
                     value.of='local:get.parameter.verb.format'"/>
<!--    =======================================================
        Use the verb:case.of service on the content of the PATH
        to determine the appropriate next step.
        ======================================================= -->
<verb:convert.tounquoted     iotthing="local:get.path"/>
<verb:case.of iotthing="local:get.path">
<!--    =======================================================
        If the PATH is empty:  (i.e., http://localhost/
              if the active compoint name is "admin",
                     use html/adminindex.html if available, or
                     show the administrative services.
              if the active compoint name is "local"
                     use html/localindex.html if available, or
                     show the local services.
              if the active compoint name is "namespace"
                     use html/index.html if available, or
                     show the namespace services.
        ======================================================= -->
<verb:where.value.is.equal value="/"/>
<verb:action>
        <verb:setvalueiotthing="local:get.path"  value=""/>
        <verb:setvalueiotthing="local:get.path"  value="html/"/>
        <verb:setvalueiotthing="local:get.path"
              value.append="{verb:active.compoint.name}"/>
        <verb:setvalueiotthing="local:get.path"  value.append="index.html"/>
        <verb:comment>
              When connecting on the namespace compoint using
                     http://machineName
              without specifying a document, it will default
              to /html/namespaceindex.html If you want the default to be
              html/index.html, then remove this text description and the
              verb:comment tags.
        </verb:comment>
</verb:action>
```

FIG. 58 (continued)

```
<!--    ==========================================================
        If the PATH is a verb:request service, then we will process the request here.
        ========================================================== -->
<verb:where.value.is.like value="verb:request"/>
<verb:action>
        <!--    ==================================================
                The content has already been copied into the request namespace.
                The composites of local:pending can be used (in addition to the
                local:criteria) so copy the composites into the criteria.
                ============================================== -->
        <verb:copy      composites.of="local:pending" into.iotthing="local:get.criteria"/>
        <verb:request  using.iotthing="local:get.criteria"
                        using.content="request:"/>
        <verb:send      value="</BODY></HTML>"/>
        <verb:disconnect compoint="verb:active.compoint"/>
</verb:action>
<!--    ==========================================================
        If the PATH is a verb:pki.request service, then we
        will process the request here.
        ========================================================== -->
<verb:where.value.is.like value="verb:pki.request"/>
<verb:action>
        <!--    ==================================================
                The content has already been copied into the request namespace.
                The composites of local:pending can be used (in addition to the
                local:criteria) so copy the composites into the criteria.
                ============================================== -->
        <verb:copy      composites.of="local:pending" into.iotthing="local:get.criteria"/>
        <verb:pki.request verb.using.criteria="local:get.criteria"
                          using.iotthing="local:get.criteria"
                          verb.using.iotthing="request:"/>
        <verb:send.line value="Content-type: text/html"/>
        <verb:send.line value=""/>
        <verb:send      value=" <html>"/>
        <verb:send      value="<head>"/>
        <verb:send      value="</head><body>"/>
        <verb:format.html.table compoint="verb:active.compoint"
                        iotthing="response:"/>
        <verb:send      value="</body></html>"/>
        <verb:disconnect compoint="verb:active.compoint"/>
</verb:action>
<!--    ==========================================================
        If they are asking for a standard html or text file, then simply connect to the file
        and send the results.  Browsers do not require the content size to be specified
        here. Note that the verb:send uses mode="verb"  which allows the file to contain
        verb:call statements (dynamic calls that are evaluated in-line).  For faster
```

```
processing you can use a file extension, such as phtml and only preprocess
files with that extension.
========================================================== -->
```

FIG. 58 (continued)

```
<verb:where.value.is.like value=".*.html"/>
<verb:where.value.is.like value=".*.txt"/>
<verb:action>
        <verb:send.line value="Content-type: text/html"/>
        <verb:send.line value=""/>
        <verb:substitute        iotthing="local:get.path" options="left"
                                pattern="/" value=""/>
        <verb:send mode="verb" from.document="{local:get.path}"/>
</verb:action>
<!--    =============================================================
        For gif, jpg, jpeg, and many other mime types, we have to
        send the Content-Length in order for the response to be
        processed by a browser.
        ========================================================== -->
<verb:where.value.is.like value=".*.gif"/>
<verb:where.value.is.like value=".*.jpg"/>
<verb:where.value.is.like value=".*.jpeg"/>
<verb:action>
        <verb:substitute        iotthing="local:get.path" options="left"
                                pattern="/" value=""/>
        <verb:send.line value="Content-type: image/gif"/>
        <verb:system.stat document="{local:get.path}"  as.iotthing="request:image"/>
        <verb:setvalue  iotthing="request:image.size" value.insert="Content-Length: "/>
        <verb:send.line send.iotthing.value="request:image.size"/>
        <verb:send.line value="Connection: close"/>
        <verb:send.line value=""/>
        <!--    ============================================
                The local:get.PATH has the pathname to the request file.  We insert
                stdfile: into the path, and register this as a compoint:html.file. We can
                then connect to the compoint, and when we call verb:send, we specify
                the from compoint as the connected compoint.  This will send the
                content of the file.
                ======================================== -->
        <verb:setvalue  iotthing="local:get.path"               insert.value="stdfile:"/>
        <verb:setvalueiotthing="request:fast.connectivity"    value="{local:get.path}"/>
        <verb:setvalueiotthing="request:fast.connectivity"    value.insert="stdfile:"/>
        <verb:compoint.register compoint="compoint:html.file"
                        using.iotthing="request:fast"/>
        <verb:connect   compoint="compoint:html.file"
                        as.compoint="compoint:current.file"
                        as.compoint.mode="r"/>
        <verb:send      from.compoint="compoint:current.file"/>
        <verb:disconnect compoint="compoint:current.file"/>
```

```
            <verb:remove  iotthing="compoint:html.file"/>
            <verb:remove  iotthing="compoint:current.file"/>
        </verb:action>
        <verb:break/>
        <verb:where.default.is/>
        <verb:action>
```

FIG. 58 (continued)

```
            <verb:send.line value="Content-type: text/html"/>
            <verb:send.line value=""/>
            <verb:send     value=" <html>"/>
            <verb:send     value="<head>"/>
            <verb:send     value="</head><body>"/>
            <verb:format.html.table
                           compoint="verb:active.compoint"
                           iotthing.reference="local:get.PATH"/>
            <verb:send     value="</body></html>"/>
        </verb:action>
        </verb:case.of>
</verb:action>
</verb:configure.task>
 </verb:config>
```

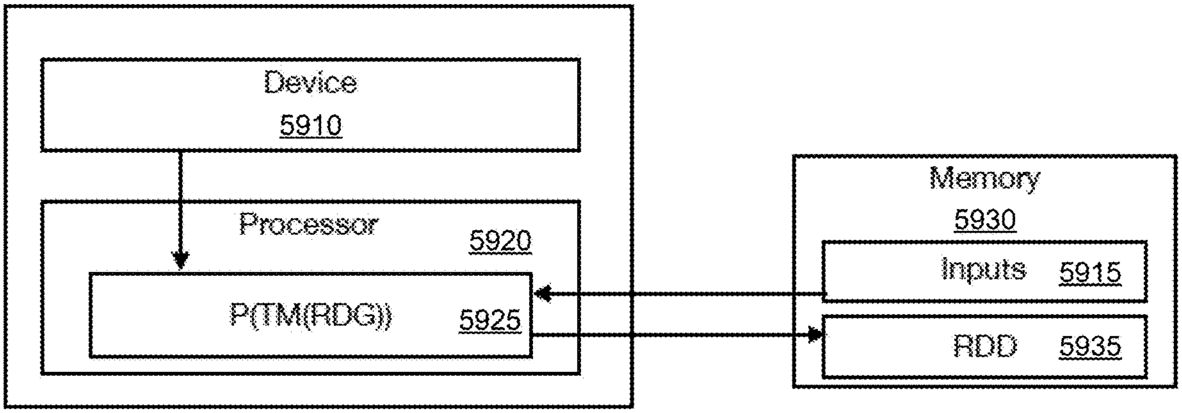
FIG. 59
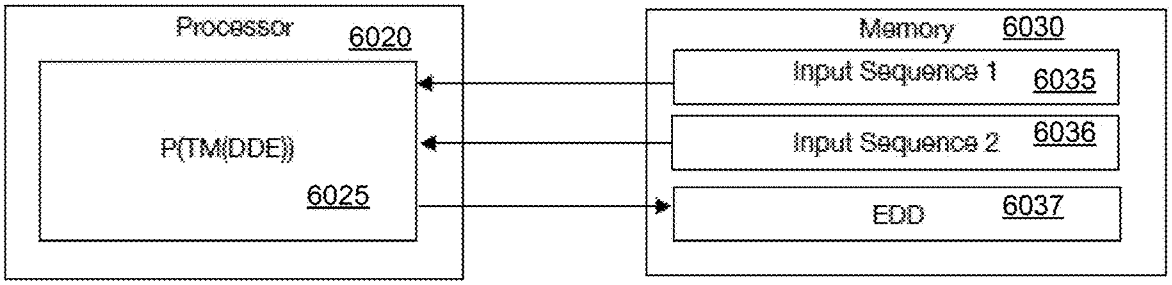
FIG. 60
6100
FIG. 61
(Prior Art)

7900 egnilPVjv70aCuA8lU1HASJmdvj7VwRd88QAxEtVUW19HKr5R2TLT
zrnWhyo4vEvdM6uStTjHb7VKicvblN2hLDK8ri6s2BDtTAjQL7OKtPAy
BSP5KBNJ05xYtCf8haNJlwibqysrGno1sseJa37J2w54i2XjYLoycoDpf
gTCwT3vLkoTVW66sUDuoUv5PxeEvTNTHRpdCXFH7BsROPtWktp
WLDm2FHmkrAG1DLZnTPvRCM3wMVJPiYsnUnCnVpT

FIG. 79

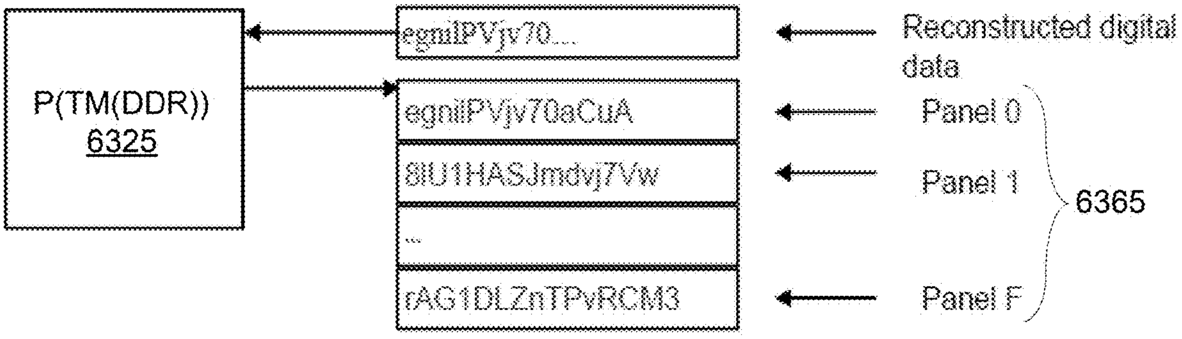

FIG. 80

```
0    egnilPVjv70aCuA8lU1HASJmd
1    vj7VwRd88QAxEtVUW19HKr5R2
2    TLTzrnWhyo4vEvdM6uStTjHb7
3    VKicvblN2hLDK8ri6s2BDtTAj
4    QL7OKtPAyBSP5KBNJ05xYtCf8
5    haNJlwibqysrGno1sseJa37J2
6    w54i2XjYLoycoDpfgTCwT3vLk
7    oTVW66sUDuoUv5PxeEvTNTHRp
8    dCXFH7BsROPtWktpWLDm2FHmk
9    rAG1DLZnTPvRCM3wMVJPiYsnU
A    nCnVpT
```

FIG. 81

0. egnilPVjv70aCuA
1. 8lU1HASJmdvj7Vw
2. Rd88QAxEtVUW19H
3. Kr5R2TLTzrnWhyo
4. 4vEvdM6uStTjHb7
5. VKicvblN2hLDK8r
6. i6s2BDtTAjQL7OK
7. tPAyBSP5KBNJ05x
8. YtCf8haNJlwibqy
9. srGno1sseJa37J2
A. w54l2XjYLoycoDp
B. fgTCwT3vLkoTVW6
C. 6sUDuoUv5PxeEvT
D. NTHRpdCXFH7BsRO
E. PtWktpWLDm2FHmk
F. rAG1DLZnTPvRCM3

8400

SHA256 Hash:
E22C61340EF7CCF56D72A317C7542B5E550B8270CCFF0FD0E18254760B3D3BBE

| | |
|---|---|
| E | PtWktpWLDm2FHmk |
| 2 | Rd88QAxEtVUW19H |
| 2 | Rd88QAxEtVUW19H |
| C | 6sUDuoUv5PxeEvT |
| 6 | i6s2BDtTAjQL7OK |
| 1 | 8lU1HASJmdvj7Vw |
| 3 | Kr5R2TLTzmWhyo |
| 4 | 4vEvdM6uStTjHb7 |
| 0 | egnilPVjv70aCuA |
| E | PtWktpWLDm2FHmk |
| ... | |
| B | fgTCwT3vLkoTVW6 |
| E | PtWktpWLDm2FHmk |

PtWktpWLDm2FHmkRd88QAxEtVUW19HRd88QAxEtVUW19H6sUDuoUv5PxeEvTi6s
2BDtTAjQL7OK8lU1HASJmdvj7VwKr5R2TLTzmWhyo4vEvdM6uStTjHb7egnilPVjv70a
CuAPtWktpWLDm2FHmk
6720

SYSTEM AND METHOD FOR SECURING A RESOURCE

CROSS-REFERENCE TO RELATED APPLICATIONS

This application claims the benefit of U.S. Provisional Patent Application Ser. No. 62/626,917, filed Feb. 6, 2018, entitled "OPTICAL IDENTITY SYSTEM AND METHODS," and also claims the benefit of U.S. Provisional Patent Application Ser. No. 62/636,303, filed Feb. 28, 2018, entitled "NEURBOT OPTICAL IDENTIFIER SECURITY" which is incorporated by reference herein in its entirety.

FIELD OF THE INVENTION

The present invention relates to data security, and more particularly, is related to identity systems and methods.

BACKGROUND OF THE INVENTION

The key and lock have long served to safeguard possessions and provide a means of authorization and authentication. Keys are also used to provide identification. People continue to carry keys and other forms of identification and authorizations in their pockets, wallets, and on their persons.

A key can be physical, digital, or biologically based. A digital key, such as a wireless network key, is used to secure access to a wireless network. A biological key, also known as an identification key or a dichotomous key, is a way to classify organisms by giving the classifier two options in each stage until identification occurs.

Computer systems are now embodying the use of automatic identification and data capture (AIDC) systems to provide a method for automatically identifying objects, collecting data about them, and entering them into the system without human involvement. Examples AIDC systems include barcodes, magnetic stripes, OCR, RFID, biometrics, smart cards, and voice recognition. The most common application of the 2D barcode may be supermarket and retail checkout systems. An advantage is their low cost at approximately less than $0.05. A disadvantage is they can easily be easily duplicated. Magnetic stripes on traditional cards such as bank, debit, credit cards, contain data. Anybody with a magnetic card reader and access to a card can create a counterfeit card potentially leading to fraudulent purchases costing credit card companies millions in fraud.

RFID tags provide an alternative. There are over 280 issued US patents with the term RFID in their abstract. RFID is available in low, high, and ultra-high frequencies. Low frequency RFID is often used to identity livestock, while high frequency RFID is good for items at a checkout, and ultra-high frequency RFID is used to track inventory in a large warehouse. A disadvantage of RFID is that one cannot easily selectively scan items in a warehouse when all the items in range will respond. The tag can become unreadable based on the contact surface or material around the tag. For example, metal can deactivate the RFID antenna. Liquids can affect the reliability of the RFID signal. Another disadvantage of RFID is the cost. A simple barcode label costs a few cents while an RFID tag can cost from $1 to upwards of $30 dollars. RFID readers can also cost an order of magnitude more than a simple barcode scanner. Near Field Communication (NFC) tags are an alternative. A disadvantage of NFC is the close proximity required for a reader to communicate with the tag.

ISO/IEC 7812 is the International Organization for Standardization (ISO) publication describing a number system for identification cards. This include identification of the card issuer; the format of the issuer identification number (IIN) and the account number. The register of issuer identification numbers is not available to the general public. It is only available to the institutions who hold Issuer Identification Numbers published in the Registrar, financial networks, and processors. The primary account number includes the IIN, an individual account identifier, and a check digit.

A benefit of Biometric AICD is that a fingerprint or facial recognition is easier to use than entering a login and password. There are several disadvantages to biometrics. Firstly, a thief could steal a device and upload bogus biometric data. This would allow the thief to unlock the device at will. Biometric sensors on handheld devices such as cell phones often rely on partial matches which could enable master biometric data to unlock more than 50% of the devices. Biometric data can also be stolen such as in the case of the US Office of Personnel Management where 5.6 million employee fingerprints where leaked. Finally, biometric data such as iris scans can indicate presence but not necessarily consent. Therefore, there is a need to address one or more of the above described shortcomings.

SUMMARY OF THE INVENTION

Embodiments of the present invention provide methods and system providing optical identity. Briefly described, the present invention is directed to a system and method for securing the content of a resource.

A first aspect of the invention is directed a physical key. An issuer of encoded digital data stored in the non-volatile memory of a third party system may issue a physical key encoded with digital key data. A key holder presents the physical key to a verifier system and the verifier system acts upon the physical key and encoded digital key data to decode the stored encoded digital data.

A second aspect of the invention is directed to a system and method for securing a resource. A combination code generator is configured to receive a first input sequence and a first panel context and generate a first computed combination code. A second computed combination code is generated from a received second input sequence and a second panel context. A set panels module receives the first computed combination code and the first panel context and re-orders the panels of the first panel context to set the second panel context. a hash key generator converts the received second panel context and the second combination code into a first hash key.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIG. 1A provides an optical IOT-SIM (Internet of Things—Subscriber Identification Module) Card, not shown to scale, showing a transparent plate housing a holographic glass bead.

FIG. 1B illustrates optical reader components.

FIG. 1C microcontroller DS4380 drives MAX3798 VECSEL to act as an illumination source.

FIG. 1D illustrates an optical identifier and Optical Reader OI-Slot, with optional actuator to trigger the illumination source.

FIG. 1E illustrates a bidirectional optical identifier with optical reader.

FIG. 1F illustrates reflective reading of optical identifier.

FIG. 1G provides an optical reader housed in a USB enabled device.

FIG. 1H illustrates the ADC Data Out can be coupled to a field programmable gate array interface enabling OI (optical identifier) to contain a representation of machine code to be loaded into a FPGA.

FIG. 1I provides a processor using i2c communications with optical reader.

FIG. 2 shows Memory IOT-Module administers IOT-Things in non-volatile memory.

FIG. 3A shows an IOT-Thing includes a name; a value; an attribute set; a relationship set; and, reference data.

FIG. 3B shows an IOT-Verb includes a representation of reference to an embodiment that the IOT-Machine processor can perform.

FIG. 3C shows an IOT-Verb specification describes the artifacts that the verb can act upon.

FIG. 3D shows an IOT-Verb action is provided by machine code that is loaded into non-volatile memory.

FIG. 3E shows a statement is parsed and bound as types of things in the application domain, such as a verb and artifacts the verb action can act upon.

FIG. 4 shows an IOT-Thing can have a multiplicity of relationships to other IOT-Things.

FIG. 5 shows an IOT-Verb action can select an appropriate IOT-Verb action to perform based on the artifacts that are to be acted upon.

FIG. 6 shows the IOT-System includes processor performable machine code, and non-volatile memory IOT-verb vocabulary includes a multiplicity of IOT-Verbs each having a reference to machine code.

FIG. 7 shows the IOT-Verb named perform has machine code action to set a context in which to perform an action, to select an action to perform, and, to cause performance of said action to perform.

FIG. 8A shows the IOT-Verb action can include a start action, and an end action, which is useful when parsing XML and performing an open tag action, and a corresponding close tag action.

FIG. 8B shows the IOT-Verb action can include additional action to perform based on modifiers.

FIG. 9 shows a first IOT-Module embodied as having a processor, non-volatile memory, and an IOT-System with a first core verb vocabulary, can communication with a second IOT-Module embodied as having a processor, non-volatile memory, and, an IOT-System with a second core verb vocabulary.

FIG. 10 shows an IOT-Task is an IOT-List of IOT-Things describing the steps to perform wherein a step is an IOT-Statement includes an IOT-Verb and a set of IOT-Artifacts.

FIG. 11 shows IOT-Module machine code interacts with Memory IOT-Module machine code to set an IOT-Thing to represent an email message.

FIG. 12 shows a task includes an action block with a sequence of statements.

FIG. 13 shows an action block includes a sequence of statements.

FIG. 14 shows the IOT-Loader loads the Bootstrap machine code into memory and causes performance thereof.

FIG. 15 shows the IOT-System is initialized with a core verb vocabulary.

FIG. 19 shows the execute start performs machine code action including the steps: for each boot state instance, if the instance is not initialized, then perform the boot instance initialization.

FIG. 20 shows the Executive Stop performs machine code actions including the step of: for each boot state instance, if the instance has a termination task, then perform said task.

FIG. 21 shows an IOT-Machine includes an IOT-System and an Optical Reader.

FIG. 22 shows an example URI Form of the EPC URI

FIG. 23 shows The SGTIN EPC General Syntax.

FIG. 24 shows Memory IOT-Module administers a multiplicity of IOT-Things and the relationships between them.

FIG. 25 shows the selection of verb vocabularies for an IOT-Context can be set, depending on the subscriber identifier.

FIG. 26 shows a multiplicity of IOT-Verbs are available for authenticated subscribers.

FIG. 27 shows a different IOT-Verb vocabulary is used for non-subscriber requests.

FIG. 28 shows rules of inference can be registered and used to infer actions to perform.

FIG. 29 shows a multiplicity of NSPI IOT-Machines can communicate.

FIG. 30 shows a perspective view of a mechanical key including the elements in both plan and axial view when the key is inserted into the lock cylinder.

FIG. 31 is a side view of an embodiment of an optical identifier where the rotation of the identifier during reconstruction generates different code pages depending on the angular position of said identifier.

FIG. 32 is a side view of an embodiment where the optical identifiers are laminated into an adhesive label and read in a reflective geometry.

FIG. 33 is a top view of an embodiment where plural identifiers are laminated into an adhesive label and read in a reflective geometry from the top further illustrative of the device of FIG. 32.

FIG. 34 is a cross sectional and plan view of an optical identifier included in a card-type form factor.

FIG. 37 is a plain view of the device of FIG. 36, showing the state of the card and identifier after the destruction mechanism has been triggered.

FIG. 38 is a block diagram of the general operation of an optical identifier that can be destroyed by either an active or passively triggered event.

FIG. 39 is a diagram of a scheme where multiple types of data can be present in the same code page of an optical identifier;

FIG. 40 is a diagram of a scheme where multiple lengths of data segments making up a single code page can be present in the output of an optical identifier in the general case;

FIG. 41 is a plan view of a device combining an optical identifier with another additional identifier in the same device;

FIG. 42 is a plan and cross sectional view of an active photonic device in a card form-factor where the optical identifier is excited by one or more sources within the device.

FIG. 47 illustrates IOT-Thing content.

FIG. 48 illustrates an encoded request:content.body.

FIG. 49 illustrates a formatted request:content.seal.

FIG. 50 illustrates an encoded request:content.seal data.

FIG. 51 illustrates a formatted request:content.

FIG. 52 illustrates a general schematic for an IOT-Machine that provides Certificate Management.

FIG. 53 illustrates a multiplicity of devices communicating using wireless communication protocol.

FIG. 54 illustrates Protection Rings provides scope of verb vocabularies.

FIG. 55 illustrates accessible verb vocabularies in the IOT-Context.

FIG. 56 illustrates the use capabilities to provide scope of accessible verb vocabularies.

FIG. 57 illustrates XML document can be used to convey a request to configure an IOT-Task.

FIG. 58 illustrates an XML document used to convey a request to configure an IOT-Task to satisfy an HTTP GET request.

FIG. 59 is a schematic block diagram of a random data generator under an exemplary embodiment.

FIG. 60 is a schematic block diagram of a digital data encoder under an exemplary embodiment.

FIG. 61 shows an example of a prior art data matrix barcode.

FIG. 79 shows a block of digital data consisting of 256 random characters.

FIG. 80 is a schematic block diagram of a panel generating subsystem.

FIG. 81 shows a block of reconstructed digital data as 10 panels of 25 characters of data.

DETAILED DESCRIPTION

Figure 16:
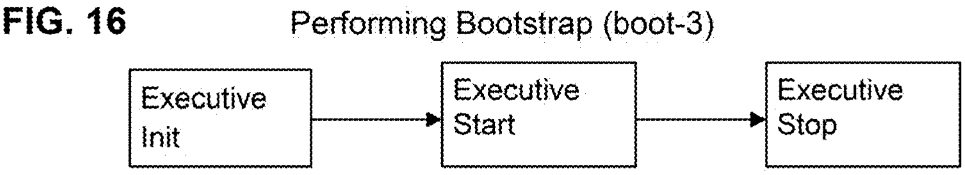
FIG. 16 shows the bootstrap machine code causes performance of the executive initialization machine code, the executive start machine code, and, the executive stop machine code.

The following definitions are useful for interpreting terms applied to features of the embodiments disclosed herein, and are meant only to define elements within the disclosure.

Whereas a "bit" is commonly used to identify a Boolean logical state as being simply "on/off" or "true/false," in the descriptions below it should be understood that a single locus in the reconstructed code page might use alternative methods to encode a non-binary logic state at each location represented at a point in the page image. For example, a single location in a code page might encode more than 2 states through the use of gray-scale intensity based representation or more than one location, thus allowing a single physical address in the code page to represent more than one digital binary bit. By way of further example, by using 4 different intensity scales in a coding scheme, each location in the code page would cease to necessarily encode a single binary bit, but now represent 4 possible states, such as "white, light gray, dark gray, and black." Multiple bits hence can be represented in each location in a code page, or multiple locations could be combined to represent machine codes of longer word length than a single location might contain. An illustrative but non-limiting example of this latter concept would be in the case where a scheme might encode an odd number of states, but it is desired to use two adjacent locations to code for an even number of digital binary bits when the two odd readings are combined into a single even one.

For sake of clear illustration the term "bit" is used throughout this disclosure in its simplest exemplary form of a single digital binary bit, but it must be understood that more complex coding systems are possible allowing more than one digital binary bit to be represented at each addressable location within the reconstructed code page. Other examples of schemes that may be used to represent more than one digital binary bit at each location in a reconstructed code page include finer gradations of intensity-based grayscale, wavelength multiplexing, and/or polarization-based encoding that might represent one or more bits are one or more combinations of polarization vectors formed at a location in that code page when reconstructed by partially or totally coherent light. This simplification for the purpose of illustration does not limit "bit" to being only one single black-or-white spot, or a single digital binary bit, and the term should be construed in the broader understanding a "bit" may be represented in other ways at each location in the code page as illustrated at higher bit densities.

As used herein, a "unique identifier (UID)" refers to a numeric or alphanumeric string that is associated with a single entity within a given system. UIDs make it possible to address that entity, so that it can be accessed and interacted with.

A universally unique identifier (UUID) is a practically unique 128-bit number used to identify information in computer systems, as defined in RFC4122. The main disadvantage of UUID is a performance in relation databases. The main advantage is the uniqueness of the UUID and the ability to use it in a distributed environment. The UUID can uniquely represent a specific resource.

The term "resource" is used in a general sense for whatever might be identified by a resource identifier. A Uniform Resource Identifier (URI) is a compact sequence of characters that identifies an abstract or physical resource. An identifier can be a resource and identify a resource. Examples of a resource include but are not limited to: an electronic document, a video, an image, a source of information, a service, a collection of resources, an abstract concept, and a type of relationship. A resource can be representative of digital data such as but not limited to a key, an offer, an acceptance, a transaction, a contract, an account, biometric data, or biologically based data. A resource can identify a member as an individual, a household, or an organization. A resource can be representative of a good or service, an offer, a consideration, terms, conditions, obligation, competency and capacity, or an acceptance. A resource can represent a single good, or a collection of goods such as a pallet of goods. A resource can describe a role such as that of a producer, shipper, receiver, distributor, wholesaler, retailer, or consumer of a good or service. A resource may be the identity of something that need not necessarily exist or be network accessible such as a person or a physical book.

Per RFC 3986 a Uniform Resource Identifier (URI) is a compact sequence of characters that identifies an abstract or physical resource. Per RFC 8141 a Uniform Resource Name (URN) is a Uniform Resource Identifier (URI) that is assigned under the "urn" URI scheme and a particular URN namespace, with the intent that the URN will be a persistent, location-independent resource identifier. An identifier that provides a means for accessing a resource is called a locator.

A UUID could be encoded in a form factor such as an EMV (Europay, Mastercard and Visa) card, an RFID tag, a NFC tag, or printed on or as a data matrix such as a quick response (QR) Code. It would be subject to the same advantages and disadvantages of the form factor.

As used herein, a Thing Resource Identifier (TRI) encompasses Uniform Resource Identifiers (URI), Uniform Resource Names (URN), Uniform Resource Locators (URL), Internationalized Resource Identifiers (IRI) and Decentralized Identifiers.

As used herein, "P(TM(<function>))" is nomenclature that identifies a process or function, for example, a process represented by executable machine code stored in a non-transitory memory that may be executed by one or more processors, for example by a Thing Machine (TM). Here, <function> is an abbreviation of the function name. The function name can be the identifier of a performable Thing in a graph of Things as managed by a Thing Machine.

Reference will now be made in detail to embodiments of the present invention, examples of which are illustrated in the accompanying drawings. Wherever possible, the same reference numbers are used in the drawings and the description to refer to the same or like parts.

The average American has a multiplicity of identification cards, each issued by a different issuer, such as a birth certificate, a social security card, driver's license, passport, voter registration card, credit and debit cards, insurance card, library card, employee access card, membership card, loyalty card, professional membership or certification card, access document such as a press pass. Other forms of ID include a utility bill. In addition, the average American has to manage a multiplicity of logins and passwords each providing a form of identity.

Embodiments of the present invention provide a uniform, cost effective method and system for using an issued master resource identifier as a resource to algorithmically compute resource identifiers to representative of issuer issued resources such as but not limited to keys, cards, documents and other digital data.

Random Data as Digital Data

The use of random numbers in computer science has been well studied. Embodiments use a large enough set of random data to provide a unique identifier (UID). The same random data is used to compute $n^n$ security keys where n is the number of addressable panels of random data computed using the random data.

A deterministic random bit generator (DRBG) starts with an initial value and algorithmically computes a sequence of random numbers. A hardware random number generator is a device that generates random numbers from a physical process rather than an algorithm.

Machine code can access and interact with a configured device such as/dev/random, /dev/urandom/, /dev/arandom, and potentially/dev/hwrng type device to access a stream of random numbers. Preferably, sufficient entropy is verified in the system prior to computing random numbers.

Pure random data recorded from environmental noise may also be used as a randomly generated noise. For example, the environmental noise source may be atmospheric noise such as that described by the web site http://www.random.org. As another example, the environmental noise is computed as the change in continuous captured images of the environment. A well-known example of this is the images produced capturing a window display with a set of functioning lava lamps. Other examples include using video, where for each video frame a hash key is algorithmically computed to represent pure random data.

Generating Random Data

Referring to FIG. 59, a random data generator module 5925, for example, machine code for a random data generator P(TM(RDG)) 5925 executed by a processor 5920, acts upon an input 5915 from a memory device 5910 representative of a cryptographic key size such as (but not limited) to 1024 bits; the input 5915 from the memory device 5910 is representative of the number of identifiers in the range of possible individual identifiers of a computed string of identifiers referred to as a combination code; and, an output memory 5930 representative of random digital data (RDD) 5935 in memory 5930.

When executed by the processor 5920, the random data generator machine code 5925 performs the steps of accessing and interacting with a configured device 5910 to obtain input data; and algorithmically acting upon input data to compute and output the random digital data 5935. The device 5910 may be, for example, an operating system configured device, a pseudo random number generator device such as /dev/random, a hardware random number generator device, or other such device. Alternatively, the device 5910 can be a digital camera which records an image or a multiplicity of images as image digital data and wherein the machine code 5925 accesses and interacts with an image digital data to algorithmically compute a corresponding hash value. By way of example but not limitation, the machine code 5925 acts upon the digital image data as input to compute and output an SHA512 hash of the digital image data as random digital data.

The output may be encoded as, for example, 86 bytes (or 88 bytes with padding) of base64 encoded data representing the 512 bits of the computed hash key. A larger amount of random digital data can be achieved by repeating execution of the machine code 5925 two or more times and combining its output or by using a hash algorithm whose output size is greater than 512 bits. For example, the processor 5920 may output 2048 bits, 20480 bits, or more random data. Duplicate random digital data can be discarded to ensure there is only one instance of random digital data generated.

Referring to FIG. 60, digital data encoder machine code P(TM(DDE)) 6025 executed by a processor 6020 acts upon a first input sequence 6035 and a second input sequence 6036 in a memory 6030 to algorithmically encode and output encoded digital data EDD 6037. The EDD 6037 may be representative of an issued credential. For example, the credential may include a representation of RDD 5935 (FIG. 59), and/or may the credential may include an identifier representative of a resource representative of RDD 5935 (FIG. 59). As another example, the first input sequence 6035 is the RDD memory 5935 (FIG. 59, and the second input sequence 6036 is digital data such as but not limited an identifier of the issuer, a date of expiration, a date of issuance, a public key, or a public key infrastructure certificate. In some embodiments EDD memory 6037 may include an Issuer Identification Identifier such as an IIN. In other embodiments EDD memory 6037 may be classified as text, a portable data format document, a data matrix, a bitmap, bit pattern, or multimedia digital data.

Figure 62:
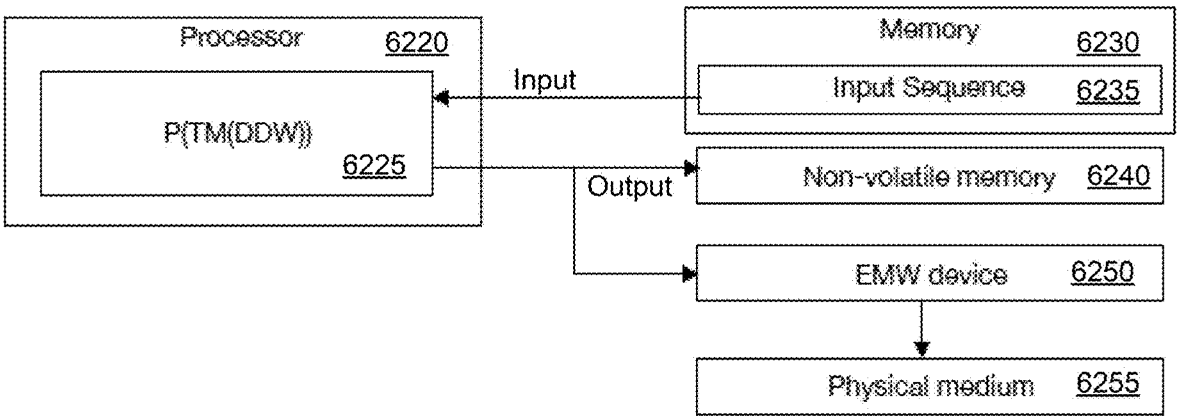
FIG. 62 is a schematic block diagram showing a detail of a digital imager under an exemplary embodiment.

Referring now to FIG. 62, digital imager machine code P(TM(DDW)) 6225, when executed by a processor 6220 acts upon an input sequence 6235 stored in a memory For example, the input sequence 6235 may be RDD memory 5935 (FIG. 59) or EDD memory 6037 (FIG. 60).

The processor 6220 produces as output a representation of the data, for example, to a memory device 6240. By way of example but not limitation, examples of the memory device 6240 include a disk drive, a network addressable storage device, and a web service. Other examples include optical storage devices such as but not limited to holographic memory. The output may be characterized as binary, data, text, or an image such as that of a barcode or QR code 6100 (FIG. 61).

Alternatively, the output representation of the data may be provided to a memory device 6240, such as an electromagnetic waveform (EMW) storage device 6250. By way of example but not limitation, the EMW device 6250 may be a configured storage device, a writer device, or a transmissive device. By way of example but not limitation a writer device can be a printer, a holographic memory (also referred to as an optical identifier) writer, an RFID tag writer, and an NFC Tag writer. A printer can be a two dimensional output printer such as a Brother laser printer. The credential can be printed on a physical media (a form factor) such as but not limited to paper, card stock, printable white sticker paper, Vinyl Self-Adhesive Clear 4.7 mil film, or a transfer film sheet such as but not limited to a heat transfer vinyl sheet. A printer device may be a three dimensional printer such as but not limited to a nano-scale print device. The credential can be 3d printed as a physical form factor.

Still referring to FIG. 62, in yet another example EMW device 6250 may be a transmissive device, such as a wireless or an optical transceiver and a receiving device optimally configured to receive the transmission stores a representation of the credential in memory.

Figure 63:
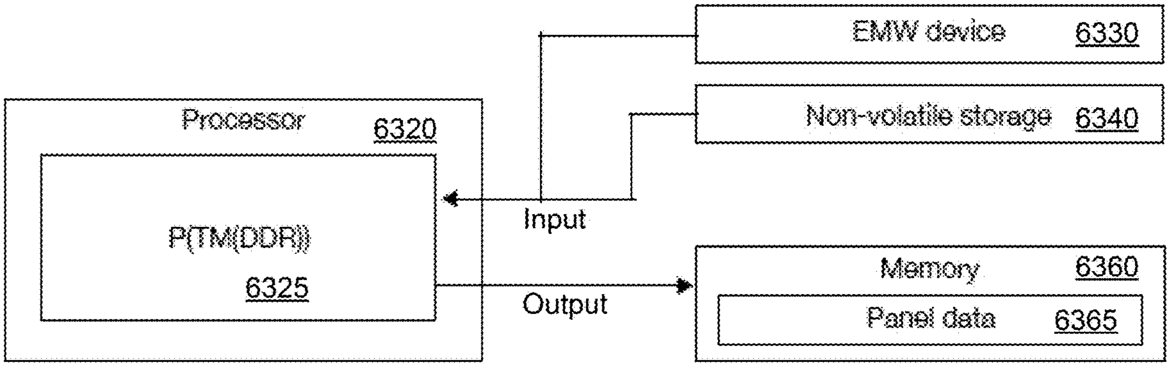
FIG. 63 is a schematic block diagram showing a detail of generation of panel data under an exemplary embodiment.

Referring to FIG. 63, an image reader processor 6320 executes an Encoded Data Reader machine code P(TM(DDR)) 6325 to access and interact with a configured EMW device 6330 to receive a representation of encoded digital data and compute and output to a panel data memory 6360 the corresponding digital data (a credential), namely panel data 6365. For example, the EMW device 6330 may be a receiver device such as but not limited to a first optical infrared transceiver optimally positioned to receive communications from an optical infrared transmissive device. Alternatively, the EMW device 6330 may be a nonvolatile storage device such as but not limited to a disk drive or network addressable storage device.

As another example, EMW device 6330 may be an optical imaging device such as but not limited to a raspberry Pi camera configured for use with a Raspberry Pi 3 processor wherein DDR machine code 6325 enables EMW device 6330 to scan an optimally positioned QR code 6100 and compute its encoded corresponding digital data as panel data 6365. In another example, holographic memory is optimally positioned and illuminated with an illuminating device such as a laser to project an image onto the camera which is activated to capture the optical image and convert the image to electrical signals recorded as digital (panel) data 6365 in the memory 6360.

Figure 64:
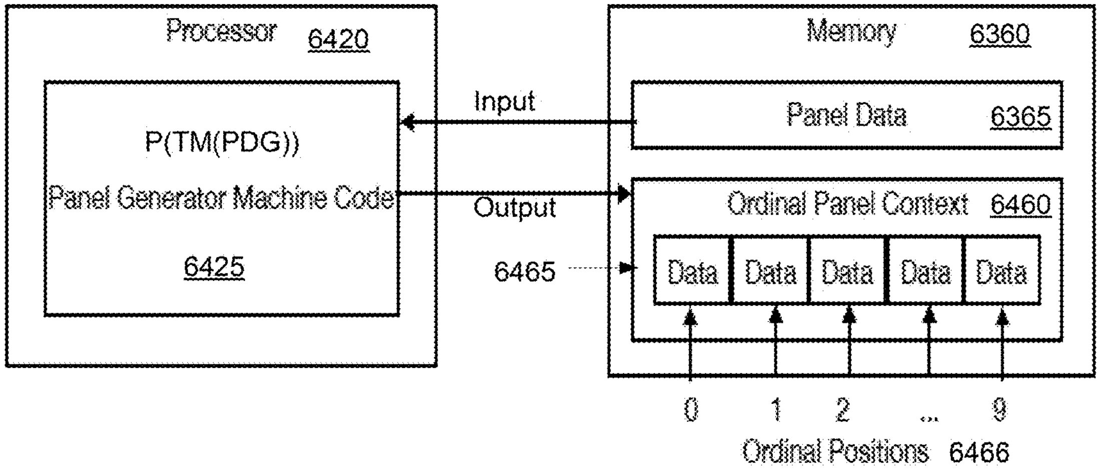
FIG. 64 is a schematic block diagram of a detail of panel generator under an exemplary embodiment.

Referring to FIG. 64, machine code for a panel data generator (PDG) 6425 is executed by a panel data generator processor 6420. The panel data generator processor 6420 receives as input the panel data 6365 stored in the panel data memory 6360. The panel data generator processor 6420 acts upon the input panel data 6365 to partition the input panel data 6365 into a set of panels 6465 each panel of which is addressable by an ordinal position index 6466 relative to a base address in the panel data memory 6360.

Each panel of the set of panels 6465 corresponds to an identifier 6466 or index in an identification or number system. By way of example each ordinal position identifier 6466 could be a letter, a symbol, or the digits in a number system such as panel[0] and panel[1] in a base 2 number system; panel[0] through panel[9] in a base 10 number system; and panel[0] through panel[F] in a base 16 number system. In the embodiment shown in FIG. 64, each panel 6465 represents algorithmically computed data such as but not limited to 2048 bits of digital data. Collectively the ordered set of panels 6465 is referred to as the panel context 6460. The PGD 6425 may act upon an input value to modify the panel generation algorithm, for example but not limitation, to generate a value representative of a desired number of panels or the desired size of each panel.

Computing a Combination Code

Figure 65:
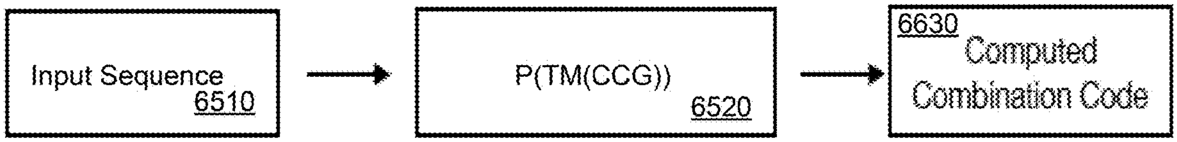
FIG. 65 is a schematic block diagram of a detail of a combination code generator with one input string under an exemplary embodiment.

Referring to FIG. 65, an input string 6510, for example, an input string 6510 in memory is algorithmically acted upon by a combination code generator P(TM(CCG)) 6520, for example, implemented in machine code to output a combination code 6630 including a sequence of identifiers (codes) corresponding to computationally addressable panels 6465 (FIG. 64). For example, a secure hash algorithm 2 such as a SHA512 512 bit hash algorithm may be used to compute combination codes and map the symbols in the hash to the 6465 (FIG. 64) panels.

For example, the number of codes in the combination code 6630 can correlate to the number of addressable panels in the ordered set of panels 6465 (FIG. 64). By way of example, there are two codes for a base 2 number system, ten codes for a base 10 number system, sixteen codes for a base 16 number system, or twenty six codes for an English alphabet identification system. In another alternative embodiment a code can be in a range from a starting symbol to an end symbol such as but not limited to the range 0 through 100, AZ, or 00-FF. The quantity of codes in a combination code can be in a range of 1 through n where n is limited by the algorithm which generated the combination code. By way of example but not limitation the SHA512 hash key can be 128 characters if the hash is in hex, 86 bytes if the hash is base64 encoded or 86 bytes with padding.

Depending upon the implementation of P(TM(CCG)) input information may be representative of an acceptable character set for generating the combination code, a maximum number of codes to be generated, and a set of panels to use within the panel context.

The combination code generator 6520 computes the same combination code for any instance of the same string input 6510. The combination code generator 6520 can be implemented in various forms. By way of example, the input string 6510 for the combination code generator 6520 may be information representative of an acceptable character set for generating the combination code, a maximum number of panels to be considered, a set of constant panels, a set of constant panel ordinal positions 6466, and so on. For example, an acceptable character set may be a set of printable characters with a desired range of symbols, such as 0-9, A-Z, or hexadecimal digits 0-F.

In an embodiment, the combination code generator 6520 computes a hash value and converts the hash value to a string of identifiers within a base number system, such as the digits 0 through 9. The size of the string of identifiers correlates to the number of panels 6465. The same identifier can appear multiple times such as in the string of identifiers 0-0-1-1-2-2-6-7-8-9.

Figure 66:
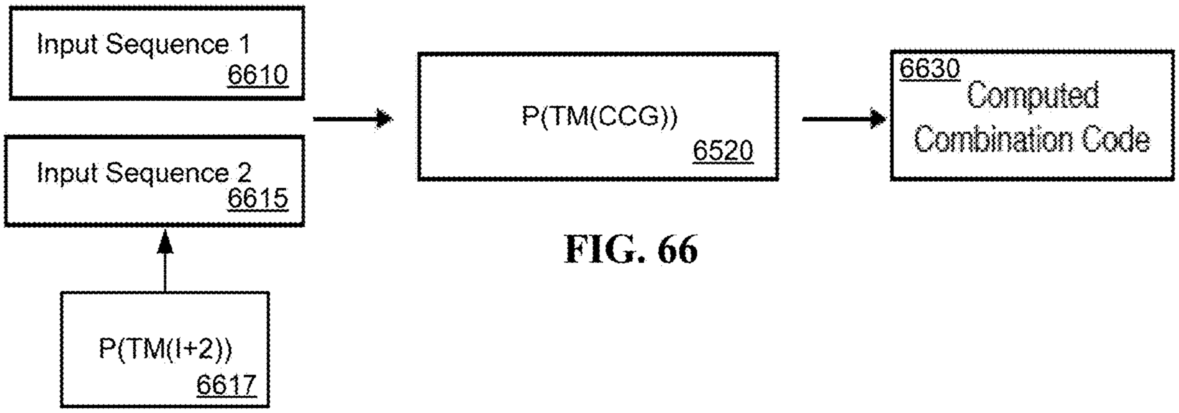
FIG. 66 is a schematic block diagram of a detail of a combination code generator with two input strings under an exemplary embodiment.

Referring to FIG. 66, in another embodiment, the combination code generator P(TM(CCG)) 6520 acts upon input from a first input sequence FIS 6610 and a second input sequence (SIS) 6615, a panel context 6460. This enables a first instance of the combination code generator 6520 to compute and output a combination code distinct from a second instance of the combination code generator 6520 for the same string input.

An input sequence memory 6615 can be set as the output from performing P(TM(i)) machine code 6617. For example, P(TM(i)) machine code 6617 computes and outputs to input sequence memory 6615 a representation of computed data such as but not limited to a Personal Identification Number (PIN) entered on a configured keypad, a biometric based data such as but not limited to fingerprint data, or a biological based input sequence such as but not limited to a DNA sequence.

If a first party and a second party both hash the same input sequence such as the word "PUBLIC" using the same hash algorithm, they will each receive the same combination code. Assuming that each party has different panels of randomizes data, each will have different H-Keys computes even when both used the same initial combination code. The goal is to add entropy to the system so that the first party's generated combination code for the word Public will be different than the second party's combination code for the same word. This is accomplished using two different input sequences: 1) the word Public; and 2) each party's first panel. That will cause the first party's first hash key (used to compute the combination code) to be different than the first key of the second party since their first panels are different.

Computed combination codes 6630 are used for various purposes. For example, a combination code can be used to set/reset the panel context 6460 (i.e., the order in which to position the panels 6465 or references thereto in memory). A combination code 6630 can be used along with the corresponding panels of data to compute a key (H-key).

Computing Hash Key

Figure 67:
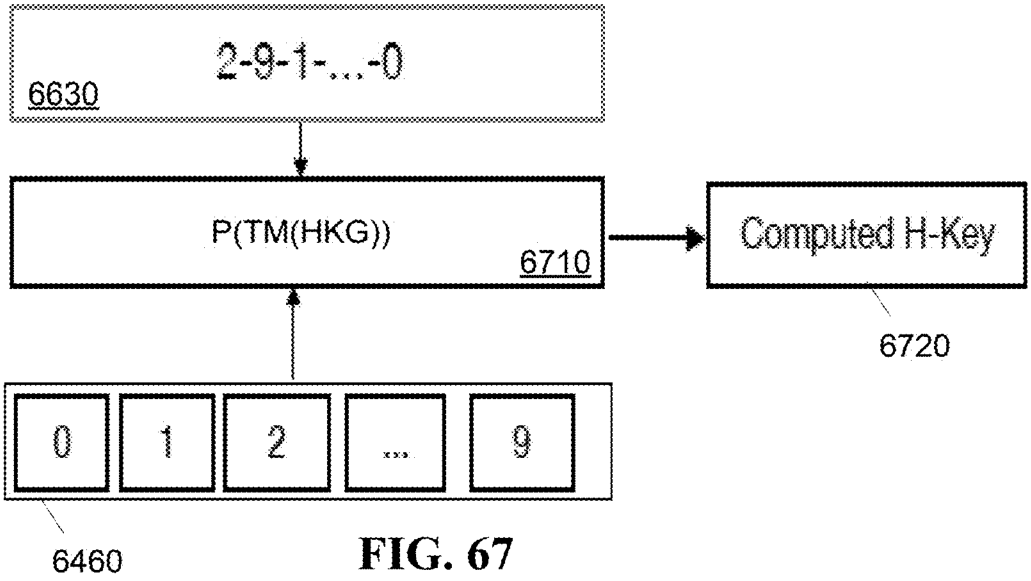
FIG. 67 is a schematic block diagram of a detail of an H-key generator under an exemplary embodiment.

As shown by FIG. 67 the combination code 6630 is used as input to an H-key generator P(TM(HKG)) 6710, for example implemented in machine code, which accesses the corresponding panels in the current panel context 6460 in the order specified by the combination code 6630 to compute and output a computed H-key 6720. For example, the H-key Generator 6710 uses the panel context 6460 to use part or all of the combination code 6630 to seed a secure hash algorithm (SHA) hash key with the content the referenced panels in the order specified by the combination code 6630 to compute the H-key 6720. For example, as shown in FIG. 67 the combination code 6630 begins with 2, 9, 1, . . . , and ends with 0. The H-key Generator 6710 accesses the data found in panel[2], then panel[9], then panel[1], and finally panel[0] of the panel context 6460 to compute via the SHA and thence output the hash key H-Key 6720. Importantly, given the same panel data 6365 and ordering, and the same combination code 6630, then the H-key 6720 computed by the H-key generator 6710 is the same value. This enables an input sequence such as the string "Identifier" to be input to a P(TM(CCG)) 6520 (FIG. 66) whose computed combination code can be input to the P(TM(HKG)) 6710 to output a computed H-Key 6720 that is a global identifier to associate with the random data.

Figure 68:
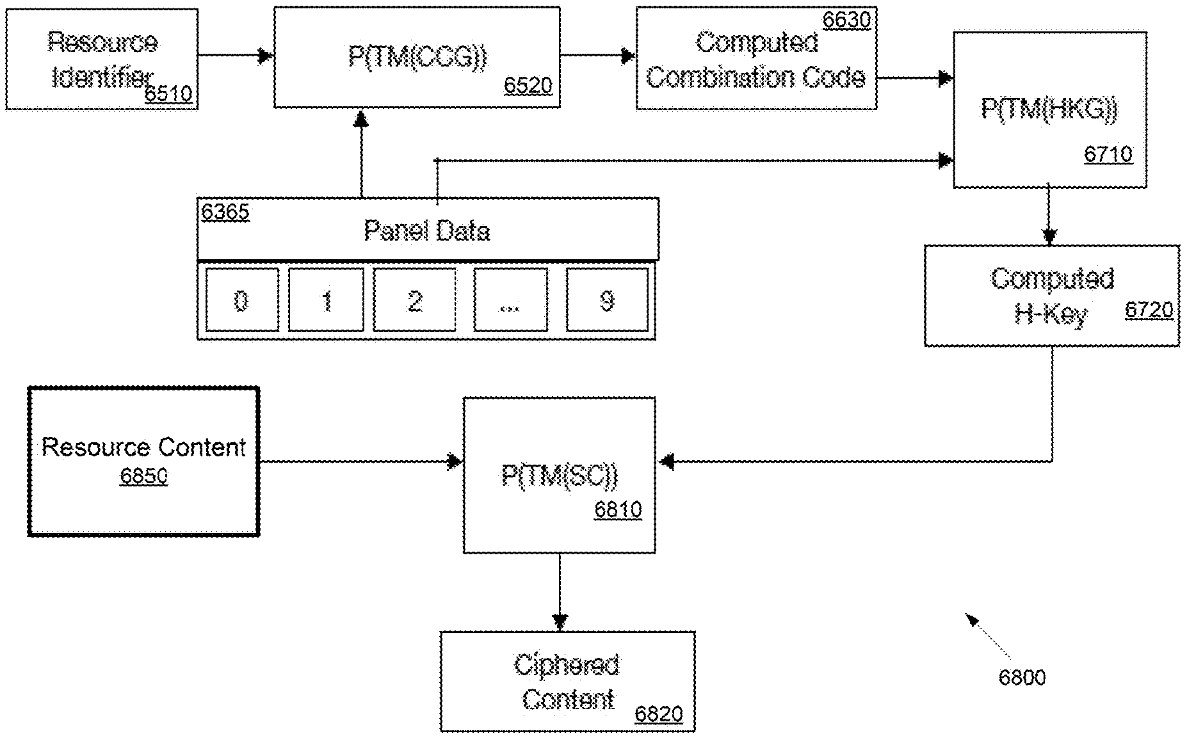
FIG. 68 is a schematic block diagram of a system for encrypting/decrypting a file under an exemplary embodiment.

The above described elements may be used in a system 6800 to encrypt a resource content 6850, such as the contents of a target file. Referring to FIG. 68, the combination code generator P(TM(CCG)) 6520 acts upon an input string 6510, for example resource identifier 6510 such as the file name of the target file 6850, and panel data 6365 as inputs to provide the computed combination code 6630, as described above. The H-key generator P(TM(HKG)) 6710 acts upon the computed combination code 6630 and panel data to provide the computed H-key 6720, as described above. A cipher P(TM(SC)) 6810 such as but not limited to AES256 acts upon the computed H-key 6720 and the resource identifier 6510 as input to cipher the resource content 6510. In this manner unencrypted resource content 6850 can be encrypted as ciphered content output 6820. Similarly, encrypted file content can be decrypted as ciphered content output 6820.

Figure 69:
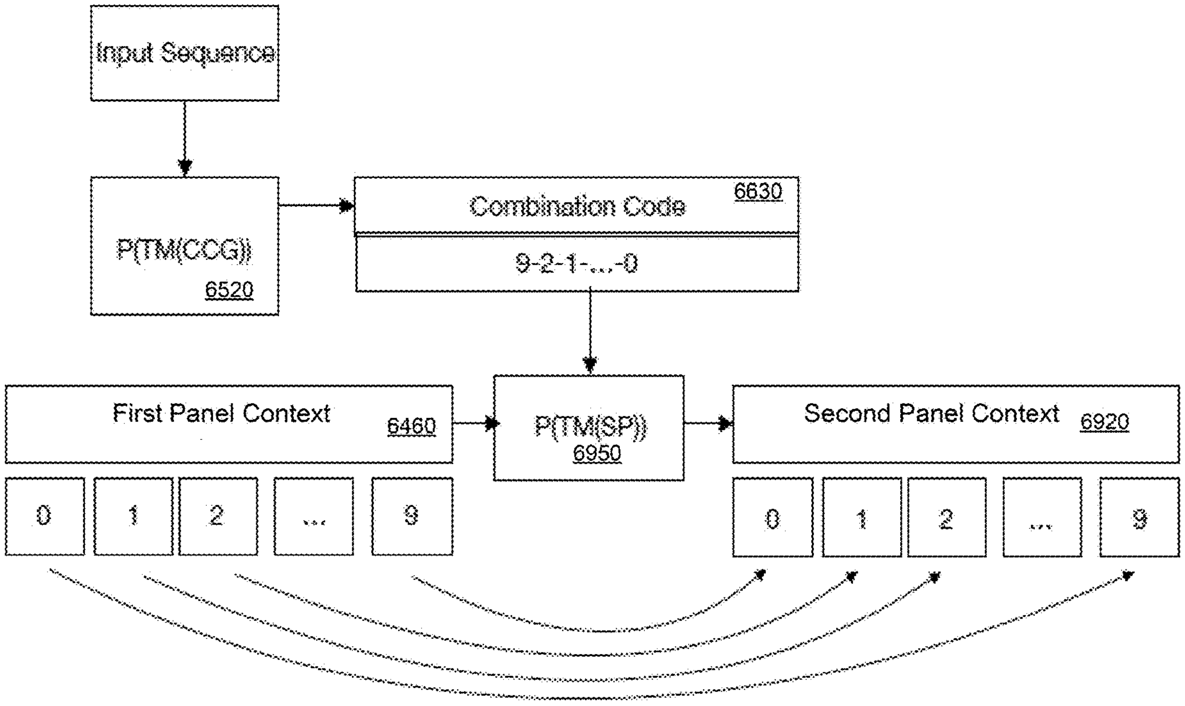
FIG. 69 is a schematic block diagram showing the operation of a set panels module under an exemplary embodiment.

Referring to FIG. 69, the output of the combination code generator P(TM(CCG)) 6520 is the combination code 6630. The combination code 6630 can be acted upon by a set panels module P(TM(SP)) 6950 to reorder the panels of the current panel context 6460 according to the order specified by the combination code. For example, as shown by FIG. 69, the combination code begins with 9, 2, 1, . . . , 0. The set panels module P(TM(SP)) 6950 locates panel[0] in the current panel data context 6460 and places it as panel[9] in the next panel context 6920. It then locates panels[1] in the current context 6460 and places it as panel[2] in the new context 6920. It then locates panel[2] in the current context 6460 and places it as panel[1] in the new context 6920. The set panels module 6950 continues until it finally reaches panel[9] in the current context 6460 and places panel[9] as panel[0] in the new context 6920. Finally, the set panels module P(TM(SP)) 6950 sets the new context 6920 as the current panel context for a subsequent operation.

Figure 70:
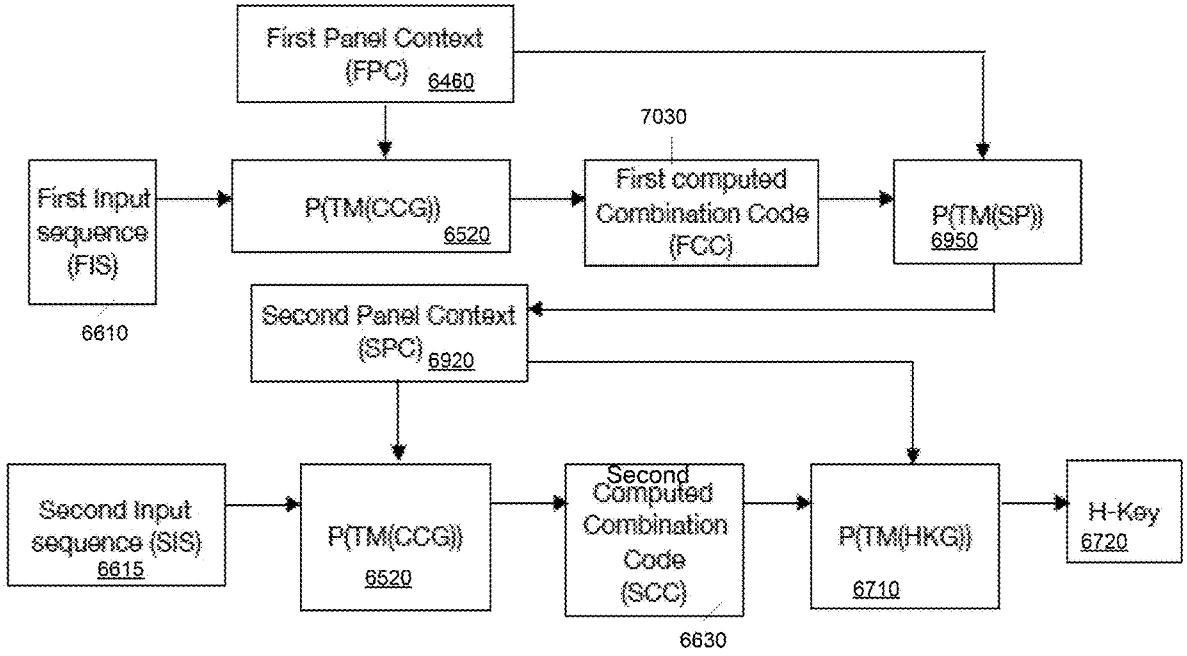
FIG. 70 is a schematic block diagram showing a detail of the Combination Code Generator and H-key Generator under an exemplary embodiment.

As shown by FIG. 70, a first input sequence (FIS) 6610 and a first panel context (FPC) 6460 are inputs to the combination code generator P(TM(CCG)) 6520 to compute and output a first computed combination code (FCC) 7030. The first combination code 7030 is an input to the set panels process P(TM(SP)) 6950 which accesses and interacts with first panel context 6460 to compute and set a second panel context 6920, as described above. A second input sequence (SIS) 6615 and the second panel context (SPC) 6920 are input to the combination code generator P(TM(CCG)) 6520 to compute and output a second combination code (SCC) 6630, as described above. The second combination code 6630 and the second panel context 6920 are input to the H-key Generator P(TM(HKG)) 6710 to access and interact with the panels based on the second computed combination code 6630 to compute and output an H-key 6720 as described above.

Again referring to FIG. 70, FIS memory 6610 is acted upon by P(TM(CCG)) 6520 to compute and set FCC memory 7030. FCC memory 7030 and FPC memory 6460 are acted upon by P(TM(SP)) 6950 to set SPC memory 6920. P(TM(CCG)) 6520 acts upon SIS memory 6615 and SPC memory 6920 to compute and set SCC memory 6630. P(TMHKG)) 6710 acts upon SCC 6630 and SPC 6920 to compute and set H-Key memory 6720. Thus, the value of H-Key 6720 6720 is dependent on a first input stream to set a panel context and a second input stream to compute an H-Key in that context.

In general terms this is expressed as H-Key(C,FIS,SIS) to mean the H-KEY 6720 is computed using the steps of:

1. Acting upon a first input sequence FIS to compute, in a first panel context FPC, a first combination code FCC;
2. Acting upon FCC, in the first panel context FPC, to set a second panel context SPC;
3. Acting upon a second input sequence SIS, in the second panel context SPC, to compute, a second combination code; and,
4. Acting upon SCC in the second panel context SPC, to compute an H-Key memory.

For example ID(C,"PUBLIC","Identity") is understood to be the H-Key memory identified as ID, which was computed using the panel context memory C, the first input sequence "PUBLIC" to set a second panel context, and the input sequence "Identity" to compute the key given as ID within the second panel context.

Figure 71:
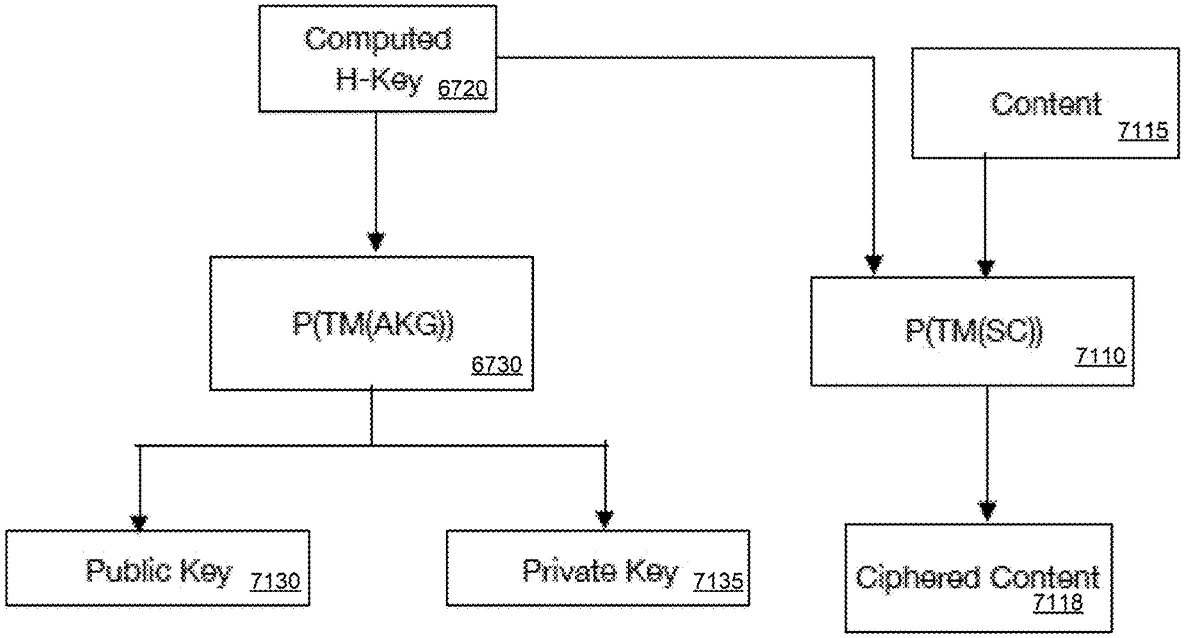
FIG. 71 is a schematic block diagram showing a detail of an asymmetric key generator and a symmetric cipher under an exemplary embodiment.

Referring now to FIG. 71, the computed H-key 6720 can be used as input key to a symmetric cipher P(TM(SC)) 7110 to algorithmically cipher (for example, via AES256) input content 7115 as output ciphered content 7118. Similarly, the computed H-key 6720 can be used as input to seed an asymmetric key generator P(TM(AKG)) 6730 to output an asymmetric key pair (a public key 7130 and a private key 7135).

Figure 72:
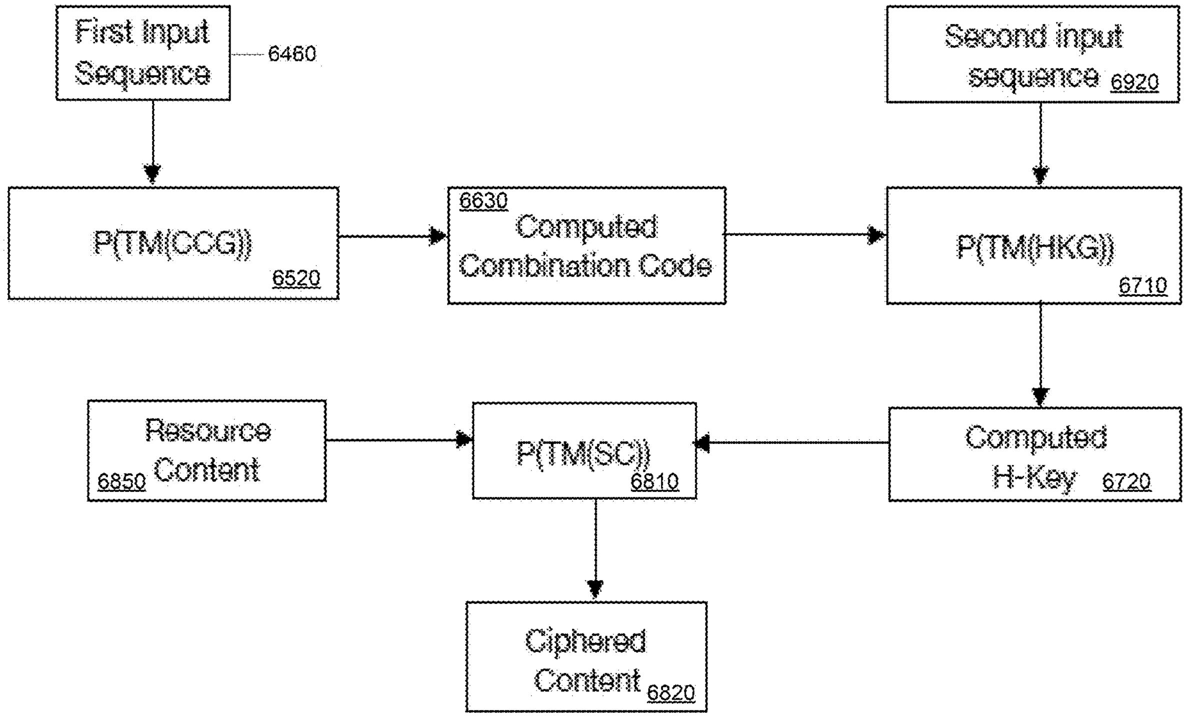
FIG. 72 is a schematic block diagram showing an exemplary combination code generator and H-key generator.

Referring now to FIG. 72, the combination code generator P(TM(CCG)) 6520 acts upon a first panel context 6460 as the input string and outputs the computed combination code 6630 which is used as input to the H-key Generator P(TM (HKG)) 6710 along with a second panel context 6920 to output a computed H-key 6720. The H-key 6720 is acted upon by the cipher P(TM(SC)) 6810 along with the resource content 6850 to compute and output the ciphered content 6820.

Referring again to FIG. 72, ciphered content 6820 is stored in memory such as but not limited to content stored on a decentralized ledger, in a network addressable storage device, on a disk, in holographic memory, in a peer-to-peer file system, or as content that can be provided by a protocol server such as a web server. The first panel context 6460 and the second panel context 6920 can be computed from a first set of random digital data, as described previously. Alternatively, the first panel context 6460 can be computed from a first random digital data set and the second panel context 6920 can be computed from a second random digital data set. Alternatively the H-key generator 6710 can act upon a first random digital data set and a second random digital data set.

Figure 73:
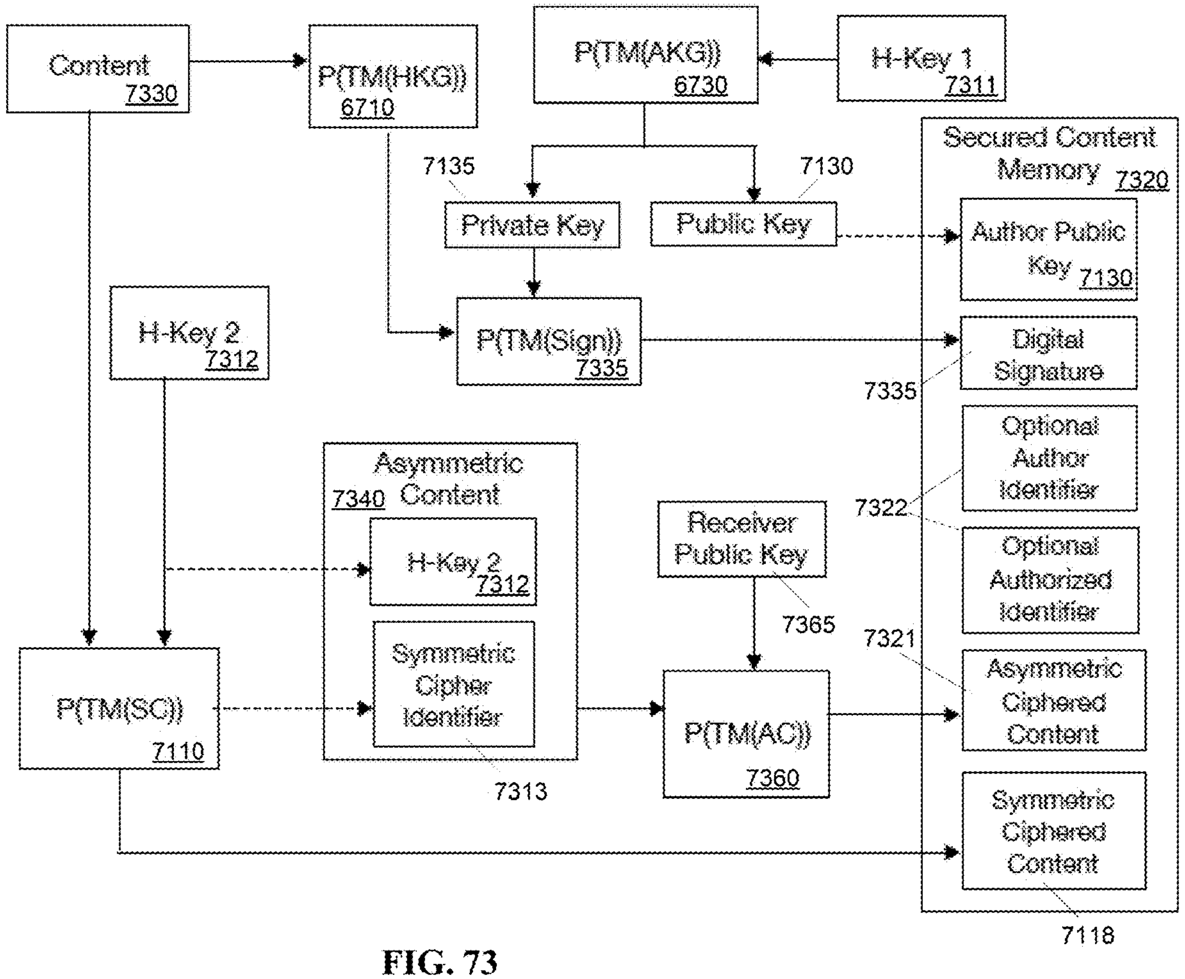
FIG. 73 is a schematic block diagram of a first exemplary system for securing resource content.

Referring to FIG. 73, the asymmetric key generator P(TM(AKG)) 6730 acts upon a first H-key 7311 to compute and output an asymmetric key pair (the private key 7135 and the public key 7130). The public key 7130 is copied to secured content memory 7320 as a first authorized public key 7130. The hash key generator P(TM(HKG)) 6710 acts upon content 7330 to compute and output a digital hash value representative of the content 7330 and the private key 7135 to compute and output a digital signature 7335. A representation of a second H-key 7312 and an identifier 7313 uniquely identifying the symmetric cipher are added to an asymmetric content memory 7340. The symmetric cipher P(TM(SC)) 7110 acts upon the content 7330 and the second H-key 7312 to compute and output the symmetric ciphered content 7118 to the secured content memory 7320. An asymmetric cipher P(TM(AC)) 7360 acts upon a second authorized public key 7365 and asymmetric content memory 7340 to cipher and output asymmetric ciphered content 7321. The second authorized public key 7365 is the public key of a receiver of the encrypted resource 7321.

A set of authorized public keys 7130, 7365 can be used in the embodiment. For each public key in the set of authorized public keys 7130, 7365, the asymmetric cipher 7360 acts upon an authorized public key 7365 and asymmetric content memory 7340 to cipher and output asymmetric ciphered content 7321. Machine code acting upon secured content memory 7320 can encode the memory content for subsequent use. By way of example but not limitation, encoded content can be stored in memory, printed by a printing device, or transmitted by a transmitting device.

Secure encoded content is a resource and a representation its corresponding resource identifier and representation of the globally unique identifier representative of the random data, can be ledgered as an entry in a decentralized ledger such as but not limited to a blockchain. In an embodiment, non-volatile storage can be a peer-to-peer file system such as the Inter Planetary File System (IPFS).

Figure 74:
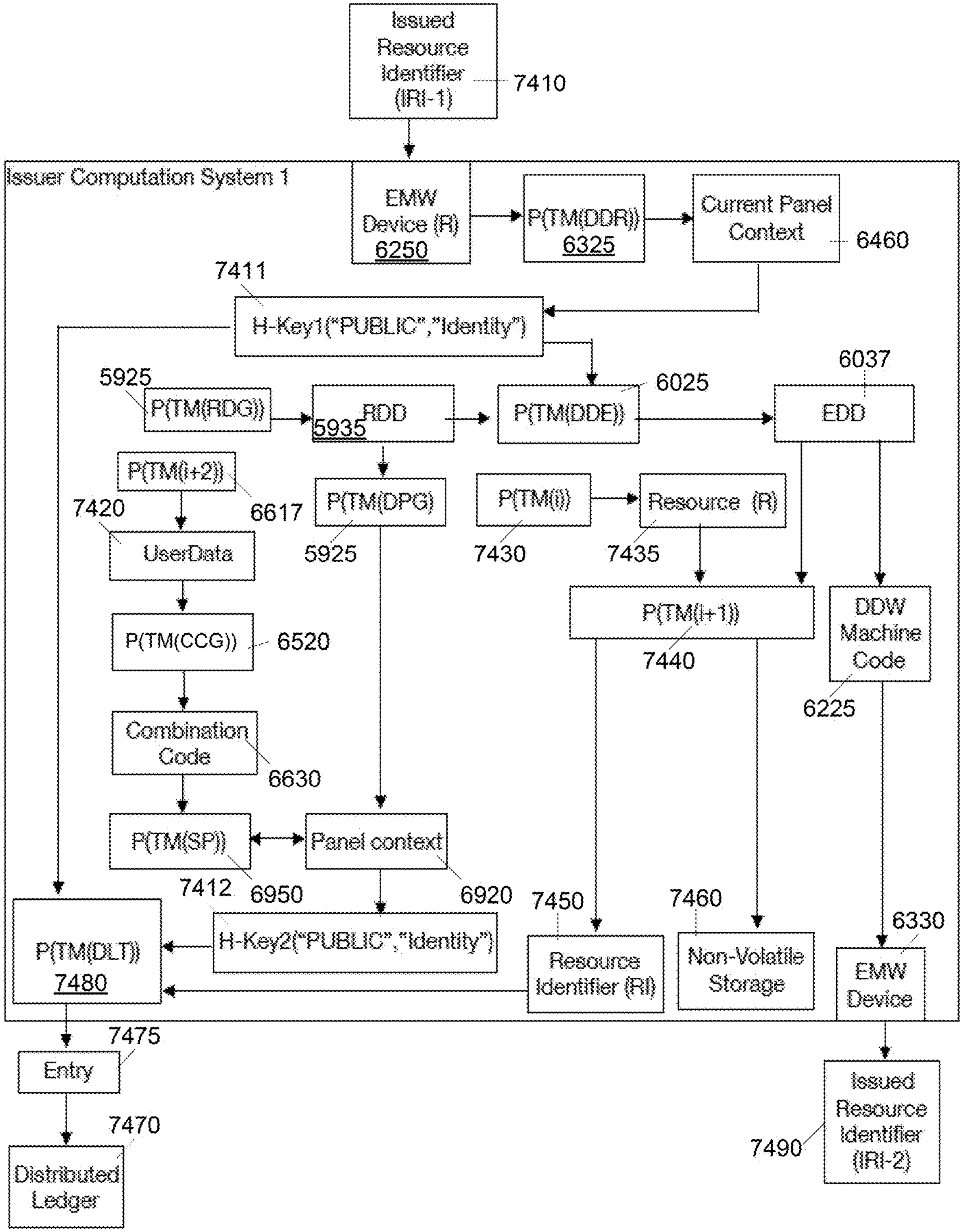
FIG. 74 is a block diagram illustrating an exemplary method for using distributed ledger technology.

Referring to FIG. 74, an issuer of content may perform the following exemplary method:

1. Executing an encoded data reader P(TM(DDR)) 6325 to use a configured electromagnetic waveform device EMW (R) 6250 such as but not limited to a camera or an optical transceiver to receive encoded digital data (EDD) 6037 to compute and set a current panel context 6460;
2. Performing P(TM(SP)) 6950 using first input stream "PUBLIC" to set a new panel context, and performing P(TM(HKG)) using "Identity" SIS input memory and new panel context memory to compute and output H-Key 1 7411;
3. Performing P(TM(RDG)) 5925 to compute and output RDD memory 5935;
4. Performing P(TM(DDE)) to act upon RDD and H-Key 1 memories to compute and output encoded digital data EDD;
5. Performing P(TM(DDW)) 6225 to act upon EDD and EMW device to transmit a representation of EDD 6035 to an EMW device 6330;
6. Performing P(TM(DPG)) 5925 to act upon RDD 5935 to set a panel context;
7. Performing P(TM(SP)) using first input stream "PUBLIC" and using PC2 to set a new panel context (not shown), and performing P(TM(HKG)) using "Identity" SIS input memory and new panel context memory to compute and output H-Key 2 as issued identifier H-Key 2 7412;
8. Performing P(TM(i)) machine code 7430 to output a resource memory 7435;
9. Performing distributed ledger technology P(TM(DLT)) 7480 by acting upon H-Key 2 7412 and resource, and EDD memories 6037 to ledger an entry 7475 associating the Issued Resource Identifier 7450 with a representation of the content in resource memory.

Regarding (1) above, as shown by FIG. 74 an issuer can optimally position a physical media such as a printed data matrix or more specifically a QR code 6100, representative of an encoded issued resource identifier. Alternatively, the physical media may be a holographic memory and EMW Device (R) 6250 includes a powered illumination device, relay switch, processor, and power source so that the processor can control turning the illumination device on and off to optically interrogate holographic memory. EMW Device (R) 6250 further includes a digital camera to the processor, and is positioned to record the image produced by optically interrogating the holographic memory.

Still referring to FIG. 74, DDW machine code 6225 interacts with a EMW device driver machine code 6330 to print a representation of EDD memory as a QR code 6100 onto a physical media such as a piece of printer paper. Similarly, EMW Device (R) is a raspberry pi 3 camera and Issuer computation system 1 is embodied using a Raspberry pi 3 processor configured to interact with Raspberry pi 3 camera. P(TM(DDR)) machine code 6325 is configured to cause the processor to access and interact with the camera to capture an image of the QR code 6100 as image digital data and decode the image digital data as digital data. The digital data is then acted upon to set the current panel context 6460.

Again referring to FIG. 74, the ledger entry 7475 can include a representation or representation of a reference to, one or more of:

a) H-Key 1 7411
b) H-Key 2 7412
c) EDD 6037
d) Time of issuance
e) Time of expiration
f) The URI of the Resource Content
g) The TM of the Resource Content Still referring to FIG. 74, machine code P(TM(i)) 7430 computes and outputs Resource memory 7435 as a representation of a resource to associate with an Issued Resource Identifier (IRI-2) 7490. By way of example, but not limitation, the machine code may output Resource R memory representative of the text from an identification card being issued to the holder, a scanned image of a driver's license, biometric data, an identifier, a DNA sequence, a multimedia resource, an X.509 certificate, an asymmetric key, a good, an offer, a promise, a thing of value, an acceptance, a transaction, a credit, a debit, a financial instrument, a medical record, a contract, a prescription, an invoice, a payment, a bill of sale, a legal document, a transaction, an identification, an authorization, a model, a Thing to be acted upon, a role designated to the holder, an offer, or a digital wallet.

Again referring to FIG. 74, P(TM(i+1)) machine code 7440 acts upon Resource R memory to store a representation of the resource in non-volatile storage 7460 such as a peer-to-peer file system. A resource identifier (RI) 7450 is a reference to the resource 7435 stored in the non-volatile storage 7460. P(TM(i+1)) may also act upon EDD memory 6037 to store a representation of EDD as part of the resource representation stored in non-volatile storage 7460.

Still referring to FIG. 74, P(TM(DLT)) machine code 7480 may act upon issued resource to compute and add a hash key of resource content to the ledger entry 7475. Similarly, the P(TM(DLT)) machine code 7480 can add an identifier representative of the resource content to the entry, such as but not limited to a file name, a URI or a Thing Resource Identifier (TRI) associated with the issued resource stored in non-volatile memory. The process for adding the entry to the distributed ledger 7470 are implementation dependent. One skilled in the art of the distributed ledgering technologies such as the Ethereum Blockchain, the BitCoin blockchain, or the open source HyperLedger will use the necessary APIs to add the entry.

The method of FIG. 74 may further include the use of user provided data to generate the H-Key2. This ensures that even if somebody had access to IRI-2 7490, they still need the user supplied data in order to compute the H-Key2 value 7412. The steps include:

1. Performing P(TM(i+2)) machine code 6617 to compute and output to UserData memory 7420 a representation of user provided data such as—but not limited to a Personal Identification Number (PIN) a user enters on a configured keypad, a biometric based input sequence such as but not limited to fingerprint data, or a biological based input sequence such as but not limited to a DNA sequence;
2. Performing P(TM(CCG)) 6520 to act upon UserData memory 7410 input to compute and output a combination code 6630, and
3. Performing P(TM(SP)) 6950 to act upon combination code memory and panel context to compute and set a panel context.

Figure 75:
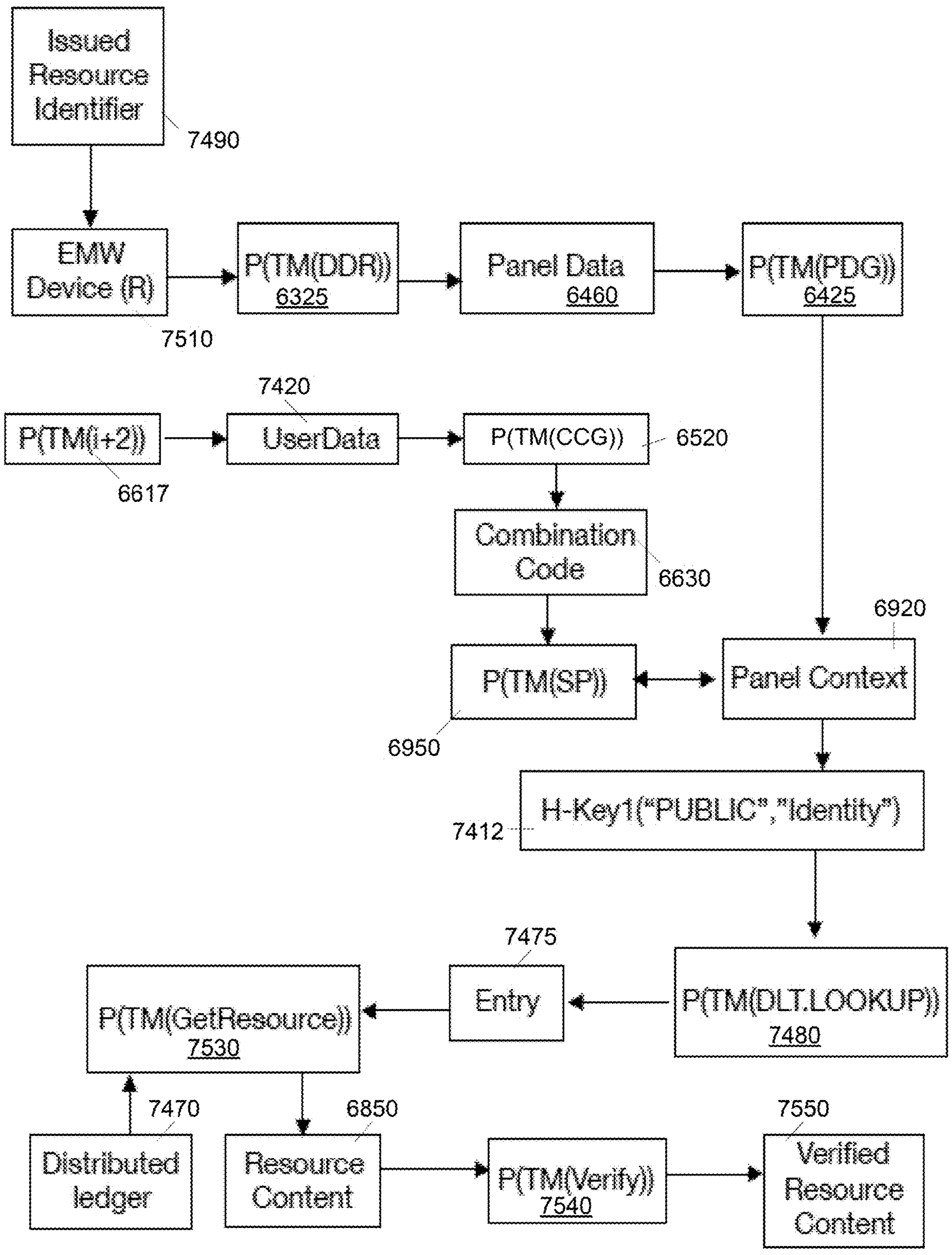
FIG. 75 is a block diagram illustrating an exemplary embodiment of a verifier system.

Now referring to FIG. 75, a holder presents an issued resource identifier to a verifier system EMW device (R) to perform the method of:

1. Executing an encoded data reader P(TM(DDR)) 6325 to interact with an EMW Device (R) 7510 to compute and set a panel data 6365;
2. Performing P(TM(PDG)) 6425 to act upon panel data 6365 to set a panel context 6460;
3. Performing P(TM(SP)) 6950 using FIS "PUBLIC" to set a new panel context 6920, and performing P(TM (HKG)) using SIS "Identity" and new panel context memory 6290 to compute and output H-Key 7412;
4. Performing P(TM(DLT.LOOKUP)) 7530 (see below) to act upon the H-Key 7412 and the distributed ledger 7470 to locate an entry in the distributed ledger 7470 corresponding to the H-Key 7412 and set entry memory 7475 to be representative of the entry in the distributed ledger 7470;
5. Performing P(TM(GetResource)) 7530 (see below) to act upon the entry memory 7475 to compute a corresponding resource identifier identifying resource content 6850 and to receive and set the corresponding resource content memory, and
6. Performing P(TM(Verify)) 7540 (see below) to verify the resource content memory 6850 and output verified resource content 7550.

Referring to (4) above, a resource identifier corresponding to the resource content 6850 can be a reference to a file (resource) in nonvolatile storage, a file managed by a peer-to-peer file system such as but not limited to the InterPlanetary Files System (IPFS), or a Thing Resource Identifier which may be a Uniform Resource Identifier. By way example but not limitation a resource identifier may be a URL. P(TM(GetResource)) 7530 may use one or more protocols such as the Hyper Text Transfer Protocol to receive a representation of the resource content.

Referring to (5) above, the entry memory 7475 may include a computed hash value of the Resource Content (stored hash value). P(TM(Verify)) 7540 computes a hash value of the Resource Content as a computed hash value (not shown), and compares the value to the stored hashed value in the entry memory 7475. The resource content is verified when the computed hash value is equal to the stored hash value in the entry memory 7475. Alternatively, the entry memory 7475 may include a digital signature issued by the issuer of the resource content memory and P(TM(Verify)) 7540 validates the signature. One skilled in the art of Public Key Infrastructure can incorporate the use of X.509 certificates or the equivalent thereof.

Alternatively, the method shown by FIG. 75 may further include the use of user provided data to generate a second H-Key. This ensures that even if somebody had access to IRI-2, they still need the user supplied data in order to compute the H-Key2 value. This may be done, for example, by:

1. Performing P(TM(i+2)) 6617 to compute and output to UserData memory 7420 a representation of user provided data such as but not limited to a Personal Identification Number (PIN) a user enters on a configured keypad, a biometric based input sequence such as but not limited to fingerprint data, or a biological based input sequence such as but not limited to a DNA sequence;
2. Performing P(TM(CCG)) 6520 to act upon UserData memory 7420 input to compute and output a combination code 6630, and
3. Performing P(TM(SP)) 6950 to act upon combination code memory 6630 and panel context 6920 to compute and set a panel context.

Figure 76:
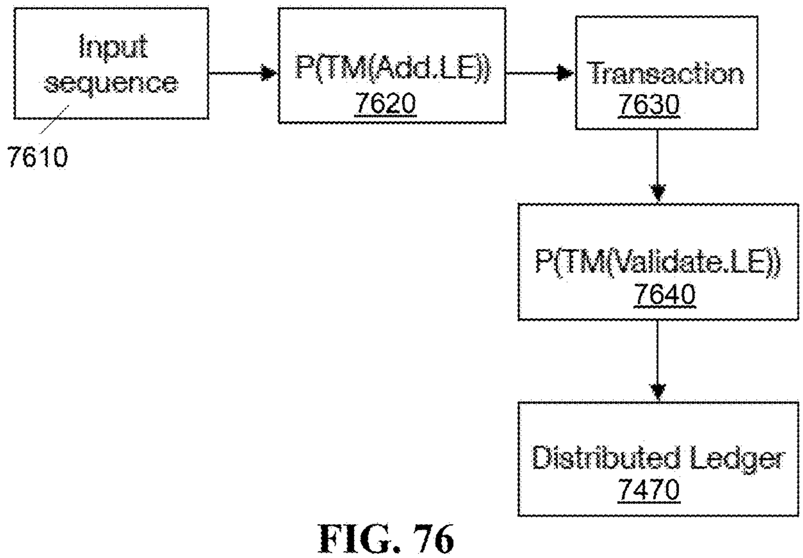
FIG. 76 is a block diagram showing a method for manufacturing resource identifiers.

Referring now to FIG. 76, P(TM(Add.LE)) 7620 acts upon an input sequence 7610 to direct a ledger entry (LE) be added representative of the input. The ledger entry may be made to a distributed ledger 7470 producing a pending transaction and consensus-based validation protocols P(TM (validate.LE)) 7640 are performed to add the entry to the distributed ledger 7470. The ledger entry may contain additional information, such as but not limited to a representation of a reference to a resource, a computed hash value representative of the resource content, the current status of the resource such as but not limited to pending, issued, suspended, renewed, or revoked, and a date such as but not limited to date of issue, date of this transaction, or date of expiration.

In an exemplary use case, an issuer may perform on a private network the steps of:

1. Generating and encrypting a digital representation of a resource as an encrypted resource;
2. Generating and associating a credential with the encrypted resource;
3. Supplying the credential to a holder; and
4. Storing the encrypted resource on a public network.

A verifier may perform on a private network the steps of:

1. Acting upon the supplied credential to identify the encrypted resource on the public network;
2. Retrieving the encrypted resource from the public network;
3. Acting upon the supplied credential and the encrypted resource to decrypt the resource as digital data; and
4. Acting upon the digital data to verify the issued resource.

Figure 77:
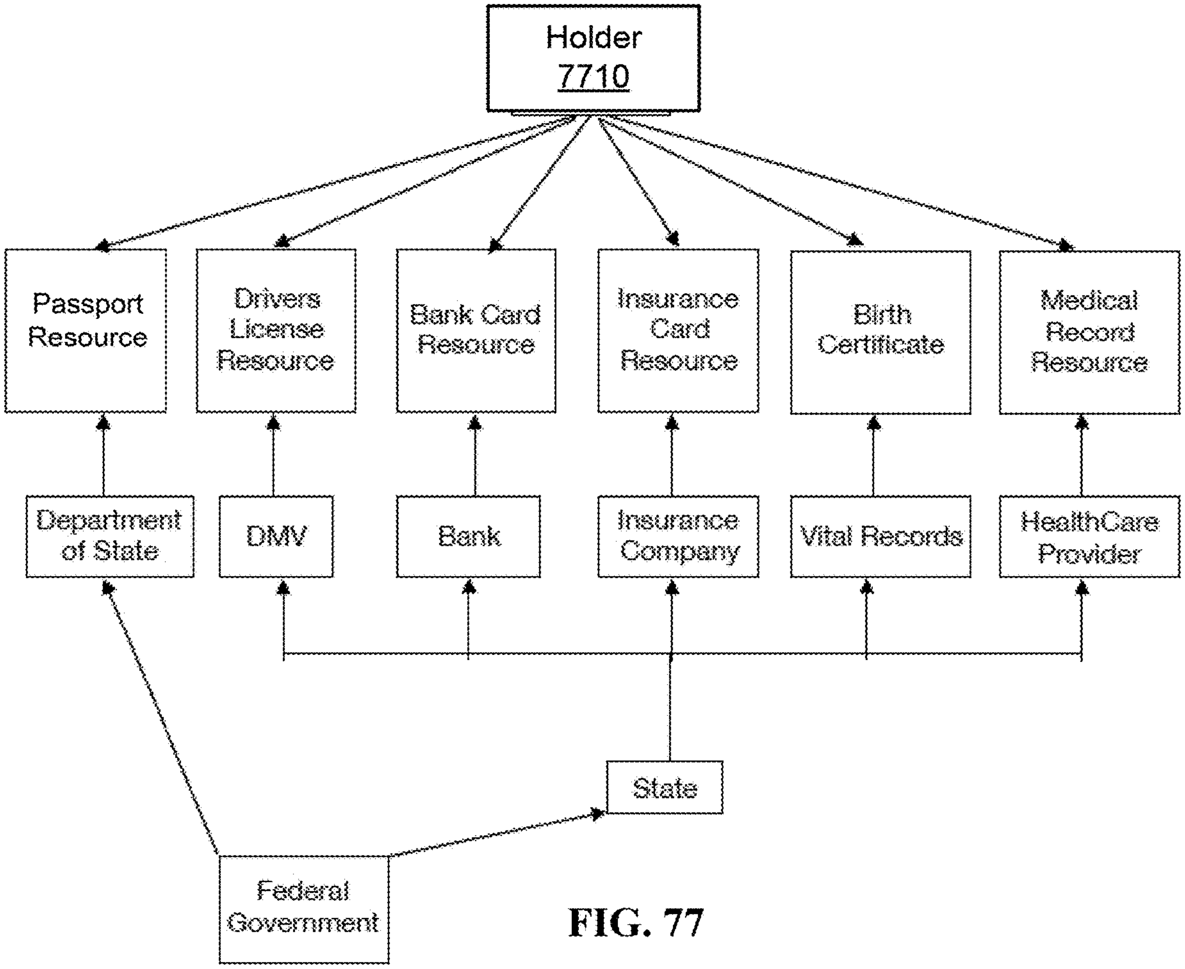
FIG. 77 is a block diagram of system relationships.

Referring to FIG. 77, the Federal Government issues issued a resource identifier (IRI) and authorization resource to the Department of State. The Department of State issues the IRI and an authorization resource to Vital Records. Vital Records issues the IRI and birth certificate resource to a holder 7710. The Department of State issues the IRI and authorization resource to the department of motor vehicles (DMV). The holder 7710 presents the birth certificate and corresponding IRI to DMV which verifies the birth certificate resource and issues the IRI and Driver's License resource.

The holder 7710 presents her driver's license and birth certificate along with corresponding IRIs to the State Department which verifies the issued resources and issues an IRI and passport resource. The holder 7710 presents her passport and corresponding IRI to the bank which verifies the resource and issues IRI and bank card resource The holder can use her issued resources as identity to purchase insurance, and even to secure her medical records issued by her healthcare provider.

Table 1 is a pseudo-code listing for a Thing Machine statement:

TABLE 1

| Statement |
|---|
| The Thing where (<br>ID is equal to H-KEY(IRI-1,"PUBLIC","Profile"),<br>URL is equal to resource:H-KEY(IRI-1,"PUBLIC","Resource"), and<br>Description is equal to "Public Profile"<br>) is declaring that there is a Thing where (<br>ID is equal to H-KEY(IRI-1,"PUBLIC","Profile"),<br>URL is equal to resource:H-KEY(IRI-1,"PUBLIC","Resource"), and<br>Description is equal to "Public Profile"<br>) such that there is a Thing where (<br>ID is equal to H-KEY(IRI-2,"PUBLIC","Identity"),<br>URL is equal to resource:H-KEY(IRI-2,"PUBLIC","Resource"), and<br>Description is equal to "Federal Government issued State issued DMW issued Drivers License"<br>). |

Referring to Table 1, an issued resource can be representative of a statement such as but not limited to a declaration or an assertion describing a relationship between a first identifier and a second identifier. The Issued Resource Identifier associated with the author of the statement can be included in the statement. IRI-1 and IRI-2 are issued resource identifiers. The statement indicates that IRI-1 is making a declaration that IRI-1 qualifies IRI-2. This does not imply IRI-1 is the author of the resource associated with IRI-2. This only implies that IRI-1 is declaring a relationship between IRI-1 and IRI-2.

When used with the teachings of a Thing Machine (see below), the credential, a key, and a resource can be represented as Things in the vocabulary of Things that a Thing Machine can perform as performable actions and Things that a performable action can act upon.

FIG. 79 shows a unit of digital data 7900 having of a sequence of 256 random characters. For example, the unit of digital data 7900 may be stored in holographic memory as a as a code page.

A representation of the digital data is encoded by an encoded data reader P(TM(DDR)) 6325 as an optical label that can be read by an imaging device and processed using error correction until the image can be interpreted. By way of example, but not limitation, a QR code generator may be used to encode the digital data as a QR Code 6100 (FIG. 61). A representation of the unit of digital data may be stored in holographic memory as a code page.

For example, an optical identification system (OIS) controller may extract a unit of digital data 7900 from a code page in holographic memory by (1) enabling, for example, by relay, a laser or LED light source to illuminate the code page in holographic memory as a projected image onto the lens of a camera, (2) activating the camera to capture and store the projected image as image data in memory, and (3) decoding the image data as the reconstructed unit of digital data. Using the QR Code standard, one may encode, for example, 4,296 alphanumeric characters into a QR Code in holographic memory.

Figures 82, 83, 84:
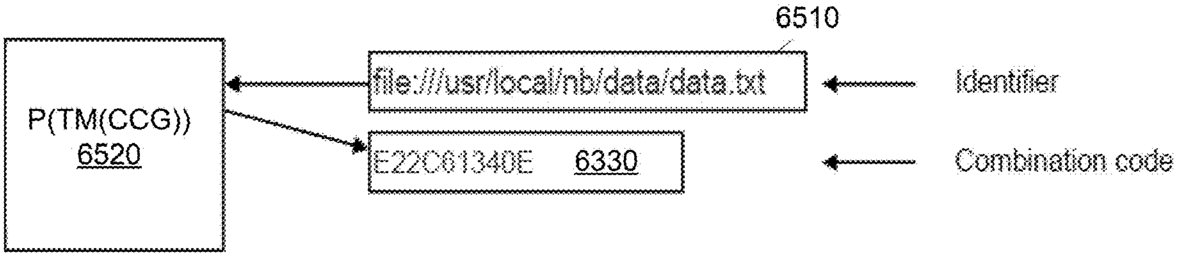
FIG. 82 shows a block of reconstructed digital data as 16 panels of 15 characters of data each.
FIG. 83 is a schematic block diagram of a combination code generating subsystem.
FIG. 84 shows a block of an SHA256 Hash String.

Referring to FIG. 80, a panel generator P(TM(DDR)) 6325 acts upon the reconstructed unit of digital data to generate a number of units of digital data 6365 in memory, each unit referred to as a panel. As shown in FIG. 81, the panel generator P(TM(DDR)) 6325 computes 10 panels of 25 characters, thereby using 250 characters of the reconstructed unit of digital data. Referring to FIG. 82, the panel generator P(TM(DDR)) 6325 computes 16 panels of 15 characters.

Referring to FIG. 83, a combination code generator P(TM(CCG)) 6520 acts upon an identifier 6510 to compute a combination code 6330. Referring to FIG. 84, the combination code generator P(TM(CCG)) 6520 performs a key derivation function to compute a key value, such as but not limited to a SHA256 hash 8400 of the identifier 6510. The key value characters, or a subset thereof, are used as the combination code 6330.

Figures 85, 86, 87:
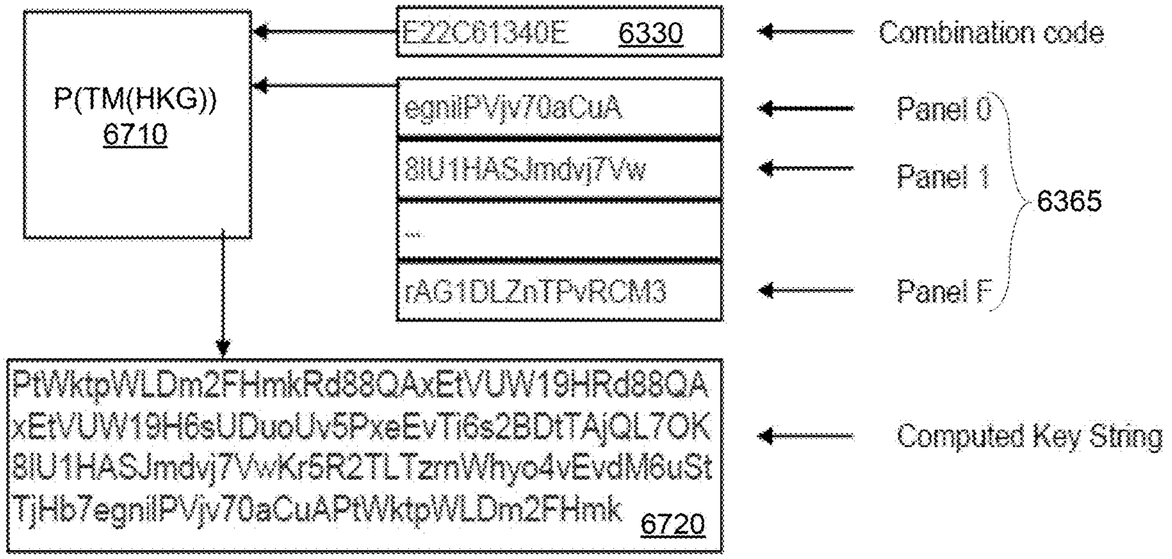
FIG. 85. is a schematic block diagram of a subsystem for computing a key string.
FIG. 86 shows a block of a panel sequence.
FIG. 87 shows a block of a ten panel constructed key string.

Referring to FIG. 85, the hash key generator P(TM (HKG)) 6710 acts upon a 10 digit combination code 6330 and the corresponding panels 6365 to compute a key string 6720. The panels 6365 are accessed according to the ordinal position given by each of the characters of the combination code sequence 6330 to compute the key string 6720.

Figure 88:
FIG. 88 shows of block of an SHA256 hash constructed key string.
Figure 91:
FIG. 91 shows of block of an SHA256 Hash of Personal Identification Number (PIN Code) "1234".

Referring to FIGS. 86-87, the hash key generator P(TM (HKG)) 6710 performs the action of accessing and interacting with the first ten panels 6365 corresponding to a set, or subset thereof such as but not limited to the 4 first 10 characters of the 64 character SHA256 computed combination code sequence to construct the key string 6720, an example of which is shown in FIG. 87. The key string 6720 or a computed value thereof, such as the SHA256 hash 8800 (FIG. 88), can be used as a password (see FIG. 91) to generate a key, or as the key, for use with a cipher algorithm, as shown by FIG. 87.

The key string 6720 may be used as the key of a cipher algorithm to encrypt/decrypt the content of the file given by the file pathname 6510 (FIG. 83). Alternatively, the key string 6720 may be used as a password of a cipher algorithm to encrypt and/or decrypt the content of the file given by the file pathname 6510 (FIG. 83). Similarly, a hash of this key string 6720 may be used as the password of a cipher algorithm to encrypt/decrypt the content of the file given by the file pathname 6510 (FIG. 83). In this manner, the embodiments described above can use holographic memory to generate the same key string value for the same identifier based on a permutation of the panels of random data in memory.

The pathname to a file in computer readable media, such as but not limited to holographic memory, can be used as an identifier to compute a combination code and resulting key string to decrypt the content of the file. The content of the file can include of one or more units of digital data. By way of example, but not limitation, content can be representative of:

1. a sequence of random data;
2. executable machine code;
3. object code that can be dynamically loaded and executed;
4. a password;
5. a cipher key;
6. a public key;
7. a private key;
8. an identifier;
9. an authorization;
10. content to be used in authenticating the representation of an authorization;
11. a Public Key Infrastructure certificate;
12. an X.509 issued certificate;
13. Thing Machine content;
13. an IRI, URI, or Uniform Resource Request;
14. content that can be parsed by a Thing Machine parsing action;
15. performable machine code that can be dynamically loaded as a verb action of a Thing Machine;
16. initialization data, such as but not limited to training data for use in a neural network; and/or 17. a request for a Thing Machine to evaluate in the context of Things in a domain of discourse to compute a performable statement that it can perform.

The data stored in the hologram may be accessed and processed as follows:

1. Accessing and interacting with a first unit of digital data in holographic memory to compute a key string in memory;
2. interacting with a communication bus to load encrypted digital data from computer readable media into memory as encrypted data; and
3. performing a cipher action that accesses and interacts with the key string and encrypted data to decrypt the encrypted data as a second unit of digital data in memory.

The aforementioned action may be further modified by replacing (3) above with a method to verify a checksum as follows:

3a. interacting with a unit of digital data to set a memory to be representative of a precomputed checksum of encrypted data;

3b. computing a checksum of encrypted data in memory as computed checksum;

3c. comparing the precomputed checksum and the computed checksum and if not equal then performing a system shutdown; and 3d. accessing and interacting with a cipher key and encrypted data to decrypt the encrypted data as a unit of digital data memory.

Implemented by a Thing Machine, the second unit of digital data can be representative of content that may be:

1. acted upon as a verb action to parse the content as Things representative of one or more declarative statements;
2. acted upon as an evaluate verb action to evaluate a said statement to compute a performable statement; and,
3. acted on as a verb action to perform the performable statement.

Here, the content may describe a model of definitional knowledge and procedural knowledge. The definitional knowledge describes the Thing being modeled, and the procedural knowledge describes how a Thing Machine can use the Thing being modeled.

The embodiments can be employed to boot a machine from a known state. During the boot processes:

1. Encrypted content may be loaded from computer readable media into memory;
2. a unit of memory representative of a precomputed checksum may be verified to ensure it satisfies a computed checksum of the content;
3. the encrypted content may be decrypted as performable machine code in executable memory; and,
4. the machine code may be executed, for example, by a processor.

A unit of digital data can be used as a "salt" value (as one would understand in the use of cryptography) to salt a random number generator.

A first unit of digital data, referred to as a panel, is a representation of pre-recorded random data. The embodiments described above may use a set of panels wherein the panels are organized in memory and addressable by an identifier, such as an identifier representative of an ordinal position. The number of panels can be representative of the number of digits in a numeral system, such as 10 panels in the decimal base numeral system each address by ordinal position 0 through 9 (16 panels addressable by ordinal positions 0-F in a hexadecimal numeral system). Each panel consists of a distinct representation of data of a predetermined size, such as 2048 bits of random data. Alternative numeral systems can be used such as Tetranonagesimal, Pentano-nagesimal, or others. A reference to a panel, such as panel(i), refers to the panel in the ith ordinal position in non-transitory memory. By way of example panel(3) refers to the panel in the 3rd ordinal position. In hexadecimal panel(A) refers to the panel in the 10th ordinal position.

The following may be used load a multiplicity of panels as units of digital data in memory, encrypt the units of digital data, and then decrypt the digital data on an as-needed basis:

1. Generating a random number may be generated as a cipher key in memory;
2. accessing and interacting with a representation of the cipher key, and a representation of a unit of digital data to encrypt the content of the unit of digital data; and
3. storing a representation of the cipher key in non-transitory computer readable media.

Figure 92:
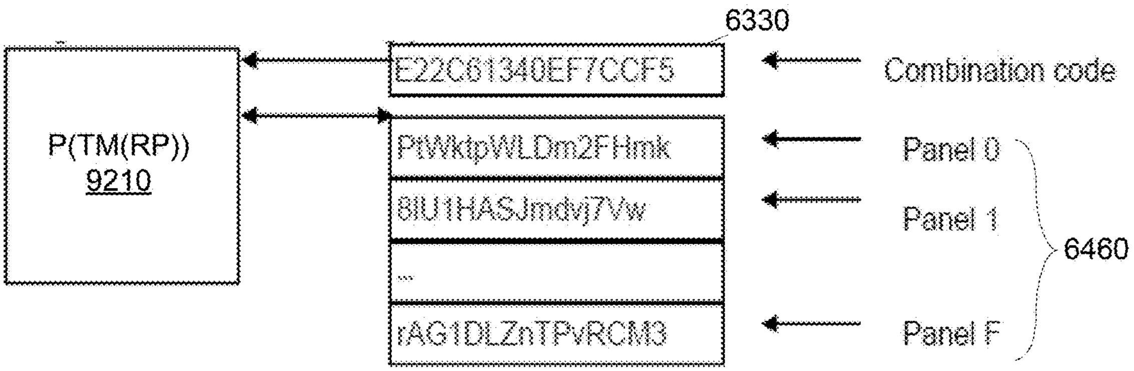
FIG. 92 is a schematic block diagram of a subsystem for reordering panels.

As used herein, a permutation refers to an arrangement of all the members of the set into some sequence or order. The panels of a panel context may be arranged according to a first permutation, wherein an identifier, such as a representation of an ordinal position, can be used to set a panel into the appropriate memory location, for example by a reorder panel function P(TM(RP)) 9210 as shown by FIG. 92. The panels are collectively referred to as first panel set-1. A second permutation may be stored as second panel set-2.

Figure 89:
FIG. 89 shows of block of an SHA256 hash of a boot state string.
Figure 90:
FIG. 90 shows of block of an SHA256 Hash of "runtime state" string.

A representation of the panels may be stored memory according to a second permutation as panel set-2. Panel set-1 and panel set-2 may be independently accessed, or used together. For example, panel set-1 can be used as a control set to set panel set-2. Several permutations can be used, such as using panel set-1 during boot (see FIG. 89), using panel set-2 during initialization, and using a panel set-3 for use during the runtime (see FIG. 90).

A combination code is representative of a panel sequence (see FIG. 86) order and includes a list of ordinal panel positions. For example, the combination code 3-5-1-7 is a combination code indicating panel(3), panel(5), panel(1), and panel(7).

The following generates a combination code in a second memory address from data in a first memory (for example, a character array):

1. A combination code is generated from a first memory array. The memory array may include characters representative of an identifier, such as a file path name, and the action provides:
2. a hash algorithm identifier to generate a combination code in the second memory from the identifier.

The combination code 6630 (FIG. 85) may be a character string. The character string has a length comparable to the numbers of digits in the base numeral system, for example digits 0 thru 9 in a base 10 system, resulting in a combination code 6630 that has a length of 10.

Re-running the same hash algorithm will generate the same combination code 6630 for the same file name input. For example, the first hash algorithm can be implemented as P(TM(CCG)) 6520 wherein the P(TM)) acts upon a Thing representative of a file pathname, and when the file pathname is constant, then P(TM(CCG)) 6520 generates the same combination code 6630.

To generate a unique combination code for a pathname, a unique identifier such as a "salt" value may be used. For example, the salt value may be used to seed the hashing procedure. Alternatively, the salt value may be added to the character array (such as by concatenation), or the salt value may be a unit of digital data.

A permutation may be generated from a combination code. A unit of digital data represents a set of panels addressable by ordinal position. A first identifier may be used to compute the combination code representative of a permutation. The ordinal positions of the combination code may be re-arranged, and the digital data may be re-arranged according to the re-arranged ordinal positions of the combination code. This allows the set of panels to be organized according to a permutation calculated using an identifier representative of the run-level of the machine. By way of example, but not limitation, boot, admin, local, and namespace are exemplary run levels of a Thing machine. Thus, the panels are organized according to a first permutation, and thence can be re-organized according to a second permutation. The organized panels represent a starting point from which a key can be generated according to a combination code.

The panels may be accessed in the order specified by the combination code to generate a cipher key. A memory may be initialized (for example, set to all zero), and for each symbol representative of an ordinal position of the combination code, and the content of the panel corresponding to the symbol of the combination code may be stored in the memory. The panel may be concatenated with the value of a second memory, and an SHA-512 hash may be applied to produce a key value.

An identifier can be representative of panels, and the panels may be organized according to a permutation and generate a combination code used to generate a key. Two machines, each having a representation of the same identifier, and each having adapted electromagnetic waveform communication devices, can communicate as follows:

1. a first machine communicates a combination code to a second machine, and in response thereto, the second machine
   a. receives the combination code;
   b. accesses the combination code and the stored unique identifier to compute a response key; and
   c. returns the response key to the first machine.

In response, the first machine:

1. uses the combination code and the unique identifier to compute a challenge key;
2. receives the response key;
3. terminates communication with second machine if the response key does not match said challenge key. If the response key does match the challenge key, the first machine:
   a. receives a request communicated form machine 2;
   b. evaluates the request in the context of performable actions to compute a performable statement;
   c. generates a response; and
   d. and communicating the response to the second machine.

Using the above embodiments, digital content may be encrypted as file content. For example, a combination code may be used to generate a symmetric key. A cipher encrypts digital data using the symmetric key and stores the encrypted content in memory. A copy of the symmetric key may be generated, for example, using a GID and a file pathname to generate a combination code, and the symmetric key may be used to decrypt the encrypted content. The GID value can be used to associate the GID with additional data. For example, data to be used in a security model having identity, authorization, authentication, and auditing can be associated. An associated data can be stored as file content on a computer readable media device. For example, file content can include:

- Combination code data such as panels of Pure Random data;
- Asymmetric private-public key information;
- Issued PKI certificate enabling security model identity, authentication, and authorization;
- Configuration content;
- Machine code;
- Vocabulary information; and
- Other information used by the system.

In response to a request to digitally sign digital content, 1. digital content is stored in memory;
2. decrypting file content representative of a private key is decrypted;
3. a signing code action uses the private key and digital content to generate digital signature;
4. the private key memory is erased (for example, set to zero); and
5. a response representative of said digital signature is transmitted.

In response to receiving a request to verify a first digital signature of digital content:

1. digital content memory is set;
2. the digital signature is set in memory;
3. file content representative of a private key is decrypted;
4. the digital signature is verified using the private key, digital content, and digital signature;
5. the private key value is overwritten with zeros; and
6. a response representative of validity of the digital signature is transmitted.

Similar approaches may be used to work with digitally signed certificates. OpenSSL commands (available from https://www.openssl.org) may be used to issue a certificate, validate a certificate, revoke a certificate, list revoked certificates, provide information about issued certificates and their validity, encrypt content, decrypt content, encode content, and decode content.

A first memory representative of a unit of digital data of a first OI code page, and a second unit of digital data from a second OI code page may be used to compute a key. This creates a cipher key using digital data from two separate optical identifiers to encrypt content as encrypted content which can be stored in computer readable media. To subsequently decrypt said content, both optical identifiers may be interrogated in order to generate the same units of digital data to compute the cipher key to decrypt the encrypted content.

An OIS processor may announce its identity, for example, on a network, by communicating its public key and receiving a response including an encrypted header and encrypted content. Using a corresponding asymmetric private key, the processor decrypts the header which contains a cipher service identifier and a cipher key, to decrypt the encrypted content. For example:

1. a public key in accessed from memory;
2. the public key is transmitted;
3. communication response is received including an encrypted header and an encrypted content;
4. a private key is used to decrypt the encrypted header. The decrypted header includes a representation of a stored cipher and cipher key;
5. the encrypted content is decrypted as a response that includes a representation of a public key; and,
6. the public key is recorded.

An OIS processor can receive a request, such as a request to register an identifier and public key. For example, 1. a request is received including an encrypted header component and an encrypted body content component;

2. a private key is used to decrypt the encrypted header. The decrypted header includes a representation of a cipher identifier and a representation of a cipher key;
3. a cipher uses the cipher key to decrypt the encrypted body content as a request to evaluate;
4. the request is evaluated in the context of performable actions to generate a performable statement;
5. the performable statement is performed to generate a response;
6. a random key is generated;
7. a cipher uses the of random key encrypt the response using a cipher algorithm;
8. the random key and a representation of the cipher algorithm (cipher identifier) are stored in memory as a header;
9. an asymmetric public key is used to encrypt the header; and,
10. the encrypted header and a representation of the encrypted content are communicated to a receiving entity.

In this manner, the OIS can be responsive to a request to register a unique identifier and a corresponding public key. In a subsequent request, the communicated content can be encrypted and thence decrypted by the OIS processor.

There are many other applications for the embodiments described above. For example, an issuer can associate a QR code 6100 with a resource issued by an issuing entity (an issuer issued resource). Similarly, a producer can associate a QR code 6100 with a good. Such a QR code 6100 may be printed upon a physical media, for example, an Avery22825 Easy Peel Laser/Inkjet Specialty Label. The printed QR code 6100 on the physical media encodes a first panel data 6365. The first panel data 6365 may be computed from, for example an identifier (e.g., filename or title) that identifies an issuer issued resource. The issuer issued resource may be, for example, a recording of digital data resource 6850, such as, but not limited to digitized text, audio and/or video. The physical media (e.g., the sticker), may then be applied to the corresponding issuer issued resource.

In another example, a QR code 6100 that encodes panel data 6365 may be physically stored in a first physical media, such as a hologram in an optical identifier. The panel data 6365 may encode a resource identifier, where the resource is an issuer issued resource. Digital data representative of an issuer issued resource may be recorded as a first digital resource identified by an identifier computationally derived using the panel data 6365. The first physical media may be applied to a corresponding issuer issued resource. An issuer can further use a first panel context 6460 to compute a second panel context 6920, for example via a set panels module P(TM(SP)) 6950 (FIG. 69), where both the first panel context 6460 and the second panel context 6950 are derived from the panel data 6365. Digital data representative of a second issuer issued resource may be recorded as a second digital resource identified by an identifier computationally derived using the panel data 6365. A unique Quick Response (QR) code which encodes a representation of the second panel context 6950 may be stored in a second physical media.

The first physical media (an optical identifier in this example) can be optically interrogated to render the holographic image onto a camera lens of a processor controlled camera. The second physical media can be ink jet printer media such as but not limited to an Avery22825 Easy Peel Laser/Inkjet Specialty Label. The QR code 6100 on the second media can be scanned, for example with a smart phone QR code reading application.

In this sense, the first panel data can be used to computationally produce an asymmetric key pair 7130, 7135 (see FIG. 71). A first key 7130 of the key pair can be used to computationally generate a digital signature of a representation of the second digital resource. The second key 7135 can be registered with an online web service. The digital signature can be included as a component of the second digital resource.

A smart phone with a camera, such as the Apple iPhone X, can be used to optically scan the QR code and generate the panel data. The panel data 6365 may be used to compute a resource identifier. A representation of the second resource and a representation of the second key may be requested and received using a configured electromagnetic waveform device 6330 (FIG. 63) as described above. The digital signature of the second resource may be verified by presenting a representation of the second resource to a verifier 7540 (see FIG. 75).

This allows a multiplicity of resources to be identified and validated using a first panel context 6460. As a result, a single stored panel context 6460, for example, a panel context 6460 stored in a QR code 6100, may be used to identify thousands, millions, or even billions of resources. In comparison, previously a given QR code has typically been used to identify only a single item. For example, the first resource can be representative of private or confidential information related to the issued resource, and the second resource can be representative of public information related to the issued resource.

The resource identified by a resource identifier may be computed using panel data encoded in a data matrix such as a QR code 6100 on a print media such as paper, card stock, and packaging, can be a read-only resource. Alternatively, the resource identified by a resource identifier may be computed using panel data encoded in an optical identifier can be a read-write resource. The read-write resource may be updated by representing a relationship to a second resource such as by declaring that there is a first resource such that there is second resource.

An optical identifier manufacturer can interrogate and register a representation of the panel context encoded in an optical identifier in a data store. This can include a set of identifiers computed using the panel context such as that of an identifier, an asymmetric key, a serial number, and so on. The manufacturer can provide a web service to verify an optical identifier. In response to receiving a request to validate an identifier, the web service provides a response indicating if the identifier is registered in the data store. To prevent unauthorized access, the manufacturer can provision an optical identifier to a client. Provisioning records a set of computed identifiers and at least one asymmetric key computed using the panel context encoded in the optical identifier. Update and verification requests received by the web service from a client include the computed identifier and are digitally signed using the corresponding private key. The web service locates the record in the data store, validates the digital signature of the request, and then performs the verify service.

Described embodiments herein may overcome the limitations of US Patent Publication No. 2006/0265508 on the use of a namespace as a named service directory having zero or more entities, wherein an entity has a name and an optional value and may include composite members with each composite member being an entity.

A unified IOT-System uses a Memory IOT-Module enabling a machine to administer representations of IOT-Things and the relationships between them, to enable a self-directed assembly of machine performable IOT-Module embodiments that may be mechanical, electronic, and or optical. For example, an IOT-Thing can be an IOT-Namespace, such that there can be a second distinct IOT-Namespace.

Part of the IOT-System includes the use of an optical identifier. Conventional optical identifiers such as bar codes are greatly limited in how much information they can store. Moreover, they are limited in terms of the geometries in which that data can be optically reconstructed and read out. Additionally what are often termed "holographic identifier" labels are actually not holograms at all, but simply embossed lenticular image stickers. Where these stickers are difficult to copy, they carry little or no identification data other than a quantitative image that changes with perspective, and thus no quantified digital data.

Embodiments aim to combine one or more identifiers including at least one that encodes digital identification data such that a rich number of data pages, form-factors and both one-time and multi-use embodiments are enabled. These optical identifiers can thus be combined with other well-known identifiers to imbue them with rich highly secure data.

These embodiments described above may generally combine similar elements to produce a holographically recorded identifier that contains data: 1. A coherent light source is provided, and its output split into a signal and reference beam; 2. The signal beam is modulated in either frequency or amplitude to encode the datagram desired to be stored in the holographic recording medium; 3. That signal beam is interfered with the reference beam to generate a pattern of index modulation within the holographic recording material, and 4. That holographic recording material contains a representation of the data stored within it as modulation in the phase of the light when it is later illuminated with a partially or completely coherent reconstruction beam. Thus the data stored within the hologram can be reconstructed at a later time. It is these novel and unique methods of reconstruction, and the use of said data in the unique IOT-system as an optical identifier, that are used to enable the embodiments.

An optical identifier includes a phase-based optical data storage medium optionally with one or more other optical, mechanical, and/or electronic identifiers. This identifier includes data that can be used to uniquely identify a person, place, thing, desired action, or service. Additionally the instructions on how to perform a particular service or action can be further described in a part of the optical storage media. These segments can contain random or structured data in different length segments as required for a given application. The identifier uses digital data stored in the phase of the recording media that when illuminated under certain angles, wavelengths, polarization states or 3D orientations will reconstruct the recorded data. These identifiers can be made in many different form factors such as ID cards, mechanical tumbler keys, SIM cards, clothing tags, adhesive labels, or may be embedded discretely in some other object.

The identifiers are recorded in many different types of media depending on the desired properties of the physical embodiment of the identifier in an application. For example, recording media such as doped glass fibers may be diced into beads each holding a quanta of identifying data. Other examples of media the identifier may be formed from include sensitized bulk polymer glasses, re-writeable holographic data storage media, poly-methyl methacrylate or other acrylic glasses or photoresists. The recording processes for each of these exemplary materials are known in the art.

In some embodiments the identifier may be rewriteable in whole or in part based on the type of media used to create the identifier and/or how it was recorded with data. In other embodiments the identifier may be physically destroyed after use rendering it a one-time identifier such as would be used in a transaction. The event that triggers this destruction may be active or passive, and the method of destruction can be physical, optical, thermal, or chemical in nature.

Finally both reflection and transmission geometries can be used to read the identifier, and it may be affixed to a surface as a label or viewed in transmission to create the code pages that hold the data in bit map form. A given identifier may contain more than one set of data via multiplexing in angle, rotation about the incident beam (e.g. peristrophic), wavelength, polarization state, among other methods known in the art.

An important quality of all optical identifiers is that they have a thickness parameter. This thickness is not simply the physical thickness of the identifier material, nor that of the grating grooves itself but represents the true optical thickness of the identifier. As detailed in Kogelnik's approximate coupled wave approximation this quality parameter also known as the Q-parameter is given by Eq. 1:

$$Q=2(\pi*\lambda*d)/(n*T^2) \quad \text{(Eq. 1)}$$

Where Q is the quality parameter, λ is the wavelength of light used to illuminate the identifier, n is the bulk index of refraction of the optical material used to form the identifier, and T is the average pitch of the features used to encode the data in the identifier as averaged over the entire identifier's optically active region.

For example, based on the above parameter it is evinced that as the depth d of the identifier approaches zero, so too does the quality parameter Q based on the relationship recounted by Kogelnik (1969.) This represents the case of an embossed identifier as is known in the art, such as a stamped grating-type identifier sometimes also referred to as an embossed hologram. As the thickness of the optical identifier in these cases previously known in the art approaches zero, the Q-parameter approaches zero and the identifier meets the classical criterion of being 'thin' in the parlance of Kogelnik.

In another example, a thin glass fiber doped with a narrow core of photosensitive material is illuminated in the infrared regime, such as at a wavelength of 1 micron. This is similar to the VeraCode identifiers used to encode a barcode made by Illumina, where the bead only bears a very thin (~a wavelength) thick optically active core that stores information; the remainder of the bead is inert and carry's no data, and hence is not used in determining the depth parameter d for these identifiers. As the wavelength and depth parameter are approximately equal, the value of Q approaches a value less than 10, and can be as little as 1 thus indicating a thin optical identifier is present. The physical thickness of the bead in diameter is irrelevant; it is the optically active depth that is used to compute the quality parameter.

Although in the above examples the optical identifier is holographic in nature, the same Q-parameter describes the behavior of other types of optical identifiers including those presented by LCD or OLED screens that have significant depth at the wavelength used to perform the identification action. The selectivity, amount of data potentially stored, and range of acceptable interrogation angles is defined by the same quality parameter described for holographic identifiers as detailed above.

In this manner the quality parameter Q can be used to differentiate classes of optical identifiers from one another in a way that also describes in a single value their range of behaviors. This behavioral aspect is well described not only in Kogelnik's approximate coupled-wave treatment but other more complex treatments such as the rigorous coupled wave analysis of Moharam and Gaylord (1983.)

Another element of the embodiments seek to overcome limitations found in US Patent Publication No. 2006/0265508, and hereinafter referred to as the '508 publication. The '508 publication provides a user centric distributed Namespace Management System. A network namespace root service provides authentication service to authenticate an active namespace provider service which in turn can provision and provide authentication to user subscribers. As per the '508 publication:

After providing the required subscription information, the subscriber submits the subscription information as a subscription request, and this is communicated using the HTTP POST command to a DNN service provider service which validates the request, and upon success registers the user as a subscriber and assigns a DNN listing to the subscriber.

The embodiments described above enable a device to use a representation of digital data encoded in an optical identifier as an identifier in subscribing to an active namespace provider service, thus eliminating the need for the subscriber to assign the DNN listing. This provides backward compatibility with the '508 publication Namespace Management System.

In the '508 publication, each Namespace Management System participating in a Dynamic Network Namespace is required to have at least one associated dynamic network namespace listing:

A multiplicity of Namespace Management Systems can register services, provide services, discover-,services, communicate with services, and participate in one or more Dynamic Network Namespaces (DNN), with each Namespace Management System having at least one associated dynamic network namespace listing.

In contrast, in the above embodiments devices may derive their identity from the digital data encoded in an optical identifier and thus do not require a DNN listing.

The '508 publication disclosed a dynamic namespace system with listings representative of entities organized around a distributed hierarchical service directory namespace.

In the instant invention the IOT-Memory Module provides a set of actions to administer named representations of data, and the relationships between them, as IOT-Things in non-transitory memory, according to the IOT-Class, with the default class being IOT-Thing. An IOT-class is a collection of IOT-Things satisfying membership criterion that specifies exactly what is required for an IOT-Thing to be a member of the IOT-Class at a given moment in time. The IOT-Thing is a superset of the '508 publication entity, thus enabling backward compatibility.

In the '508 publication, a namespace management system registers a subscriber's present point of presence to associate with its dynamic network namespace listing:

At run-time, a Namespace Management System can register a subscriber's present point-of-presence to associate with its dynamic network namespace listing.

In contrast, using the above embodiments, the IOT-System can register a set of URRs for communicating with the subscriber, thus enabling a sending IOT-System to select a URR from the set of URRs based on the sending IOT-System capabilities to perform the communication action.

In the '508 publication, connectivity is specified as a named representation of data through name-value pairs, where the value specifies an optional communication primitive and a scheme specific-part that can be interpreted by the scheme.

Connectivity is specified as a named representation of data through name-value pairs, where the value specifies an optional communication primitive (a scheme as one would understand in the context of URIs), and a scheme-specific-part (a path) that can be interpreted by the scheme.

In the '508 publication, a subscriber's subscription document is evaluated and the subscriber system can register a point of presence (connectivity) to associate with the listing corresponding to the subscription.

The subscription document includes a registration request, and the request is sent to a specified service to validate the request and register a point of presence (connectivity) to associate with the listing corresponding to the subscription.

In the instant invention a subscriber can register a set of URRs for communicating with the subscriber's system. This enables selection of a URR based on the self-assembled actions of the system.

In the '508 publication, a built-in service is a built-in service is a service that is dynamically loaded into the namespace management system on demand through a PDCX service registration request.

A built-in service is a service that is dynamically loaded into the Namespace Management System on demand through a PDCX service registration request. The service is provided by a module within a shared library (on Unix-based systems, this would be a shared library, and on Microsoft Windows-based operating systems, this would be a DLL).

In contrast, using the above embodiments, an IOT-Thing with a representation of a reference to an embodiment can be performed by a machine is an IOT-Verb and the performance of the embodiment is a machine action referred to as the verb action. This provides backward capability to the requirement of the Namespace Management System's built-in service being loaded as a module within a shared library, whilst simultaneously enabling embodiments that may be mechanical, electronic, optical, or stored in non-transitory memory.

Moreover, in patent application Ser. No. 11/481,348 titled 'The Active Semantic Namespace,' that invention is directed to a world-wide namespace in which a subscriber subscribes to an active namespace, and the active namespace provider provisions a listing representative of the subscriber, and provides the subscriber a registration credential including ax X.509 certificate with a public key, and, a corresponding private key.

When satisfied, the pdcx:pki.provision service provisions the listing and generates a registration credential. The content of the registration credential is registered as the value of the specified entity reference, and, this is provided as the response to the request.

FIG. 13 illustrates an example unencrypted registration credential content (in pdcxml) issued by the configured worldwide namespace provider for the provisioned active namespace "flightnet:" Each unified system has a registration credential specific to their active namespace listing. The content of the request is encrypted using a DES3 cipher service and the passphrase provided by the subscriber.

The subscriber key (shown in FIG. 13) is an RSA private key generated by the pdcx:pki.provision service. The said key is used to generate a certificate request, and, the certificate request is then issued by the provider as a subscriber registration certificate. The certificate subject corresponds to the subscriber, and the certificate issuer corresponds to the provider. The L field of the certificate subject includes a value describing if the subscriber has a grant of authority for provisioning its authorized listing. The subscriber key and certificate are included in the registration credential.

Embodiments overcome the requirement of the active namespace provider to generate a private and public key pair, by permitting the subscribing device to generate a public and private key pair; to generate a certificate signing request; and communicate the request to the active namespace provider in the subscription request. Upon evaluating the request satisfies the requirements to become a member, the active namespace provider provisions the listing and generates a response with a credential representative of a signed certificate.

While providing backward compatibility with the Active Semantic Namespace, the embodiments enable a multiplicity of active namespaces to exist independent of the World Wide Namespace. A multiplicity of active namespace providers can optionally subscribe to a common Active Namespace and gain the benefit of identification, authentication, and authorization around a trusted common Active Namespace Provider.

Applications for the above embodiments may include an IOT-Machine with an optical reader; an optical identifier; and, an IOT-System, enabling a self-directed assembly of non-transitory machine performable IOT-Module embodiments that may be machine code, mechanical, electronic, and or optical. The above embodiments can be used as a single task single user system, or configured as a multi-user, multi-tasking, multi-processor system.

The following discloses the individual elements that combine to form applications indicating how to provide services via this class of systems.

One skilled in the art may use a Thing Machine to embody an IOT-Machine and embody the performable actions of an IOT-Module as verb actions. In this context, the disclosed IOT-Thing can be modeled as a Thing.

Optical Identifier

The devices and methods of using optical identifiers is described further both individually and moreover how they relate to the IOT-Machines and Systems. An optical identifier is a piece of solid media capable of recording either permanently or re-recordable the phase information necessary to store binary data. This information can later be retrieved by illuminating the optical identifier in a particular set of conditions that include wavelength during reading, angle, polarization state of the reader beam, how the identifier is rotated about the axis of illumination, and other reconstruction parameters that are known to those in the field.

A code page is a vector or array of bits that can be represented in 1 or 2 dimensions spatially, that contain digital data. This data may be generated, in whole or in part, by a true random number generator, a key generator as part of a public key infrastructure (PKI), machine-readable code, an identifier, or other types of digital data as desired within the system. For example, the data may itself be generated by an identifier. The code page is read out of the optical identifier by a reader that shines light at a particular set of conditions to generate the constructive and destructive interference via phase shifting inside the optical identifier to create a pattern of light and dark pixels. This pattern then falls on a 1D or 2D series of detector elements sensitive to the reader's wavelength generating electrical signals that represent electrically the digital data that make up the code page. A code page can contain different segments of data, or multiple code pages can be combined to form a larger segment of data as needed.

The media used to create the optical identifier can be varied depending on the desired wavelength and geometry of read-out. Many materials are available for creating the optical identifier. Some are optically sensitized through treatments or dyes included in their bulk, others are pure materials that are exposed to recording wavelengths that change their physical parameters in order to generate localized changes in refractive index. Examples of materials that could be used to create an optical identifier include but are not limited to Bayer™ HX films, dichromated gelatin, acrylic glasses, photosensitized polymer glasses such as phenanthrene-doped poly-methyl methacrylates, titanium niobate, positive or negative photoresists, photosensitized glass fibers, and silica fibers when recorded with excimer laser energy.

The code pages are recorded using techniques known in the art to spatially modulate the beam in an interferometer to create a desired interference pattern inside the recording media. Other methods known in the art include polarization multiplexing, peristrophic multiplexing, phase-coded multiplexing, spot-shift multiplexing, wavelength multiplexing, and spatial multiplexing. Other methods are known in the art, as is the combination of more than one method of multiplexing to include more than one code page of data. Any of these could be used in the embodiments described herein.

As taught earlier, many multiplexing methods are known in the art, but here one known as angle-multiplexing is described as an example of a recording method. A laser interferometer is constructed a spatial light modulator (SLM) in the signal beam of the recording interferometer, and to configure that spatial light modulator to display the desired bit pattern at the time of recording each code page.

The interferometer configuration can then be changed in angle so each exposure is associated with a different code page of light and dark pixels when the optical identifier is illuminated in reconstruction at a corresponding geometry. The laser wavelength and angle must both be selected to create the appropriate reconstruction conditions for the code page at the wavelength the identifier is to be illuminated at during readout. The recording wavelength must also be suitable for the media used to construct the optical identifier.

These geometries must, in general, conform to the Bragg condition due to the thickness of the optical identifier. Thus angle is associated with its own unique series of dark and white pixels in the reconstructed bitmap, representing the digital data of that code page. The Bragg condition for reconstruction at a different wavelength than the construction wavelength can be calculated using the approximate coupled wave approximation of Kogelnik, (Bell System Technical Journal Volume 48, Issue 9, pages 2909-2947, November 1969.)

As the optical identifier has substantial volume, a great deal of information can be stored within, and the range of angles a particular code page is read at the detector is extremely limited. For example, using the methods of Kogelnik, an optical identifier that is 0.5 mm thick (credit card thickness) viewed with a red laser diode will have a range of angles it will show the code page in, with angle on the order of ~0.05 degrees. This is beyond the ability of human dexterity making the identifier difficult to tamper with outside its range of intended use. It is this quality that allows the optical identifier to act as a security mechanism within the context of the IOT-Systems further described below.

In further detail, referring to FIG. 30 an optical identifier has been integrated into a traditional pin-and-tumbler lock key. In this embodiment, the optical identifier has been associated with a mechanical identifier, with the mechanical identifier taking the form of the pin heights that would allow the key to be rotated.

When the proper key is inserted into the lock cylinder, it can be rotated from an initial angular position to one or more other angular positions. As the key is rotated, the optical identifier is illuminated by an input beam at different angles, reconstructing the code page stored within the identifier that then falls on a detector. The detector may be a linear array of sensors, or the detector may be a 2D array of sensors such as a CMOS or CCD focal plane array. In this manner, the data recorded in the optical identifier as a code page is retrieved from one or more positions of the key, and this data used to identify the presence of a particular identifier.

It should be noted that the optical identifier may be multiplexed, and thus contain more than one code page for each angular position of the key as it is rotated. Each of these code pages may be used for a different purpose, or additional logic in the reader inside the lock may select a particular code page to be used out of a plurality of code pages as the identifying information.

In further detail of FIG. 30 as described above, FIG. 31 illustrates how the rotation of the optical identifier about the axis can generate different code pates for different angular positions of said identifier. As rotating the key is a natural, familiar action, by simply inserting the key and turning it the user is providing both the traditional mechanical identification of the key in the cylinder, and also providing one or more code pages that contain additional information. Each angle in the embodiment would represent a different code page projection on the detector.

As the identifier moves through angles, different code pages will be projected at the detector. Each angle is thus associated with a different code page's reconstruction geometry per the Bragg condition as has been explained earlier in this disclosure. Optionally an encoder can be placed on the cylinder so the angle position of the key and thus identifier could be determined, and a code page(s) selected out of several by angular position at the time of reading as desired as an additional security measure.

Referring now to FIG. 32 and FIG. 33, a laminate label containing a series of optical identifiers within an adhesive-backed label. In this particular embodiment the optical identifiers are beads encoded as an optical fiber and then diced into individual cylindrical segments that are then laminated in a label. The top laminate is clear over the beads in wavelength regime(s) the beads are read and their data pages recovered. Various methods of recording data into optical fibers are known in the art such as that of Hill et al described in "Photosensitivity in optical fibers: application to reflection filter fabrication." Appl. Phys. Lett. 32, 647 (1978).

In this embodiment, the optical identifier is used in a reflective mode instead of a transmissive one. The reader illumination passes through the top laminate, interacts with the index modulated beads, is reflected back by a thin reflective foil between the beads and the backing, and the code page is read from the top of the label. In this way, the label can be adhered to an opaque object. The label could be glued on using a variety of adhesives including cyanoacrylates, epoxies, urethanes, and other one and multi-part adhesives. The adhesive could also be of the "peel and stick" type, where a sacrificial backing is removed from the backing exposing a contact adhesive that can be used to adhere the label to an object.

Although in this embodiment the glass fiber beads are used as the optical identifier, other media could be used such as holographic recording polymers to achieve the same aim. Moreover, the area around the window in the top layer for the optical identifier could be used to carry an additional identifier such as a foil stamped embossed hologram with a brand logo on it, a round bar code, or other identifiers as desired.

In more detail, still referring to FIG. 32, OID FIG. 4 shows the top view of the label-type optical identifier laminate. The individual beads could be duplicates of each other, creating a stronger return signal of the code page when illuminated by the reader. Duplicate beads would also increase the active surface area that would generate the code page in reflection, thus decreasing tolerances for the positioning of the reader over the label. This would cause reading of the label easier for the reader, and hence an end user.

In another example of the OID shown in FIGS. 3 and 4, the individual beads could be encoded with different data pages allowing for each bead to be read in turn and provide multiple instances of identifying information. In either circumstance, the region around the circumference of the label remains available for additional types of identifiers.

Referring now to FIG. 34, there is shown an optical identifier in a card form factor with a large rectangular prism of optical media that can be used to store larger amounts of data than the beads shown in FIGS. 3 & 4. The volume of this optical identifier can be altered to increase or decrease the data capacity in the code pages as needed. For example, this card could be manufactured in a manner similar to credit cards or driver's licenses with an active optical identifier laminated between two thinner sheets. The card could be embossed with a name, date, number or other information as is commonly found on such cards if desired.

An additional identifier is provided on this card that allows for it to interact with other systems, or to augment the data found in the optical identifier. In another example this additional identifier information could be a QR-code, or an embedded RFID element, or a photograph of a person. The additional identifier could be made to reflect a subset of the data in the optical identifier in a human readable form for convenience and improved handling in the man-machine interface environment. For example, a security card used in a place of work would have one or more human-readable identifiers that may contain information in the optical identifier as to allow security personnel to identify the card holder by appearance.

The construction details as shown in FIG. 34 will depend on the manner in which the card is fabricated. In one example of the card, three sheets of plastic would be cut to the desired final dimensions. The center sheet in the laminate would have a void cut in it to contain the optical identifier as illustrated in the cross sectional view of FIG. 34. The three pieces would then be glued or laminated together to form the three-layer card. Additionally a second void where the additional identifier resides may be created in the center layer, allowing for the insertion of a pre-existing RFID tag.

In another method of construction, the optical identifier is encoded in a single sheet of material that is inert under all but the most extreme UV radiation. An example of such a material is methyl methacrylate also known by the brand name Plexiglas™. A sufficiently strong UV laser of wavelengths below 250 nm is able to create index modulation in otherwise untreated solid acrylics. An example of this technique of manufacture known in the art can be found in "One-step holographic grating inscription in polymers," Proc. SPIE 7233, Practical Holography XXIII: Materials and Applications, 72330M (Feb. 3, 2009.)

Figure 35:
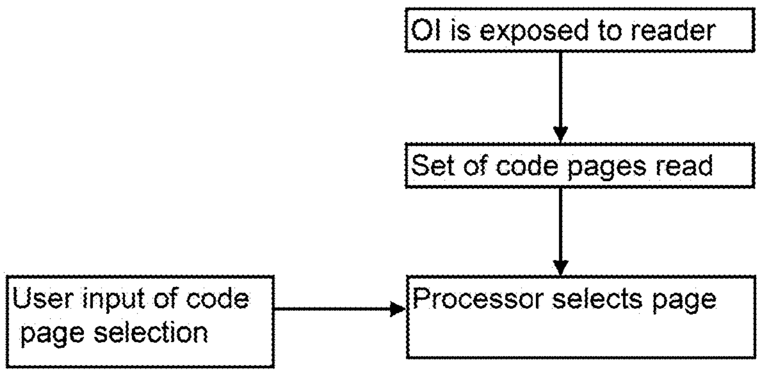
FIG. 35 is a block diagram of a method that may be used to provide user input in the selection of multiple code pages in an optical identifier.

Referring now to FIG. 35, there is shown a block diagram of one method in which the multiple code pages of the optical identifier can be combined with a user input to add additional security to the identification process. Multiple code pages can be present in the same optical identifier. The user may select a given code page(s) to be used, or other input from the user may be used to make this selection automatically through other means communicated to the reader.

An example of the former case would be taking input from the optical identifier's owner from a keyboard or numeric keypad. This information would be used to determine which of the available code page(s) is to be used in later processing. This input may be used directly (e.g. 'use key page 4 this time') or it may be run through an algorithm within the reader, or even an unrelated device that is in communication with the reader that can make the code page selection.

It preferred to allow the selection of code pages where more than one exists to be performed outside the reader altogether. For example, reader may be a component of, or connected to, an IOT-system in order for the code pages to be processed as identifying information. Said system may be distant to the reader. These systems may manage large numbers of optical identifiers for one or more organizations that vary which code pages are used to provide the data for identification.

Referring now to OID FIGS. 7 and 8, another example of the optical identifier is illustrated in which the identifier can further be rendered unusable after a certain condition occurs, either manually or automatically. In this embodiment a frangible optical identifier is fixed within a container larger than the dimensions of the identifier. Although in this illustration mechanical means are used to physically destroy the identifier and the data it carries, one of skill in the art will know that chemical, thermal and optical means also exist to damage beyond readability the optical media that physically contains the data.

In this and the other embodiments the additional identifier is not in general coupled to the destructive mechanism. This additional identifier may have its own method to render itself unusable in practice.

Examples of conditions under which the identifier could be rendered unusable are various: the reader itself could trigger the physical destructor to fire based on instructions, detection of tampering, or remote command. The card could contain wireless circuitry that monitors for the presence or absence of a signal, and fires the ram when that signal appears or disappears respectively. Finally the possessor of the card may manually fire the destruct mechanism, such as by pressing a pin into the side hole where the block resides releasing the spring when desired.

Figure 36:
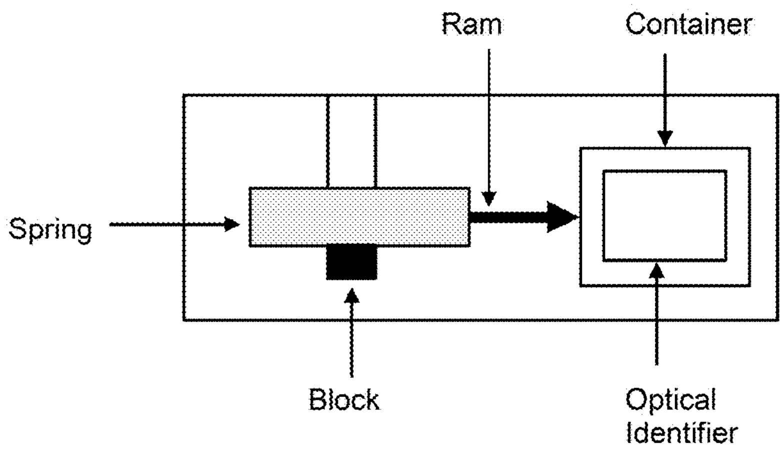
FIG. 36 is a plain and cross sectional view of an embodiment of an optical identifier in a card form-factor that can be used once as the media storing the data can be physically destroyed.
Figure 43:
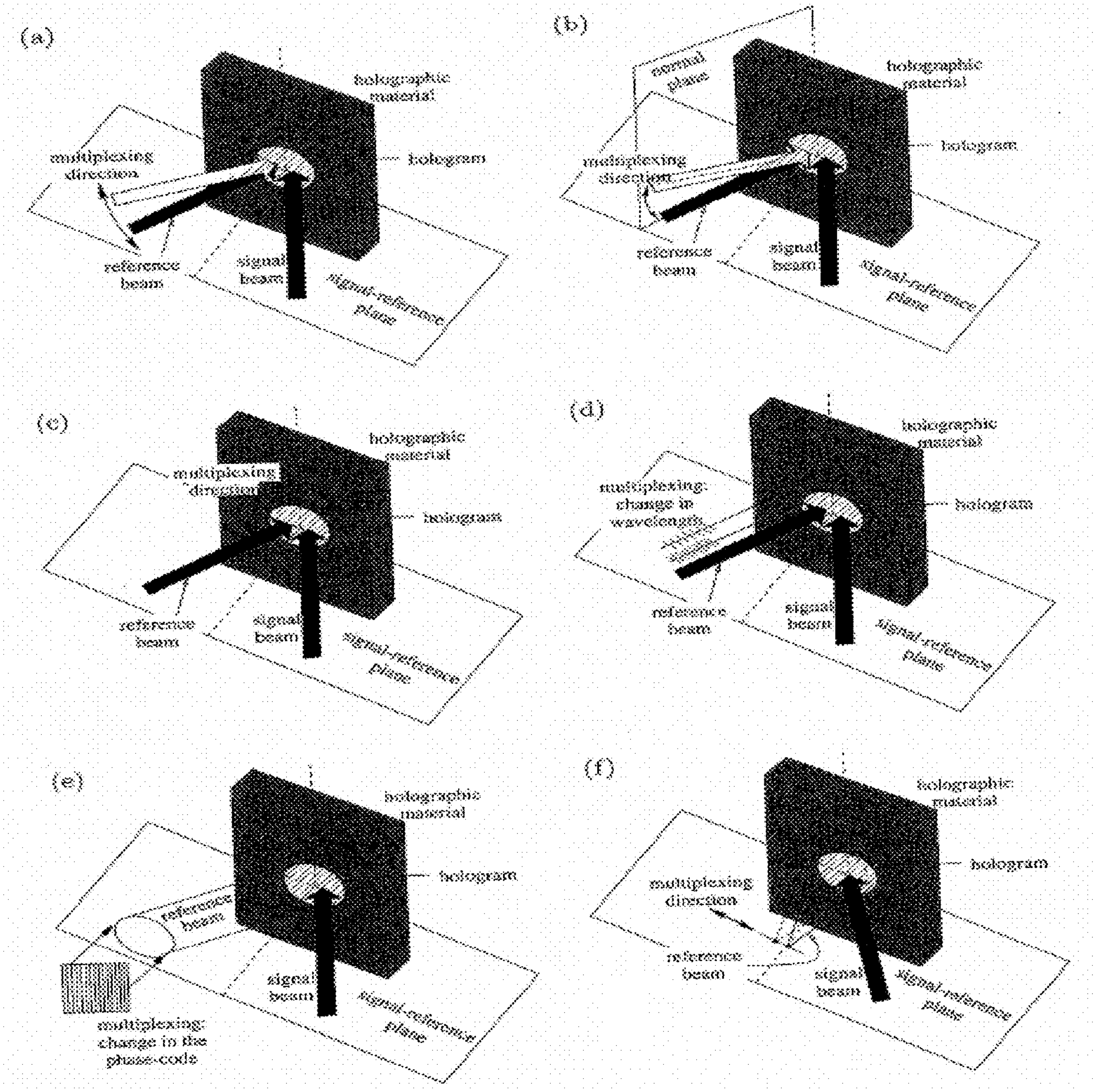
FIG. 43 is a first illustration of an exemplary holographic recording system suitable for generating optical identifiers, in this case holograms.
Figure 44:
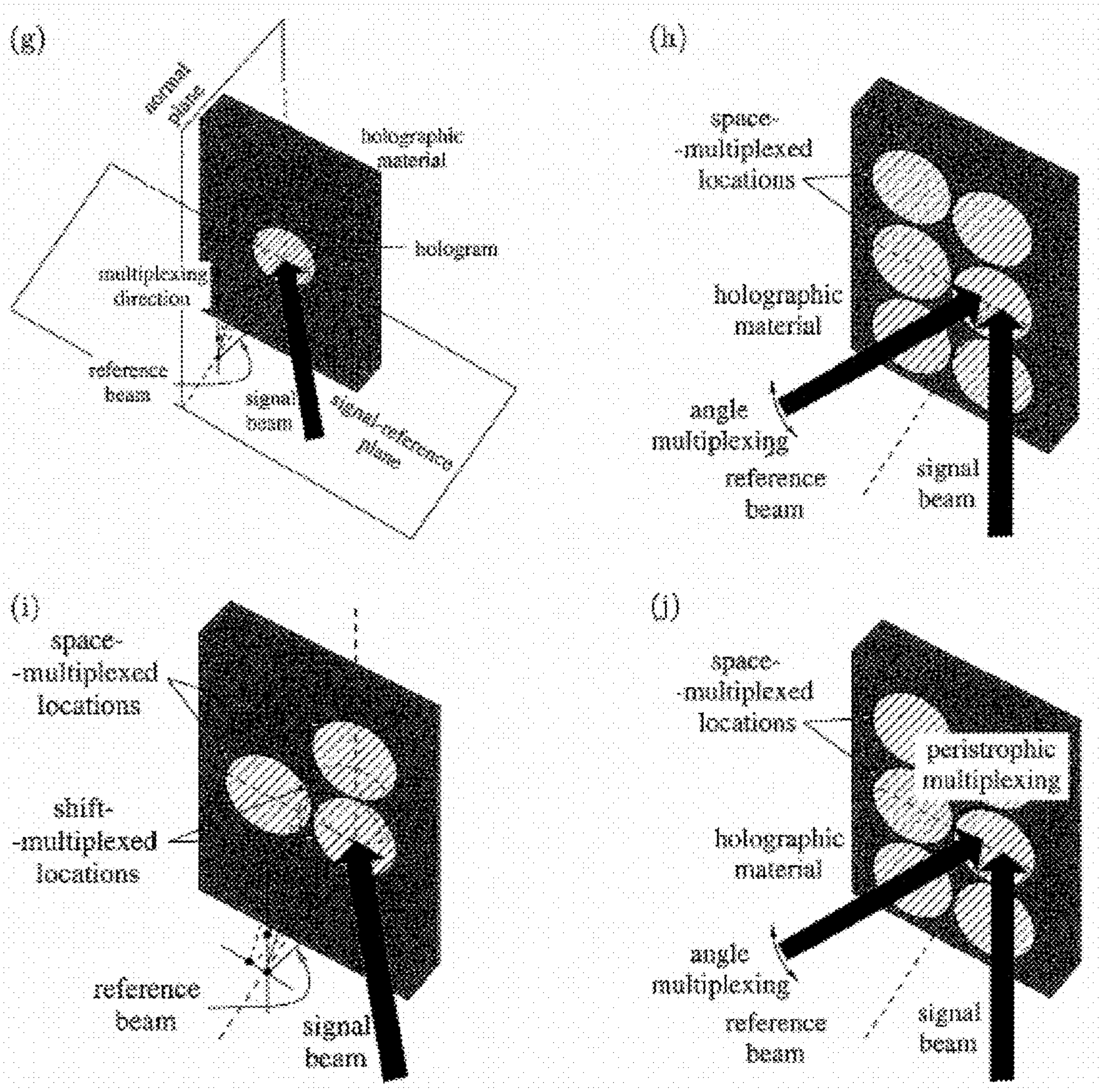
FIG. 44 is a second illustration of an exemplary holographic recording system suitable for generating optical identifiers, in this case holograms.
Figure 45:
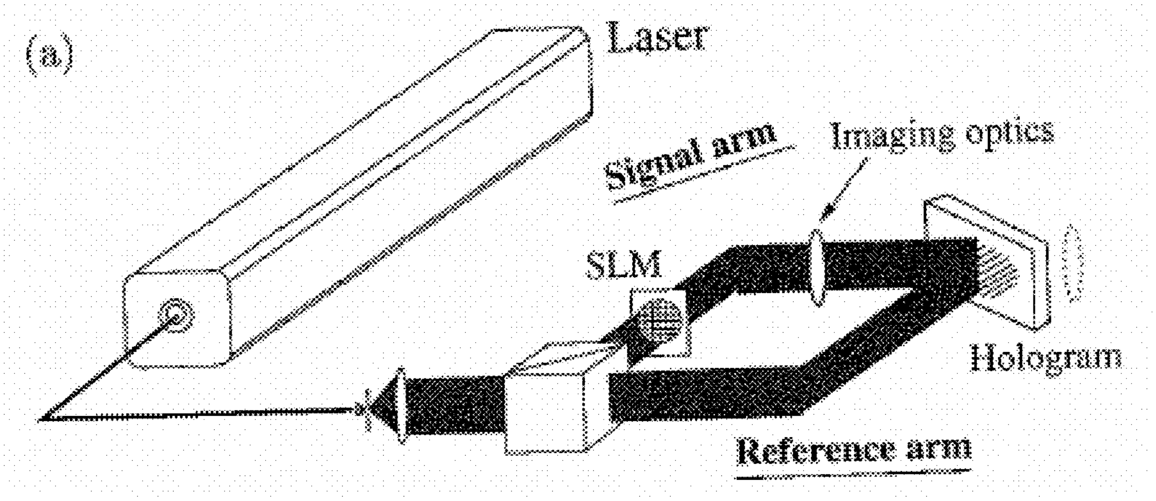
FIG. 45 is a third illustration of an exemplary holographic recording system suitable for generating optical identifiers, in this case holograms.
Figure 46:
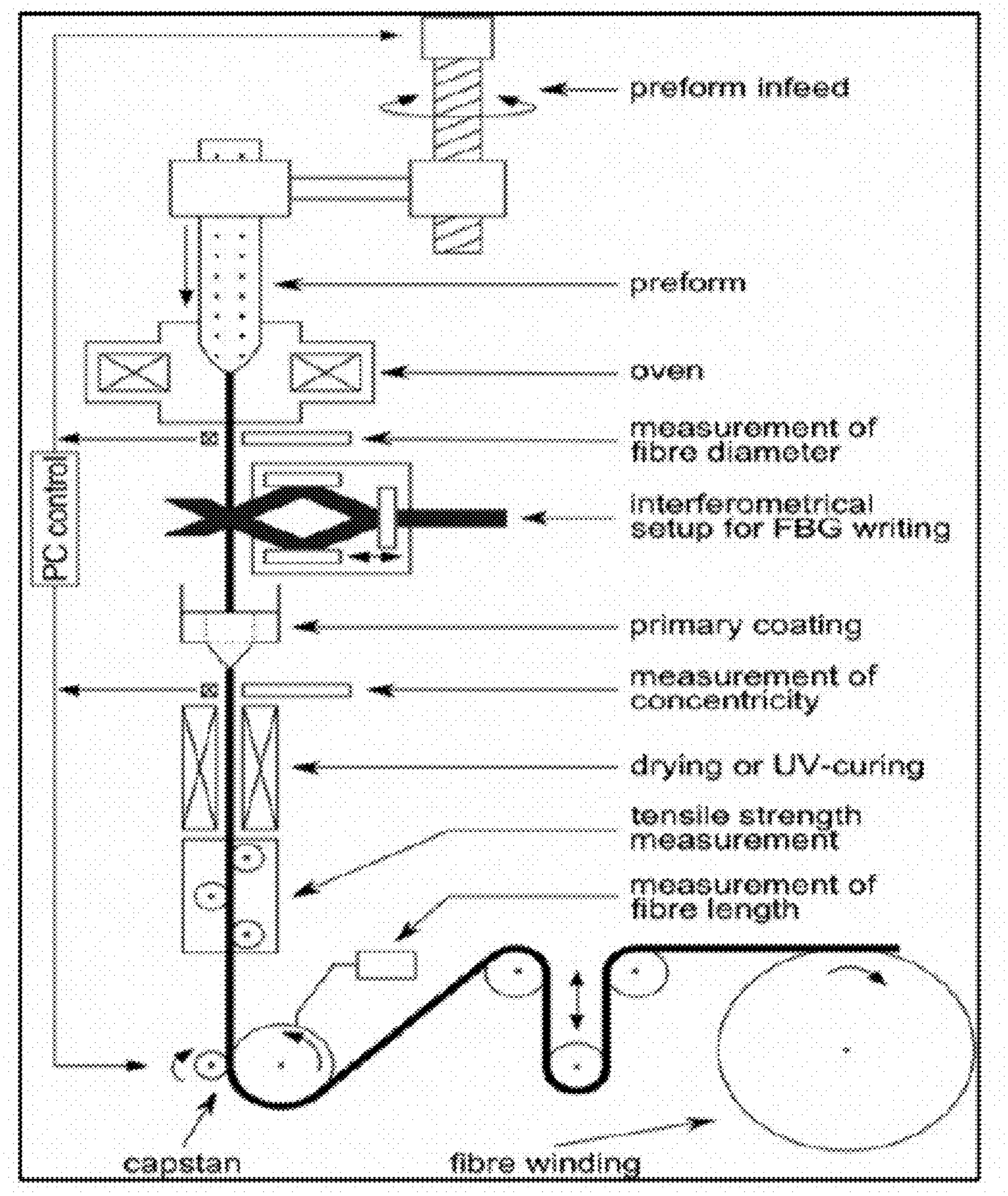
FIG. 46 is a third illustration of an exemplary holographic recording system suitable for generating optical identifiers, in this case holograms.

In FIG. 36, a plan view and cross section illustrate an optical identifier card with a self-destruct feature that can be triggered as desired. The optical identifier, and more specifically, the media containing the optical identifier data, is fixed inside a container with a volume larger than the identifier itself. This empty volume is required to allow the mechanical ram to enter the container volume.

The ram is made of a material and has a shaped tip such that it will pulverize or otherwise shatter the optical identifier when it impacts it with enough force. Preferably the optical identifier in this embodiment is made of a glass bead or fiber segment, and more preferably the ram is made of a material harder than the glass of said optical identifier. A spring powerful enough to launch the ram into the optical identifier and destroy it is held back by a moveable block of material.

When triggered manually or automatically the block is removed from the path of the ram, the spring is released to strike the ram, which in turn strikes the glass bead holding the data with enough force to shatter it. Although in this example a spring is used to push the ram into the bead, one of ordinary skill would recognize other methods to force the ram to crush the bead are possible.

Referring to FIG. 37 in light of FIG. 36, the results of the ram firing at the optical identifier are seen. The ram is lodged inside the container where the optical identifier once was, the shards of the destroyed optical identifier are left behind, contained within the volume of the container. Although here a glass bead and a metal ram were used, and a helical spring is illustrated other types of rams and springs could be chosen depending on the physical properties of the optical identifier.

For example, some optical identifiers are gelatins. A plastic ram could be fired into the gel mass within the container and disrupt the information held within the physical media of the optical identifier. In a further example of a gelatinous optical identifier, the helical spring might be replaced with a memory metal spring and activated by a change in temperature, causing the spring to expand and plunge a ram into the gelatin disrupting the media that holds the code pages, thus destroying them.

In FIG. 38 a general design for an optical identifier with a self-destruction feature is diagrammed to cover the plurality of materials, methods, and conditions. Specific examples are given of these designs to further teach what combinations are useful for making an optical identifier capable of destroying itself, though they are by no means exhaustive or complete.

In Table 2, examples or pairs of physical destructors and the materials they would work well on are provided. The physical destructor is an element that physically destroys the optical identifier by one of several means. It is triggered by one of two different classes of events In Table 3, examples of active events are provided based on how the event would happen (e.g. radio signal) and what sort of conditions could cause these events to trigger the physical destructor. These are active in the sense that the card containing the optical identifier is performing some active function such as listening to a radio beacon, or operating an accelerometer circuit to measure the motion of the card. In these cases, the active event requires some additional circuitry and a power source within the card that houses the optical identifier. In many cases, high security applications would be likely users of active events in managing the self-destruct process.

Table 4 gives examples of passive or manual events. The card itself is passive in the sense that it has no intelligence, and requires direct physical outside stimulus to activate the physical destructor. It should be noted that in the first case, it is possible the "tool" could be a part of the reader itself as was discussed in the description of FIG. 36.

TABLE 2

| Physical destructor optical media | |
|---|---|
| Ram or other mechanical means physically destroy optical identifier by force | glass beads, highly frangible plastics, gelatins |
| Chemical attack (e.g. solvent) | polymer glass, plastic films, acrylics, DCG |
| Optical attack (UV, high power) | some acrylics, lithium niobate |
| Thermal erasure | plastics/polymers with low glass temperatures |

TABLE 3

| Types and examples of actively triggered events | |
|---|---|
| Radio | Presence or absence of a signal, the signal may be a simple beacon or contain sophisticated data that might be processed by the reader or a device it is coupled to |
| Electrical | Power loss for a predetermined length of time to the card and/or reader triggers event |
| Accelerometer | Detection of motion or lack of motion, sudden shock, extreme vibration |
| Optical | Detection of light such as a case being opened, or tampering of the reader with external radiation |
| Temperature | Temperature sensor detects extreme high or low temperature |

TABLE 4

| Types and examples of passively triggered events | |
|---|---|
| Deliberate use of a tool | Optical identifier's owner uses a tool to manually trigger the destruct action suck as a pin or screwdriver |
| Bending | The optical identifier is bent along a particular axis to initiate the action |
| Temperature | A memory wire reacts to a change in temperature and when changed to a new shape triggers the destruct, high temperatures melt a substance preventing the action from occurring |

Example 1

The optical identifier is used to access highly sensitive information in a small controlled data center environment. An actively triggered event is selected using the absence of a radio beacon as the stimulus to trigger the physical destructor. Within the card that holds the optical identifier, a battery-powered circuit listens actively for a periodic beacon. After a certain number of failed attempts to acquire that radio transmission, the card is out of range and has left the allowed space for its use. The optical identifier is stored in a small glass bead that contains many code pages of sensitive data. After the active event is triggered, a small micro-actuator pushes the block out of the way of the spring after the illustration in FIG. 36, pulverizing the optical identifier and rendering it unreadable.

Example 2

The optical identifier is designed to handshake a one-time transaction between strangers by identifying one party in a face to face meeting. A passively triggered event is selected in the form of bending the card, thus rupturing a reservoir of solvent and exposing a polymer glass optical identifier to the solvent dissolving it at least in part. Due to the massive crazing caused by the solvent, the identifier is now unusable. Moreover, the card is now bent in the middle and will not fit inside the reader slot well enough to be read even if the identifier could be recovered.

Example 3

The optical identifier is used to initialize a home automation device for the first time by handshaking with a utility company over a network. A passively triggered event is selected in the form of a tool being applied to the card, this time immediately after it is read once and removed from the device in the home, which contains a reader. A glass bead is used to store the optical identifier. The optical identifier is inserted into the reader, the device is initialized, and removal of the card holding the identifier inserts a pin into the side of the mechanism illustrated in FIG. 36 firing a metal ram into the identifier and destroying it. When the card is removed, the one-time use identifier has been rendered unusable.

Example 4

The optical identifier is used to provide write-access to an in-flight data recorder with tamper-proof features. An actively triggered event is selected in the form of an accelerometer circuit that constantly measures the stresses on the aircraft. The optical identifier is stored in a low-temperature polymer media, and the physical destructor chosen is one that applies controlled heat to the polymer. When a dramatic shock is detected that would indicate a potential impact, the active circuit energizes a heating element in contact with the optical identifier, distorting it and erasing the index modulation that stored the data pages. Without the optical identifier, the recorder can no longer record data and the system is rendered physically read-only for later investigation.

FIG. 39 relates to a specific one data page scheme that might be used in an IOT-system. In this data model, specific regions of code page(s) are used to provide a segment of random data, a key region, and an identifier region. The random data may be related to the key in the key region, or it may simply be used as a source of high entropy data to seed communications over the IOT-system that desires to communicate with other IOT-System-enabled things or services. Finally an ID region is provided that can uniquely identify that particular device. This ID may be related to the optical identifier alone, or may bear further relation to its owner.

FIG. 40 depicts several particular qualities of the optical identifier and the code page(s) it contains. Unlike other storage media, the optical identifier can contain one or more segments of data in the same physical location even if they are in different code pages. The identifier may contain a single segment of data in each code page, or segments of data may be spread over multiple code pages. The multiple code pages need not be consecutive and may be randomized or selected by user input or algorithm.

The data segments can be variable in size, and can contain any type of data including random data, public and/or private keys for PKI operations, machine code, and/or unique identifiers that are used by other systems outside the optical reader. The optical reader may optionally use data in one or more segments as part of its operation and/or coupling to another machine. In the case of a re-writeable optical identifier, the size and purpose of one or more data segment(s) may change with each write operation.

As an example, in FIG. 40 Segment 1 might contain a random block of bits used to initialize a cryptographic function in hardware within the reader. Segments 2 and 3 might contain various keys used to authenticate the reader and the optical identifier itself. Segment 4 might contain a bootstrap machine code that initializes the reader, and Segment 5 might contain machine code used to initialize secure communications with another device, such as pairing within a PAN or WAN.

Advantageously, high bit density can be combined with facile and familiar identification tokens such as pin-tumbler keys, SIM cards, RFID tags, adhesive labels, and credit or ID-type cards. Additionally the optical identifier can be actively destroyed rendering it useless should it be lost or leave the confines of an approved locale. It can also be rendered useless by manual intervention by physically destroying the identifier through the activation of a destructive mechanism Moreover, the optical identifier can contain many different types of data, and thus can be used to identify and act to perfect identity for, in and on a person, place, thing, or machine action. Actions can include the provision of machine-readable code in addition to providing keys, random seed data or other digital data that might be needed for said action. This could, for example, include bootstrapping the optical identifier reader device itself, or provide data needed to connect the reader with an output port for interacting with a larger system at-large, such as an IOT-System.

That reader output port could be wired, such as to a mobile device dock or installation within an appliance's housing, or could be wireless using protocols such as Bluetooth, ZigBee, LoPAN, WiFi, or other wireless communication protocols. Finally the data can identify the types of security that may be required over those protocols, such as only providing a key of a certain length can be used, and could moreover provide said key from within the data stored in the optical identifier. Lastly, note that in some embodiments, the output could be an optical one, as per the discussion of FIG. 42 below.

Referring now to FIG. 41 an optical identifier is integrated into an RFID tag, such as might be sewn into a garment for loss prevention or inventory control. While this embodiment is by no means limited to the textile application stated above, it further illustrates the utility of combining a data-dense optical identifier with another identifier already in common use.

The optical identifier here is used to provide a data-rich tamper-proof add-on to a pre-existing and well-adopted identifier, in this case exemplified by a sew-on RFID tag. The region the identifier is contained in may be perforated for removal after the optical identifier has been used at a point in the supply chain, point of sale, or it may be permanently affixed and carry anticounterfeiting information. Finally, the optical identifier can be used to track the transactions of second hand sales of high-end goods, allowing buyers, sellers, and original manufacturers to establish a chain of ownership. The latter is vital in goods which require regular servicing by approved locations such as watches and automobiles.

FIG. 42 illustrates in both plan view and cross section an embodiment in which the optical identifier is itself part of a larger photonic device, in this case having a card-shaped form-factor. Where this embodiment is not limited to such a form factor, it is illustrative of this embodiment where electrical signals can be used to select data from one or more optical identifiers by controlling the illuminator used and the path taken.

In this embodiment one or more illumination devices (here lasers 1 and 2) such as VCSEL lasers or laser diodes are actually placed inside the card with the optical identifier. A series of external electrical contact pads allow the illumination device to be energized as desired by an outside energy source. This energy source can be coupled with the reader. In the case of more than one reader, different combinations of pads may have the appropriate voltage and current applied to them in order to activate the illumination devices required.

Each illumination device is connected via a light guide in the card to a given optical identifier. The light guide represents a channel through which the light from the illumination device will be preferentially radiated to the front face of the optical identifier. When each identifier is illuminated, it presents its own data page. Multiple illumination sources coupled with optical identifiers that are offset by some angle (here illustrated as 0) thus illuminating the same optical identifier, but at a different angle thus exciting a different code page at the Bragg condition.

Moreover, it is possible to include even more code pages in each identifier. By performing peristrophic multiplexing about the center of the long axis of the card, rotating the card around its long axis will allow each illumination source to excite many different code pages.

Each code page then exits the card through a smooth window face on the end of the card's edge after the light has exited the optical identifier where a detector would then read it as other identifiers are. It is in this manner that legacy form factors such as SIM cards and other secure electronic card readers can be incrementally brought in to the world of data-rich optical identifiers. The only component that requires addition is the sensor module.

It is desirable to provide for this combination of optical identifiers with and without other identifiers with sufficiently high data density and read-out selectivity that the optical identifier could be secreted discretely in an object that contains a traditional identifier. In particular, the wide range of potential materials that can be used to hold the code pages of the optical identifier enable a similarly wide range of physical appearances, allowing for the data-dense optical identifier to be as obvious or inconspicuous as desired. This further enables the development of complex IOT-systems and machines.

Optical Reader

In the field of optics, a photodiode is a semiconductor device that converts light into energy. The output of the photodiode is used as the input to a transimpedance amplifier, which converts current to voltage. An Analog to Digital Converter (ADC) accepts the amplifier output voltage and coverts it to digital output. This technique is well known in the start of the art.

Referring to FIG. 1B, one type of Optical Reader includes an optical driver (OD); TOSA optical transmitter optical subassembly (L-1) used to illuminate Optical Identifier (OI); and, a ROSA receiver optical subassembly (R-1). An amplifier can be used between driver and analog to digital converter (ADC). In one example, TOSA is triggered during the machine Power On cycle and digital data is stored in volatile non-transitory memory. In another embodiment, TOSA an input signal is received by OD to cause TOSA to be triggered.

For an implementation, L-1 can be a VCSEL (Vertical Cavity Surface-emitting Laser), while another implementation may use a different light source, such as a VECSEL (Vertical External-cavity Surface-emitting Laser,) traditional laser diode, or another source with sufficient coherence to generate a readable code page.

A VCSEL is a monolithic kind of semiconductor lasers with beam emission perpendicular to the wafer surface. A VECSEL is a surface-emitting semiconductor lasers with an external laser resonator. See R. Paschotta, article on 'vertical cavity surface-emitting lasers' in the Encyclopedia of Laser Physics and Technology, 1, edition October 2008, Wiley-VCH, ISBN 978-3-527-40828-3 for additional information.

One skilled in the art would appreciate that the selection of hardware components for an embodiment can be dependent on a number of factors. Example factors influencing the selection of hardware include the size of the optical identifier, the amount of digital data to be optically read, the form factor of the optical identifier, the power source available, memory requirements, boot requirements, the cooling requirements of the laser, safety factors, the intended use of the digital data by the IOT-Machine, and others.

For purposes of this disclosure, the focus is on using readily available hardware components to create the writer and reader of the optical identifier. One skilled in the art can modify the embodiment to gain efficiencies, extensibility, and potential cost savings. For example, a simple laser interferometer such as illustrated in OID FIG. 16 can be used to write to the identifier with a spatial light modulator used to unique encode in each identifier data as desired. This identifier can then be used to create code pages at particular reconstruction geometries, with a single optical identifier being capable of storing many pages of data that may be combined into a single larger element of data, or that may be combined together in a predefined scheme to present a multiplicity of data elements. These pieces of data may represent many different elements within the system further described below.

An additional example of this use of readily available hardware can be found by referring to FIG. 1C, the Maxim Integrated DS4830 Optical Microcontroller (OM) provides a complete optical control, calibration, and monitor solution based on a low-power, 16-bit, microcontroller core, providing program and RAM data memory. OM interfaces with the Maxim Integrated MAX3798 amplifier and VCSEL driver (OD). The MAX3798 is a highly integrated limiting amplifier and VCSEL driver designed for 1×/2×/4×/8× Fiber Channel transmission systems at data rates up to 8.5 Gbps as well as for 10GBASE-SR transmission systems at a data rate of 10.3125 Gbps. OD interfaces with the Finisar 10G Pin Flex Finisar PIN-1310-10LR-LC (ROSA), and the 10G VCSEL Flex TOSA Finisar FP-1310-4I-LCx (TOSA).

http://datasheets.maximintegrated.com/en/ds/DS4830.pdf (OM)

https://datasheets.maximintegrated.com/en/ds/MAX3798.pdf (OD)

https://www.finisar.com/optical-components/pin-1310-10lr-lc (ROSA)

https://www.finisar.com/optical-components/fp-1310-4i-lcx (TOSA)

Although these optical components are specific examples of the processors, detectors, light sources and potential communication devices that may be adopted to create an optical reader they are by no means limiting. Any source with sufficient coherence can be used to reconstruct the code pages, and any detector with suitable resolution and dimensionality can be used to transfer the optical form of that data into an electronic one. It is desirable that the reading of the optical identifier and/or the transmission of its contents need not take place in a single optical material; there need not be a fiber optic connection as described above, and it is important to note that many forms of the optical identifier described earlier in this disclosure would function as intended in a free-space mode where there is no glass or fibers between the identifier and the detector in the optical reader described further in this section. Indeed it is desirable to provide the option to the system designer to use free space, fibers, image guides or any other type of conveyance to project the reconstructed pattern from the identifier in such a way it can be detected within the reader. The reader components need not either be proximal to each other, or within a single physical container, but may be separated by great distances as need for a particular IOT-System or machine design.

Referring to FIG. 1A, IOT-Sim card (OI) includes a piece of plastic acting as a physical carrier or container for the identifier, with a cut-out slot for an optical identifier encoded with digital data as described in the disclosure above Embodiments can include: optical reader with OI positioned within housing at 90 degree angle between L-1 and R-1 (see FIG. 1C); optical reader within housing having a slot enabling optical identifier to be inserted (FIG. 1D) similar to a SIM card being inserted into a SIM card reader, such that the optical identifier can subsequently be removed; and, an optical reader within a housing have a slot enabling optical identifier to be swiped (FIG. 1E) similar to swiping a credit card through a magnetic stripe credit card reader.

Referring to FIG. 1D, an optional actuator switch can be used such that inserting the OI into the slot closes the switch enabling OM to start the interrogation and reading of OI as it is manually moved between L-1 and R-1.

Referring to FIG. 1F, Optical identifier can have reflective backing enabling the laser light to reflect onto a photodiode.

In another example (not shown), motion of L-1, R-1, OI, or a combination of two or more through the use of a stepper motor that can be programmatically controlled can be used. A stepper motor, for example, can change the angle of L-1, L-1 and R-1, OI, or, a combination thereof. Similarly, a stepper motor can rotate OI between L-1 and R-1. Similarly, L-1 and R-1 could be motorized to move horizontally, vertically, or rotationally around a stationary OI.

An embodiment can use a form factor enabling a multiplicity of optical identifiers, such as a piece of plastic with two optical identifiers at specified locations, that can be inserted between a multiplicity of light sources and corresponding reading components at corresponding locations in the optical reader housing. A switch can be used for alternating between light sources as necessary.

Referring to FIG. 1G, optical reader housing is a USB device that can be plugged into a USB port of an IOT-Machine providing power for a USB Microcontroller to perform machine code enabling optical reader to read and copy digital data of optical identifier to Non-Volatile Memory; said data representative of a FAT File System having a boot file. On booting the IOT-Machine, the DAS U BOOT Universal Boot Loader fatload command can be used on IOT-Machine to instruct U BOOT to load boot code from the USB device Non-Volatile Memory. In this manner, IOT-Machine is booted from optical identifier OI. An encoded checksum of the boot image can be used by the microprocessor to compare to a current checksum of Non-Volatile Memory to ensure proper reading of the optical identifier OI has occurred.

In another example, an IOT-Machine has a first optical reader with optical identifier in a housing of said machine wherein said optical identifier has digital data that is used by an IOT-Module action to set the machine identifier; and, a second optical reader wherein an end user can interact with said reader to enable the ROSA to optically receive a representation of digital data of a second optical identifier.

There are several ways for booting a microcontroller or an IOT-Machine from digital data encoded in an optical identifier. Another approach is for boot code in memory to be encrypted, and digital data can be representative of a cipher key required to decrypt the boot code, the method including the steps of: interrogating optical identifier to obtain cipher key; performing a cipher action using cipher key to decrypt encrypted non-transitory memory as boot code in non-transitory memory; and, booting the microcontroller using said boot code.

IOT-Machine

An IOT-Machine can interact with data such as that read by the previously described optical reader and stored in the optical identifier in a manner consistent with the IOT-System or Machine's intended function.

In a one example an IOT-Machine includes a processor; memory; an IOT-System Boot Loader; a multiplicity of IOT-Modules; an optical reader; and, an optical identifier. In another embodiment, an IOT-Machine further includes one or more of data storage; an input interface; a display; a transmitter; and, a receiver. The transmitter and receiver may be a simple component. A system on a chip, such as the Inforce 6410Plus can be used.

The input interface may include one or more devices that enable the user to input information and/or commands to processor. For instance, input interface may include a keyboard, a keypad, a mouse, a joystick, a button, a knob, a solid-state input device, a lever, a touchpad, a touchscreen, a switch, a trackball, and/or other input devices.

Display may visually convey information to the user. For example, display may include a pixilated electronic display such as an LCD display, an OLED display, a micro-mirror device display, other pixilated electronic displays, and/or other displays. In some implementations, user interface may include other sensory feedback mechanisms to convey information to the user. As a non-limiting example, user interface may include an audible feedback system (e.g., a speaker system, etc.), a sensory feedback system, and/or other sensory feedback systems. In one or more implementations, user interface may include at least one input interface and at least one display.

Data storage may include one or more electronic storage media that enable non-transitory storage of information. The storage media of data storage may include any electronic storage medium currently known or available in the future. In some instances, data storage may include a single storage medium within a single storage device. In other instances, data storage may include one or more storage media within a plurality of separate devices which may or may not be in communication with each other.

A transmitter/receiver may include one or more components capable of transmitting and receiving information over a communications link, such as a wireless communication link, or an optical communication link. In some implementations, transmitter/receiver may include a plurality of transmitters and/or receivers that enable wireless communication via a plurality of different wireless communication media and/or protocols. Further, transmitter/receiver may, in practice, include separate transmitters and/or receivers associated with a plurality of devices to enable communication of information to and from processor, user interface, and/or data storage.

In some instances, transmitter/receiver may include more than one transmitter and/or more than one receiver associated with a single device. This may enable the single device to communicate via more than one communication medium and/or protocol.

In one or more implementations, the processor may execute one or more modules having an IOT-System boot loader, and IOT-Module(s). Modules may be implemented as hardware modules, software modules, firmware modules, or as a combination of hardware, software and/or firmware. Modules may be executed locally to each other (e.g., on the same device), or remotely from each other (e.g., in separate devices interfacing via an operative link). The functionality of a single module may be provided within a plurality of sub-modules being executed remotely from each other. The processor may be a single processor. In some instances, the single processor may be disposed within a single device (e.g., wireless client device). However, such instances are not limiting, and in other instances the processor may include a plurality of processors that may be located within a single device or within separate devices. In most implementations, processor includes at least one processing component within the IOT-Machine.

Referring to 14, Bootstrap machine code is performed by the processor to perform the steps of: initializing memory; loading IOT-Bootstrap Program from non-transitory computer readable media into non-transitory memory; and, causing the processor to perform the IOT-Bootstrap Program machine code.

Referring to FIG. 15, the IOT-Bootstrap includes a Boot IOT-Module; a Parser IOT-Module; a Perform IOT-Module; and, a Configure IOT-Module.

Referring to FIG. 16, the Bootstrap IOT-Module is configured with machine code performing the steps of: Executive Initialization; Executive Start; and, Executive Stop.

Figure 17:
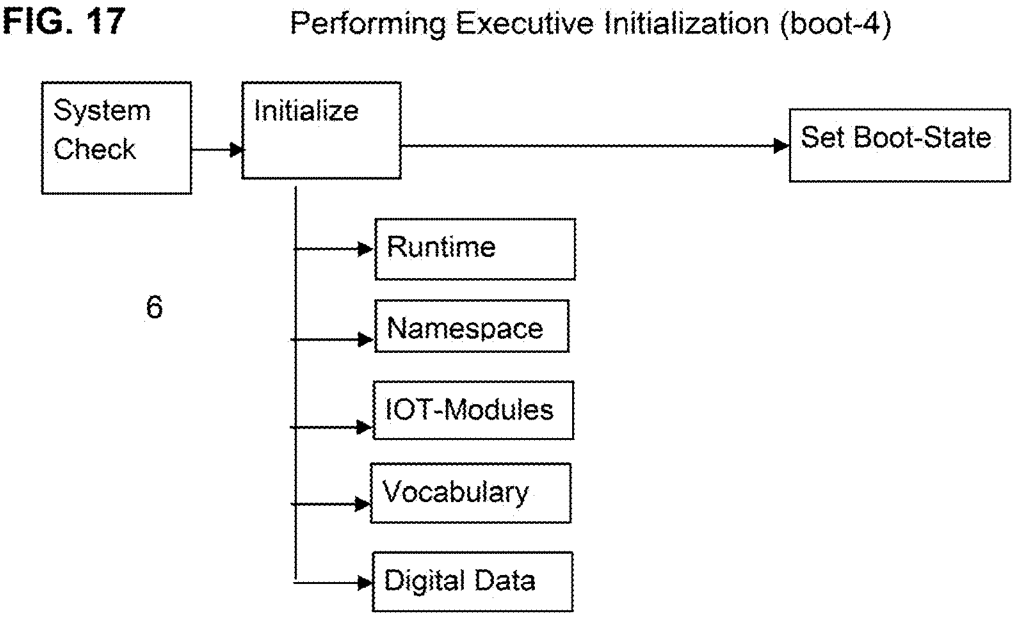
FIG. 17 shows the executive initialization machine code performs system check, initialize, and, sets the Boot-State IOT-Thing.

Referring to FIG. 17, Executive Initialization includes the steps of: initializing runtime environment; initializing core IOT-namespaces; initializing the configure, perform, and parser IOT-Modules; initializing core verb vocabulary; initializing IOT-Thing using digital data; and, setting BOOT-State instances.

Referring back to FIG. 15, the Core Verb Vocabulary includes: parse, configure, and perform. An embodiment can add Boot to the verb vocabulary. Initializing IOT-Modules can include the steps of loading machine code into non-transitory memory from non-transitory media.

An embodiment can include a multiplicity of BOOT-State instances. For example, BOOT-State.0 can be used to configure the IOT-System, BOOT-State.1 can be used for an administrative runtime, and, BOOT-State.2 can be used as a user run time.

Figure 18:
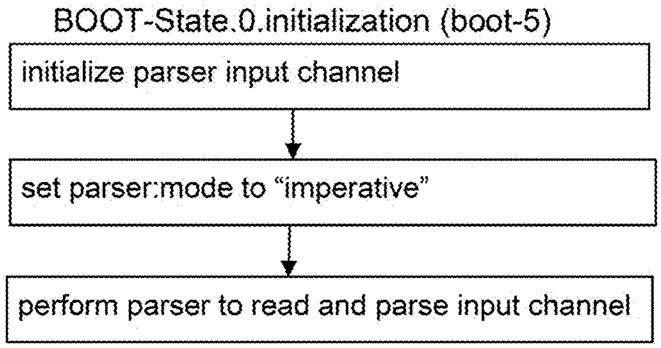
FIG. 18 shows the BOOT-State.0 initializes the parser input channel, sets the parser mode, and, performs the parser to read and parse the input channel.

Referring to FIG. 18, the BOOT-State initialization includes BOOT-State.0.initializations including the steps of: initializing parser input channel to read a boot configuration request; setting parser mode to imperative; and causing performance of parser to parse boot configuration request.

Referring to FIG. 19, performing ExecutiveStart includes the steps of: setting system:on.failed to STOP; and for each initialization in BOOT-State instances, performing said initialization.

Referring to FIG. 20, performing ExecutiveStop includes the steps of: for each termination in BOOT-State instances, performing said termination.

Referring to FIG. 21, IOT-System Processor communicates with Optical Reader microprocessor using i2C communication bus. In response to receiving a representation of digital data, IOT-Module action interacts with Memory IOT-Module action to set an IOT-Thing to be representative of said representation. In an embodiment, digital data can be representative of one or more of: an identifier; machine code; a request; a key; a certificate; pure random numbers; a URR; a URL; a URI; or other IOT-Thing an IOT-Module action can act upon.

Referring to FIG. 3A, the Memory IOT-Module provides actions to administer in non-transitory memory, a multiplicity of IOT-Things, and, the relationships between them. Referring to FIG. 24, relationships between IOT-Things can include parent-child, next-last, instance-base, and symbolic links. An embodiment can modify the relationship sets.

Referring to FIG. 3B, an IOT-Verb is an IOT-Thing with a representation of a reference to an embodiment the IOT-Machine can perform. Referring to FIG. 3C an IOT-Verb specification describes an IOT-Verb and the IOT-Artifacts the IOT-Verb action can act upon, which can then be set in the IOT-Vocabulary.

Referring to FIG. 6, the Bootstrap IOT-Module action is performed (entry point) to initialize the IOT-System's Core IOT-Verb Verb Vocabulary, to enable the use of the Core IOT-Protocol. The Bootstrap IOT-Module action provides a reference to a communication channel to the Parser action; and causes Parser IOT-Module action to be performed.

Referring to FIG. 3D, in imperative mode the Parser IOT-Module action parses an input statement as an IOT-Statement, and interacts with the Perform IOT-Module action to perform the IOT-Statement. Referring to FIG. 3E, the statement is parsed as an IOT-Statement having a Verb and a multiplicity of IOT-Artifacts (IOT-Things the IOT-Verb action can act upon).

Referring to FIG. 7, the Perform IOT-Module action performs an IOT-Statement by identifying a verb name, interacting with the Memory IOT-Module action to select a corresponding IOT-Verb, initializing a request: IOT-Thing to include the object IOT-Thing and modifier IOT-Thing, and, causes the IOT-Verb action to be performed. An IOT-Verb specification can be used to select an IOT-Verb based on the IOT-Artifacts the IOT-Verb's IOT-Module action can act upon.

A configuration statement requesting the IOT-System to configure additional IOT-Modules and corresponding IOT-Verbs, enables the IOT-System to be a self-directed assembly of non-transitory machine performable IOT-Module embodiments that may be machine code, mechanical, electronic, and or optical.

The Perform IOT-Module action can interact with a Bind IOT-Module action, if configured, to bind IOT-Things in the request IOT-Namespace according to an IOT-Verb specification. Referring to FIG. 8B, modifiers can be used to select a module action.

Referring to FIG. 6, the domain ontology is modeled by the core vocabulary bootstrapped by the Bootstrap IOT-Module, the additional configured IOT-Modules, the corresponding IOT-Verbs, and, the IOT-Artifacts. The domain model is defined by the configured IOT-Types, IOT-Tasks, IOT-Services, and Rules.

Referring to FIG. 5, a common IOT-Verb name can be referenced, and an IOT-Bind module action can bind the reference to a specific IOT-Verb name based on the context in which the request is being evaluated.

Referring to FIG. 9, the embodiment shows a Core IOT-Module and a Communications IOT-Module can communicate using communication bus architecture such as an i2C Bus. In this embodiment, Communication IOT-Module uses a local Core IOT-Module to be responsive to request communicated from a Main Core IOT-Module action, to perform Communication IOT-Module actions, and, to communicate the response thereto. It is noted that there are two version of the Arduino Pro Mini, one running at 3.3v and the other at 5v, though one could use a bidirectional logic level converter to safely step down the 5v to 3.3v.

Referring to FIG. 12, an action block includes a multiplicity of statements to be evaluated. An IOT-Task is a named IOT-Thing that quantifies an action block. An IOT-Service is a named action block evaluated on behalf of someone or something authorized to request the IOT-Service. Quantifying IOT-Tasks separately from IOT-Services, enables the IOT-System to perform IOT-Tasks without the need to authenticate each time the task is requested to be performed.

Referring again to FIG. 24, exemplary relationships administered by Memory IOT-Module actions include: parent and child (IOT-1 and IOT-2), sibling next and last (IOT-2 and IOT-3), symbolic links, base and instance (IOT-2 and IOT-5), next and last instance (IOT-5 and IOT-6). The IOT-List, IOT-Set, and IOT-Array IOT-classes are embodied using the relationships base and instance, and next and last instances.

Referring to FIG. 57, the exemplary content describes a configuration request to configure the mini.web.server task. The steps required to perform the task are configured as imperative statements to be performed in the specified order. The task can require the step of performing the mini.web.get task, which is shown in FIG. 58.

Referring again to FIG. 57, the embodiment is represented as content expressed in a syntactical representation adhering to a language specification. The IOT-Module action parses the content as an IOT-Statement syntax tree. A multiplicity of language specifications and corresponding parser actions can be used to configure the same syntax tree. Thus, a multiplicity of scripting languages can be used with appropriate parser actions to set the IOT-Statement syntax tree, which is then performed according to the Core IOT-Protocol.

Exemplary embodiments of an optical identifier key management IOT-Machine and IOT-System; a Namespace Provider IOT-Machine and IOT-System; and, an optical authentication system are disclosed.

A request is received, parsed, and set as an IOT-Statement in a request IOT-Namespace. An evaluate IOT-Module provides an action to evaluate the request by interacting with the request; selecting an appropriate IOT-Verb from the verb vocabulary; and interacting with the Perform IOT-Module to cause performance of the corresponding IOT-Verb action. A format IOT-Verb action is performed to format the response in the response IOT-Namespace, if any. The formatted response is sent.

IOT-Machine Security

Referring to FIG. 54, an implementation can impose a hierarchical protection domain (also referred to as a protection ring) wherein the inner layer BOOT-State.0 is the most trusted ring and each additional ring layer is less trusted.

Referring to FIG. 55, the IOT-Context defines the capability to perform an IOT-Verb by referencing the appropriate IOT Verb Vocabulary referenced within the IOT-Context. Having the verb in the verb vocabulary provides the capability to perform the action. An IOT-Capability is accessible in BOOT-State.1, but not accessible in BOOT-State.2.

Referring to FIG. 56, in response to a subscription request that includes an identifier in said request, wherein said request satisfies the requirements to be a subscriber member, the embodiment performs the steps of: setting the value of identifier as an IOT-Thing in the subscriber IOT-Namespace; setting a capability IOT-Thing; and, setting an IOT-Context. The context is used by the embodiment to define the set of IOT-Things to be considered in evaluating a subsequent request from the subscriber. By way of example, the embodiment can define the set of IOT-Namespaces, the IOT-Verbs, the IOT-Services, and other such IOT-Things that the subscriber can reference. In one example, the first context can be viewed over a second context. In another embodiment, the first context defines the entirety of the scope. In yet another embodiment, the subscriber IOT-Context is used in evaluating the request, and a second IOT-Context is used in performing the requested service.

Referring again to FIG. 54, a subscriber request is evaluated using BOOT-State.3 IOT-Context defined by the subscriber identifier; and, the service is performed using BOOT-State2 IOT-Context.

Various security models can be embodied to support single user single task, through multi user multi-tasking. A processor scheduler IOT-Module can be used to implement multi-tasking using IOT-Things designated as scheduling queues. Additionally, devices queues can be also be implemented for scheduling purposes.

IOT-Modules

The performance of a first IOT-Module action can generate a second IOT-Module. By way of example, a first action can interact with optically read digital data representative of machine code, to configure an embodiment of an IOT-Module, and, set one or more IOT-Verbs corresponding to said IOT-Module.

The phrase "an IOT-Module provides actions" means the IOT Module provides the embodiment for performance of said actions. The phrase "an IOT Module is used" means the embodiment of the IOT Module actions is performed by the machine", such as in the statement: "An IOT-Module is used to interact with random number generator device data" which is interpreted as "The embodiment of the IOT-Module action is performed by the machine, to interact with random number generator device data. The phrase "performance of an IOT-Module" means the machine performing the embodiment of an IOT-Module action. The phrase "an IOT Module action" means the action performed in performing the embodiment. The phrase "interacts with" means to cause performance of an IOT-Module action, or in parallel processing, to communicate with an IOT-Module action.

The action to configure an IOT-Verb interacts with Memory IOT-Module to set an IOT-Thing representative of an IOT-Verb to include a representation of a reference to an embodiment that can be performed by a machine. In general, this is referred to as IOT-Verb registration, or, the process of registering or configuring an IOT-Verb.

A request to configure an IOT-Verb can be expressed in a language grammar that a parse verb action can parse as a set of IOT-Things representative of the request to configure the IOT-Verb action. Referring to FIG. 13, the request is expressed in XML as a request to perform the "configure" verb action with modifier "verb" to denote the request is a request to configure a verb. The Uniform Resource request indicates the machine code is located in stdfile.dll and the symbolic reference comprimInit can be resolved to the memory location that the configure.verb action is to act upon. The configure.verb action is performed, and performs the machine code at that address. Said machine code interacts with IOT-Memory modules to set the verbs in the verb vocabulary accordingly.

Exemplary IOT-Modules Below are provided by way of example and not limitation a collection of possible IOT-Modules.

Action IOT Module

The Action IOT-Module action interacts with Bind IOT Module, Memory IOT Module, and Perform IOT Module, to perform an IOT-ActionBlock's IOT-List of IOT-Statements in an IOT-Context having a common local namespace. The Action IOT-Module action interacts with a Memory IOT-Module action to set the local IOT-Context at the start of the action block sequence, and to unset the local IOT-Context upon completion of the sequence.

For each IOT-Statement in IOT-List, the Action IOT-Module action performs the steps of: interacting with the Bind IOT-Module action to bind, within the defined IOT-Context, the IOT-Statement to an IOT-Verb to be performed; and, interacting with the Perform IOT-Module to perform said IOT-Verb action.

Bind IOT Module

The bind IOT module provides actions to bind an IOT-Thing to a type of IOT-Thing asserted by a binding method. By way of example, an IOT-Thing with name "ID" and value "staff@iotnamespace.com" may be bound as an email address type of IOT-Thing. Similarly, an IOT-Thing with name "Home" and value "iotnamespace.com" may be bound as a domain name type of IOT-Thing.

In general terms, a binding method binds an IOT-Thing as a type of IOT-Thing. By way of example, a binding method may bind an IOT-Thing value as a representation of a currency, a transaction, a bid, an asking price, a settlement price, an account, a user, a subscriber, a seller, an auctioneer, an email address, an identifier, a friend, a foe, a robotic device, a task, a verb, a modifier, a noun, an adjective, an adverb, a punctuation, a financial instrument, a geo location, a wallet, a quantity, a file, a document, a URR, a computer, an IP address, a public key, a private key, spam, connectivity, a schema, or an artifact that can be acted upon by an IOT-verb.

Bind IOT-Module actions include bind and unbind. The bind action interacts with Memory IOT module action to identify an IOT-Thing by IOT-Listing, and to test if the IOT-Thing attribute switch BOUND is set. If set, then the bind action sets status to satisfied and is complete. If not set, then bind action binds the IOT-Thing by applying an IOT-binding method. The bind action then interacts with Memory IOT-Module to set the BOUND attribute switch.

An IOT-binding method is applied by performing the method's action with a reference to the IOT-Thing, such as by its IOT-Listing. In an embodiment, an IOT-binding method is a set of IOT-Statements and the Bind IOT-Module action interacts with the Perform IOT-Module action to perform the set of IOT-Statements. If satisfied, the IOT-Thing attribute switch NOT_FOUND is unset and attribute switch FOUND is set. In another embodiment, the FOUND switch is set, and UNFOUND is algorithmically represented as the negation of FOUND switch (i.e., the FOUND switch is unset).

The unbind action interacts with Memory IOT Module to identify an IOT-Thing by IOT-Listing, and to set IOT-Thing attribute switches so that the assertion "is UNBOUND and is NOT_FOUND" is true.

BitCoin IOT-Module

The BitCoin IOT-Module provides actions for using a bitcoin wallet. Corresponding IOT-verb actions include receive a bit coin, and send a bit coin. In one example within this disclosure the BitCoin IOT-Module could be used to perform a transaction within the system if desired.

Bootstrap IOT-Module

Bootstrap IOT-Module provides actions for booting the IOT-System. Some data including or used by this IOTModule could be retrieved from the optical identifier by the optical reader.

Condition IOT Module

The condition IOT-Module provides actions to evaluate an IOT-Condition having a sequence of IOT-Statements with an implied conjunctive logical connector between said IOT-Statements. The Condition IOT Module action interacts with IOT-Statements given by "request:" to organize IOT-Things according to order of precedence, and to evaluate the IOT-Things immediately dominated by the IOT-Thing given by IOT-Listing "request:". For each IOT-Statement in IOT-Statements, the action unsets context:status and interacts with perform action to perform said IOT-Statement, and in response thereto, asserts context:status is equal to satisfied; and in response thereto, if the context:status is not satisfied, then control returns to the perform action.

Configure IOT Module

The Configure IOT Module provides machine code actions to configure the state of an IOT-System. Exemplary verbs are configure, configure.verbs, configure.services, configure.task, and, load.dll.

The load.dll verb action uses operating system interfaces, such as dlopen( ) on a Linux System, to dynamically load a shared library (or dynamic link library on Windows operating systems), to configure machine code instructions in non-transitory memory. An interface, such as dlsym( ) is used to resolve a symbol to an address where the symbol is loaded in memory. These techniques, and others, for loading machine code in memory are well understood in the art. The IOT-Verb reference is set to the address. An embodiment can use a symbol representative of an initialization sequence of machine code such that when referenced by the load.dll action, the initialization sequence is performed, and the results thereof include a set of IOT-Verbs to be added to the IOT-Verb Vocabulary.

Referring to a FIG. 8A embodiment, specific data can be used to identify a start action, and, an end action. This enables performance of the start action upon parsing an opening element, and, performance of the end action upon parsing the closing element, such as in parsing XML.

In a tightly coupled embodiment, the load.dll action is performed with a reference to an IOT-Context, and, the action administers IOT-Things in said IOT-Context, and, a Memory IOT-Module action updates its state to reflect changes made in said IOT-Context. One skilled in the art can provide various memory models or safe guards to ensure machine code being performed does not adversely affect the state of the IOT-System.

The configure.service action uses operating system interfaces to interact with a non-transitory media storage device having data representative of a set of IOT-Services available to the IOT-System, and, interacts with Memory IOT-Module actions to set one or more IOT-Things to be representative of said IOT-Services.

The configure.tasks action uses operating system interfaces to interact with a non-transitory media storage device having data representative of a set of IOT-Tasks available to the IOT-System, and, interacts with Memory IOT-Module actions to set one or more IOT-Things to be representative of said IOT-Services.

A configuration document describes a configuration request to configure the state of an IOT System, where a request is data representative of one or more statements expressed in a syntactic notation, which is a possibly infinite set of legal elements that can be interpreted by a Parser IOT-Module action (Parser action), wherein the Parser action parses a representative statement as an IOT-Statement and a Perform IOT-Module action performs said IOT-Statement. The IOT-Verb with name "configure" is registered with representation of reference to a Configure IOT-Module action.

A verb modifier action enables a specific action to be performed. Exemplary modifiers include verb, task, and service.

Referring to FIG. 3D, a request to configure IOT-Verbs identifies a method to set the verb and reference to the corresponding IOT-Module embodiment. For an operating system implementation, the method can be an entry point in a dynamic link library to perform wherein the response is representative of a set of IOT-Verbs to be registered with the Memory IOT-Module as IOT-Verbs in the Verb Vocabulary.

A "using URR" indicates that the URR is to be evaluated so that the response of the evaluation can be used as the artifacts for the statement verb action to act upon. In the example, the verb:load is the requested action to be performed upon the artifacts dll=stdfile.dll and initialization=comprimInit.

An IOT-Verb can have a start and an end reference to embodiments to be performed wherein the start action is performed at the start of a sequence, and the end action is performed at the end of a sequence. This is particularly useful when parsing XML to perform a first action after reading and parsing the start tag, and, then performing the end action after reading and parsing the end tag. An IOT-Verb with a start action, and no end action, is performed by performing the start action.

To configure an IOT-Task, the request identifies the task name and provides a method to register a corresponding action block. In one example, the action block is included in the content being parsed (see FIG. 12) as a member of the IOT-List so that the following assertion is satisfied: There is a task where name is set, such that there is an action block, such that there is an IOT-List of IOT-Statements. In another embodiment the content satisfies the assertion: There is a task where name is set, such that there is a URR where value is not empty. In this context, the URR is evaluated and the response, if any, contains the action block. The action block is then set for the corresponding IOT-Task.

An Openssl IOT Module action is used to decrypt encrypted data to generate a configuration document that can then be used to configure the IOT-System. The configuration document can contain a representation of an IOT Module, such as machine code.

Connection IOT Module

The Connection IOT Module provides machine code actions to connect, accept, send, receive, and disconnect from a communication channel. In performance of the actions, the machine code interacts with a communication device such as a wireless communication device. As shown in FIG. 4 the system:socket.connect can be performed as a verb action by explicitly requesting that verb, or implicitly by a system:connect verb action when a subject of the request is recognized as related to a socket. Other forms of communication devices can be used such as sound wave, radio wave, optics, and/or wireless devices.

Connectivity IOT Module IOT-Connectivity is an IOT-Thing where the value specifies an optional communication primitive (a scheme as one would understand in the context of URIs), and a scheme-specific-part (a path) that can be interpreted by the scheme.

The bind action is used to bind the value so that when a path is specified without a scheme, then a candidate scheme can be determined by the bind action. For example, connectivity="/bin/who" includes a path component but not a scheme. The binding action can apply the file binding method and attempt to bind the IOT-Thing value to an accessible file. If the file is found, then connectivity="stdio:/bin/who" would be the bound value of the IOT-Thing if the file is executable, or connectivity="stdfile:/bin/who" (or simply file:/bin/who) if the file is not executable. Similarly, connectivity="iotnamespace.com/default.html" could be bound using the http binding method and the bound value would be connectivity="http://www.pdcx.com/default.html".

Communication primitives are provided through verb actions. Additional schemes (communication primitives) can be deployed, installed, registered, and used in configuration documents.

Control Flow IOT Module provides a break action to set context:control.flow to "break", to cause performance of an action block to be complete; a return action to set context: control.flow to "return" to cause performance of a task or service to be complete; and, a continue action to set context: control.flow to "continue" to cause performance of an action block to be complete and to cause the next iteration of a for each action, if any remain, to be performed. The perform action unsets context:control.flow prior to causing performance of an action.

Core IOT Module includes the Configure IOT Module, Parser IOT Module, and, the Perform IOT Module.

Discipline IOT Module provides an IOT-Discipline may have the name of an IOT-Verb, and said discipline is evaluated with respect to said IOT-Thing and a request statement, in place of the IOT-Verb action corresponding to the predicate of the statement.

Modifiers can be specified to distinguish state, such as "before", "as", "after", on "satisfied", on "unsatisfied", or on "failure". This enables a first discipline to be registered such that the discipline is performed before the IOT-Verb action, as the IOT-Verb action, or after the IOT-Verb action.

An IOT Discipline can be registered for an IOT-Thing that quantifies a listing. By way of example, in an IOT-System configured with a "system:send" IOT-Verb, and not configured with a system:send.email" IOT-Verb, then the assertion system:send is true, and system:send.email is not true. The discipline "evaluate send IOT-Task" is registered for the system:send IOT-Thing. In response to receiving a request to perform system:send.email, the IOT-System first asserts "system:send.email" which is not true; then asserts the quantifying listing "system:send" which is true, and then asserts has a discipline matching the requested IOT-Verb, which is true, and then performs the discipline.

A discipline can be registered for a first IOT-Verb wherein performance of the discipline selects a second IOT-Verb (such as an instance of the first IOT-Verb) to be used in performing an action. This allows a discipline to interact with the IOT-Things to be accepted upon, to further select an appropriate IOT-Verb action to perform.

In addition to class disciplines, the IOT-System can be configured with type disciplines, wherein a type discipline includes an IOT-ActionBlock. Type disciplines include before discipline, as discipline, and after discipline modifiers. For example, before set, before get, and before unset, are type disciplines that can be set for an IOT-Thing. Similarly, a before set, as set, and after set, can be specified.

When discipline IOT-ActionBlock is to be performed, the corresponding Memory IOT-Module action sets an IOT-Content, and registers the requested IOT-Thing as request: thing.name; the request value, if any, as request:thing.value. The IOT-ActionBlock is performed and the response:thing.name and response:thing.value, are used in setting the IOT-Context of the request: namespace for the next sequenced action in the discipline.

An IOT-Thing can have registered type disciplines. The type disciplines can be set, updated, or unset, as appropriate. The "get" discipline is performed when retrieving an IOT-Thing from the namespace. The "get.before" discipline is performed with requested input types, which can include selection criteria for getting one or more IOT-Things from the namespace. The "get.disc" discipline service is performed to retrieve the IOT-Thing (such as a database SELECT statement). The "get.after" discipline is performed with the results from the "get.disc" action and the response from the get.after service is then provided as the response to the request to retrieve IOT-Thing information from the namespace. Other discipline services can be added as appropriate such as a "set" discipline for inserting an IOT-Thing, an "update" discipline for updating an IOT-Thing, and an "unset" discipline for deleting an IOT-Thing. A "commit" discipline for committing changes can also be used. Discipline can use the ODBC IOT-Module actions with corresponding IOT-Verbs, or communicate with an external application providing data management services, such as ODBC or JDBC.

When registering an IOT-Thing in the namespace, the set.before discipline for the IOT-Thing can be performed to apply various constraints, such as converting between formats, changing characters to upper or lower case, condensing extraneous white space, eliminating unprintable or control characters, providing default values for missing composite IOT-Things, and the like. For example, an IOT-Thing type definition describing a book as containing composite members author, title, ISBN, and publisher, can have a set.before discipline service to fill-in the ISBN number using the title and author, if the ISBN number was not present.

The set.disc discipline service can be called to insert a record into a database, or add a new record to a data management system. The set.after discipline service is called after the set.disc, and generally is used for formatting and presentation actions.

When retrieving an IOT-Thing from the namespace, the get.before discipline can be performed to apply various constraints to the criteria, such as converting between formats, changing characters to upper or lower case, condensing extraneous white space, eliminating unprintable or control characters, providing default values for missing information components, and the like. The get.disc discipline can be performed to select a record from a database, or request a record from a data management system. The get.after discipline is called after the get.disc, and generally is used for formatting and cleansing of the result set. For example, a request to retrieve information about clients may be permissible within the confines of a corporate network, but not permitted when the request originates from outside of the corporate network. In such cases, the get.after discipline can be used to remove one or more IOT-Things within the response namespace.

A discipline can be registered for an IOT-Type. The disciplines for a registered IOT-Type are used by actions in administering instance of IOT-Things of that IOT-Type. An IOT-Type can be referenced in an IOT-statement, such as in: "set so that there is an IOT-Namespace with name request, such that there is a NewsArticle with name Article."

Evaluate IOT Module provides actions to interact with an IOT-Statement to select an appropriate verb from the IOT-Verb vocabulary and interact with the Perform IOT-Module action to perform a selected verb action to be performed. An IOT-Statement may be imperative. An IOT-Statement may be declarative. An IOT-statement may be interrogative. An IOT-Statement may be exclamatory. In the preferred embodiment, Evaluate IOT-Module action evaluates a service request by applying a set of Inference Rules.

Foreach IOT Module provides actions for performing an action block, for each time a condition is satisfied. A statement requesting the for each module action, has the form: for each IOT-Assertion IOT-ActionBlock. In another embodiment the action is performed for each IOT-Thing is an IOT-List using the form: for each IOT-Thing in IOT-List IOT-ActionBlock.

Format IOT-Module provides an action to interact with Memory IOT-Module to get information representative of an IOT-Thing; algorithmically interacts with said information to render an expression of the information, wherein the expression adheres to the syntax of a specification, such as a grammar or protocol specification; and, interacts with Memory IOT-Module to set an IOT-Thing value to the expression. An IOT-System can have a multiplicity of Format IOT-Modules providing different format actions. A first Format IOT-Module action interacts with the IOT-Information and generates data representation as XML content. A second Format IOT-Module action interacts with the IOT-Information and generates data representation as HTML Table content.

Geolocation IOT Module provides actions related to geo location. By way of example, report current location can register an IOT Thing representative of the current location including longitude and latitude. When available, the action can also register the altitude. An IOT-Event can be triggered if the geo location changes in value within a specified tolerance. The use of the Geolocation IOT module enables a machine to use its current location in evaluating rules.

IR Thermopile Sensor Module provides actions to interact with an Infrared Thermopile Sensor device, such as the Texas Instrument TMP007 to read target object temperature, from the device, and interacts with Memory IOT Module to record temperature as an IOT-Thing. In the preferred embodiment, the listing's value is set to the object temperature. By way of example, the statement "read temperature as thermopile:temperature is evaluated as a request to use the read the temperature verb and record the value as the value IOT-Thing given by the listing thermopile:temperature.

Learn IOT-Module provides actions related to tasks and IOT-Modules, such as discover, resolve, learn, configure, and update. The actions enable a first machine to perform an IOT-Verb action to interact with configuration information to obtain statements; to interact with Parser IOT-Module to parse a statement as an IOT-Statement, and to cause performance of the Perform IOT-Module to evaluate said IOT-Statement.

By way of example, a first machine requiring an "HTTP GET" action, interacts with Learn IOT Module, and in response thereto, the Learn IOT Module communicates with a second device to obtain communicated content representative of statements, and interacts with said statements to configure IOT-Things representative of an HTTP GET IOT-Task.

In another embodiment, the first IOT-device interacts with said statements to configure an IOT-Module and to configure an HTTP GET verb in the verb vocabulary with a representation of a reference to said IOT-Module.

In an embodiment, the Learn IOT Module interacts with Memory IOT Module and IOT-Openssl Module to provide an identity with digital signature for authentication, in communicating content representative of a request for HTTP GET action.

In an embodiment, authenticated content can include the information used by the second device to cause an IOT-Module to be delivered to an address. The address may be an electronic address. The address may be a physical address.

In performing an action a first device can communicate a request to a second device to perform the action and the second device performing an action and communicating the response to the first device. By way of example, a first device communicates an interrogatory statement to a second device "can you do an http get action for me" and in response thereto the second device performs the action and communicates the response to the first device.

Memory IOT-Module provides a set of actions referred to as disciplines, to administer named representations of data, and the relationships between them, as IOT-Things in non-transitory memory, according to the IOT-Class, with the default class being IOT-Thing. An IOT-Thing has a name, a value, an attribute set, and a relationship set. An embodiment can add additional components to IOT-Thing, such as an implementation dependent reference to a memory address.

An IOT-Thing name is an identifier used by Memory IOT-Module actions to distinguish a first IOT-Thing from a second IOT-Thing, though a multiplicity of IOT-Things having a common name can be administered according to their IOT-Class. Exemplary IOT-Classes include IOT-Thing, IOT-List, IOT-Namespace, IOT-Set, IOT-Verb, with the default IOT-Class being an IOT-Thing.

An IOT-Thing has an attribute set having a multiplicity of attribute switches, each switch having a state that is set or unset. IOT-Module actions interact with an attribute switch to set, get, unset, and test the switch state. By way of example, switch number 1 is set if the IOT-Thing is an IOT-Verb and switch number 2 is set if the IOT-Thing is BOUND.

An IOT-Listing is a representation of a reference to an IOT-Thing expressed in a grammatical syntax that can be parsed by an IOT module action to resolve said reference to an IOT-Thing. An IOT-Listing can be used by an action to evaluate an assertion about an IOT-Thing, such as the statement "There exists .x where name is equal to house, such that there exists .y where color is equal to orange", as shown in FIG. 3.

An IOT-Thing can be referenced in a satisfaction claim. Machine code is used to evaluate a representation of an assertion about an IOT-Thing, such as the statement "There exists .x where .x is an IOT-List" which would be true for all IOT-Things administered by Memory IOT-module that are IOT-List type of IOT-things. Logical connectives are used to connect two or more statements.

In a satisfaction claim, actions interpret "is a" as a representation of a reference to an IOT-Thing attribute set. As an example, consider the statement: "there is an IOT-Thing where name is equal to "request" and this IOT-Thing is an IOT-namespace". The IOT-Memory Module locate the IOT-Thing, and if said IOT-Thing has an attribute set including an attribute "IOT-namespace" then the statement is true, otherwise the statement is false. Actions interpret "is not a" as the negation of an "is a".

An embodiment can use the Configure IOT-Module to enable content describing an assertion about an IOT-Thing, and describing discipline actions, to set (meaning to register with) a domain IOT-Class. A second IOT-Thing declared as being a member of said IOT-Class, is then administered by the Memory IOT-Module causing said discipline actions to occur. This enables an embodiment to represent an IOT-Thing in non-transitory media.

Memory IOT-Module can interact with Bind IOT-Module to bind a representation of an IOT-Listing to an IOT-Class.

OpenSSL IOT-Module provides machine actions corresponding to openssl public key infrastructure commands. See http://ww.openssl.org for detailed information related to openssl. For simplicity, the embodiment enables the use of the openssl command as a verb action wherein parameters need not have a hyphen, and, wherein a file name may be specified as an IOT-Listing where appropriate. By way of example, one skilled in the art would understand the command line: "openssl ca -gencrl out crl.pem" as the openssl certificate authority command to generate a certificate revocation list. The equivalent statement for use is "openssl ca gencrl crl.pem."

The statement "openssl ca in request:pem out response: newcert" causes the openssl action to sign a certificate request given by the value of IOT-Thing corresponding to value of IOT-LISTING request:pem, as the value of IOT-Thing given by IOT-LISTING response:pem.

Similarly, "openssl ca infiles req1.pem req2.pem req3.pem" causes the verb action to digitally sign a multiplicity of certificate requests given by the input files req1.pem, req2.pem and req3.pem.

Similarly, "openssl genpkey algorithm RSA out key.pem" causes the verb action to generate an RSA private key using default parameters, saving said private key as the content of file key.pem, while "openssl genpley algorithm RSA out local:pkey" causes the verb action to generate an RSA private key using default parameters, saving said private key as the content of the IOT-Thing given by IOT-Listing local:pkey.

The openssl req verb action creates and processes certificate requests. It can additionally create self-signed certificates for use as a root Certificate Authority.

The openssl ca verb action is used to sign certificate requests, to revoke a certificate, and to administer signed certificates and revoked certificates.

The OpenSSL IOT-Module is the preferred PKI IOT-Module, though other PKI IOT-Modules can be embodied, such as a PGP IOT-Module.

OpenCV Module actions enabling OpenCV API as verbs for image processing. This enables captured images to be managed as IOT-Things, and manipulated using the OpenCSV verbs for image processing. By way of example, the statement "convert image:frame to text as result:text" is a statement requesting the system to convert the value of the IOT-Thing given by the listing image:frame, to text, and saving the result as the IOT-Thing given by the listing result:text. The statement "evaluate {result:text}" is a request to evaluate the statement given by the value of the IOT-Thing represented by the listing result:text. In this manner, a machine configured with an optical device such as a camera, a scanner, or optical reader, can interact with the device and register a device obtained image as an IOT-Thing, convert the image to text, and evaluate the text as a statement, such as a request statement to perform an action. The requested action can be a request to register an IOT-Task. Thus the machine learns how to perform a task it did not know how to perform prior to reading the document.

OKMS IOT-Module The Optical Key Management System (OKMS) IOT-Module provides an action including the steps of: setting reading angle; setting position; optically interrogating optical identifier; generating corresponding bitmap of digital data; and, interacting with digital data to set an IOT-Thing. An action can interact with Memory IOT-Module actions to obtain data to set a mechanical feature of the optical reader. By way of example, an action can use the value of reader:angle IOT-Thing to set the optical reader angle when reading optical identifier.

Parser IOT Module provides actions to parse a syntactic representation of a statement according to a language grammar, into constituent parts, each part being an IOT-Thing. The statement "convert request:name to uppercase" can be parsed as the IOT-statement predicate "convert to uppercase", and the IOT-statement subject "request:name". Similarly, the statement "convertire richiesta: nome in maiuscolo" can be parsed as the IOT-statement predicate "convertire in maiuscolo", and the IOT-statement subject "richiesta:nome". One example uses an English language Parser, a second uses an XML parser, and a third uses an Italian Language parser. Another example uses an IOT-Module to translate a statement from a first language to a second language. Parser IOT Module action parses content, such as content received using a protocol, or content obtained from digital data encoded in an optical identifier; as an IOT-Statement. Content can be generated by the performance of an action. An IOT-Statement, such as a request, can be evaluated. An IOT-Statement, such as an imperative command, with a verb corresponding to an IOT-Verb in the Verb Vocabulary, can be performed by the Perform IOT-Module. The Turtle Language Parser may be used to parse an RDF triple as an IOT-RdfTriple. The Turtle Language is described in RDF 1.1 Turtle, Terse RDF Triple Language, W3C Recommendation 25 Feb. 2014.

Two modes of parsing action are provided. A parser action in imperative mode, parses content to generate an IOT-Statement, and, interacts with Perform IOT-Module action to cause the IOT-Statement to be performed. Otherwise, parser action parses content as an IOT-Statement administered by IOT-Module as an IOT-Thing. The non-imperative mode enables the parser action to set an IOT-Thing representative of an IOT-List of IOT-Statements such that the name of the said IOT-List can be representative of an IOT-Verb name that can act upon said list.

Perform IOT Module provides actions to cause performance of an IOT-Statement by interacting with an IOT-Statement; identifying the IOT-statement predicate; interacting with Memory IOT-Module to get an IOT-Verb that may satisfy the predicate; setting the artifacts of the IOT-statement, if any, in a request namespace; and, causing performance of the IOT-verb action.

In one example, the Perform IOT-Module action interacts with Memory IOT-Module action to set the IOT-context for an IOT-Module action and then causes performance of said action with a reference to the context. In another example, the IOT-Module action is provided a representation of a reference to the context. In yet another example, an IOT-Module action interacts with IOT-Memory Module to request a context in which it is to perform, and in response thereto, the IOT Memory Module provides a reference to said IOT-Context.

An IOT-Module action can set the IOT-Context prior to evaluating a statement, and subsequently restore the context after the call completes. In setting an IOT-Context, an action can interact with accessible namespaces to create the context, and then set the context of accessible namespaces. Similarly, in resetting to a prior context, the action can interact with accessible namespaces to update the context, and then set the context of accessible namespaces. This enables state information to algorithmically be retained between context switches.

Similarly, an IOT-action can set the IOT-Context spanning the evaluation of a multiplicity of statements, and subsequently restore the IOT-context after the evaluation is complete.

A first IOT-Statement with a "using" IOT-Thing modifier, enables the Perform action to modify the IOT-Statement prior to performing the corresponding IOT-Verb. The using IOT-Thing is bound by the bind action. When bound to a URR, the perform action evaluates the URR in its own context, and uses the response as the artifacts that the first IOT-Statement is to act upon. When bound to an IOT-Thing, then the perform action sets a representation of the IOT-Thing in the request namespace, as the artifacts that the first IOT-Statement is to act upon. When bound to an IOT-Service, then the perform action evaluates the service in its own context, and uses the response as the artifacts that the first IOT-Statement is to act upon.

In a serialized IOT Module action, the request, response, and local IOT-namespaces are IOT-Stacks and the current representation of a namespace is at the top of the stack. In a parallel processing version of an IOT-Module, the request, response, and local IOT-namespaces are resolved relative to a context.

An embodiment can add an IOT-Verb Vocabulary to the context for an IOT-Module action, thus defining the scope of IOT-Verbs to be considered in performing an IOT-Statement.

PHI IOT-Module provides actions for generating random numbers, encrypting data, decrypting data, generating a digest, issuing a certificate, generating private and public key keys, revoking a certificate, validating a certificate, and other cipher and security related actions in support of a Public Key Infrastructure. The preferred embodiment is the OpenSSL IOT-Module.

Pop3 IOT Module provides addressable unit of logic enabling verb actions related to Post Office Protocol Version 3. Verb actions relate to QUIT, STAT, LIST, RETR, DELE, NOOP, RSET, TOP, UIDL, USER, PASS, and APOP commands as described in RFC1939. An action retrieves an email message using Post Office Protocol and interacts with Memory IOT Module to register a representation of said message (see FIG. 11).

Regex IOT Module provides actions related to regular expression matching as defined by the Open Group Base Specification Issue 6, IEEE Std 1003.1 2004 Edition. A first action interacts with IOT-Memory Module to register a status IOT-Thing with value satisfied, unsatisfied, or failed, in response to determining if a second IOT-Thing value satisfies a regular expression. A first action can interact with a Regex IOT Module action in a satisfaction claim to bind an IOT-Thing when its value matches a pattern.

Request Response IOT Module provides actions for request—response evaluation. The action interacts with Memory IOT-Module action to initialize an IOT-Thing representative of a request namespace, and initialize an IOT-Thing representative of a response namespace. The action performs the steps of: receiving a representation of a request from a requester; parsing said representation into a request IOT-Namespace; evaluating inference rules to infer an IOT-Statement to perform; performing said IOT-Statement; performing a format action to format the response: IOT-Namespace; and, sending response to requester.

Sockets-Comprim IOT Module provides addressable unit of logic enabling verb actions related to the use of TCP/IP sockets. One skilled in the art can configure verb actions for the use of different socket types, and actions needed.

StreamEditor IOT Module provides addressable unit of logic enabling verb actions related to stream editing.

Task IOT Module The Task IOT Module interacts with the Memory IOT Module, and provides actions to administer IOT-Tasks. Actions include registering an IOT-Task; configuring an IOT-Task, deleting an IOT-Task; referencing an IOT-Task; and performing an IOT-Task. An embodiment can add additional actions necessary for administering an IOT-Task.

Referring to FIG. 12, a statement representative of a request to register a task includes an identifier and a sequence of statements describing the steps necessary to perform, in order to perform the task. The task named "Get.File" can include the sequence of: 1) opening a file; 2) reading a file; and 3) closing a file.

The Task IOT-Module interacts with Memory IOT module to register an IOT-Thing representative of a task. Referring to FIG. 10, the registration action includes registration of the task name and registration of the sequence of IOT-Statements. In another embodiment, the registration action includes registration of the task name and registration of a Uniform Resource Request representative of a request statement to perform such that the response includes information representative of the sequence of statements required in performing the task.

A machine, having knowledge of the sequence of statements (i.e., the steps) required to perform a task, requires the use of IOT-Verb actions in performing the steps. If the machine does not have a required IOT-Module and corresponding IOT-Verb, then the machine knows how to perform the task but is unable to perform the task.

In a one example a request to perform a task identifies the desired task by name, such as "perform task get file", or more simply "get file". The machine interacts with Memory IOT-Module to locate the appropriate IOT-Task, and evaluates the corresponding statements of that task.

In another embodiment, the action interacts with the IOT-Thing representative of the task to determine if the statements can be evaluated based on the current IOT-Verb vocabulary. When a required verb action is not in the verb vocabulary, the IOT-Thing is given the BOUND, NOT_FOUND attributes. When a request is made to perform a task, and the system interacts with Memory IOT to locate an appropriate IOT-Thing task, and the IOT-Thing task has the attributes BOUND, NOT_FOUND, then the request is unsatisfied and the task is not performed.

In yet another embodiment, the action interacts with the OpenSSL Module to validate a digital signature included in the request to evaluate a statement to authenticate the statement. By way of example, a request to register a task can be authenticated to ensure the request is authorized. By way of example, a request to perform a task can be authenticated to ensure the request is authorized.

Unity 3D Module provides an addressable unit of logic enabling verb actions for 2d and 3d gaming verb actions corresponding to the Unity Gaming creating 2D/3D games and interactive experiences. Verbs are described in Appendix A.

URR IOT-Module provides for the Uniform Resource Request as a representation of a request to be satisfied within the semantic domain defined by the dynamically configured service actions accessible to the IO-System. Unlike a URI, which identifies a resource, the URR identifies a resource request.

Uniform Resource Request

The Uniform Resource Request represents a request to be satisfied within the semantic domain defined by the dynamically configured service actions accessible to the IO-System. Unlike a URI, which identifies a resource, the URR identifies a resource request.

The Uniform Resource Request (URR) consists of both a grammar and a description of basic functionality for Uniform Resource Request. The Uniform Resource Request (URR) provides an extensible framework for satisfying a resource request by extending and ensuring interoperability with the W3C Uniform Resource Identifier specification. A Uniform Resource Identifier (URI) is an object that can act as a reference to a resource, where a resource is anything that has identity. A resource is not necessarily network retrievable, but the resource has identity. A Uniform Resource Identifier can be classified as a locator, a name, or both.

The term "Uniform Resource Locator" (URL) refers to the subset of Uniform Resource Identifiers that identify resources via a representation of their primary access mechanism (e.g., their network "location"), rather than identifying the resource by name or by some other attribute(s) of that resource. The Uniform Resource Locator is a standard for referencing web documents, and the predominant scheme is http. Other URL schemes include file, ftp, gopher, https, Idap, smtp, and telnet. Uniform Resource Locators are transient, and lack metadata to more accurately identify an intended resource (such as author, creation date, etc.). Various Uniform Resource Locator schemes have been proposed over the years describing alternative transport protocols. The Service Location Protocol defines network access information for network services using a formal notation. In the Service Location Protocol, a User Agent can broadcast a request for available services to Service Agents, and can receive advertisements of available services broadcast by Service Agents. The User Agent uses this information to resolve a request for a particular type of service to the network address of the service. The service: Uniform Resource Locator is intended to allow arbitrary client/server and peer-to-peer systems to make use of a standardized dynamic service access point discovery mechanism.

Uniform Resource Request (URR) provides a simple and extensible framework for evaluating a resource request. This specification of Uniform Resource Request syntax and semantics is derived from concepts introduced by the World Wide Web global information initiative. The term Uniform Resource Request identifies a request for a resource via a representation of a namespace listing, rather than identifying the resource by name or by some other attribute(s) of that resource, such as a network location.

An IOT-Namespace (or more simply a namespace) is an IOT-Thing representative of a collection of IOT-Things, and provides scope, meaning the extension of IOT-Things in the subject matter, in comparison to all possible IOT-Things.

A Memory IOT-Module action is performed to resolve a reference to a listing within the namespace. When a listing can be bound to an IOT-Verb, then the normalized named representation(s) of data describing the request are registered in the request namespace prior to performing the IOT-Verb action, and upon completion of the action, the response (if any) is registered in the response namespace.

When the listing can be bound to IOT-Thing that is not an IOT-Verb, then information representative of the IOT-Thing is registered in a response namespace.

A response action, which may be distinct from the scheme handler, can provide the content of the response namespace (if any) as the response to the resource request.

General Uniform Resource Request Syntax

In evaluating a resource request, a system may perform a variety of operations to satisfy the request, as might be characterized by such words as: access, call, connect, disconnect, email, evaluate, export, exec, fax, find, fork, forward, get, import, locate, perform, post, print, put, query, receive, register, remove, rename, replace, search, send, set, talk, trigger, unset, update, verify, and so forth.

Uniform Resource Request conforms to the generalized syntax of a Uniform Resource Identifier, given as:

<scheme>:<scheme-specific-part>

The Uniform Resource Request scheme is bound to an IOT-Namespace. Following the namespace is a colon (":") delimiter. An optional listing precedes the scheme-specific-part. Thus, the syntax can be read as:

<namespace>:<listing><scheme-specific-part>

The optional listing is a representation of a reference to an IOT-Thing quantified by the namespace.

The Uniform Resource Request extends the subset of Uniform Resource Identifiers that share a common syntax for representing IOT-Thing relationships through a "generic URI" syntax, by introducing an optional listing following the <scheme>: portion, given as:

<scheme>:<listing>//<scheme-specific-part>

Uniform Resource Requests consist of a restricted set of characters, primarily chosen to aid transcribability and usability both in computer systems and in non-computer communications and adhere to the Character and Escape Sequences defined in Uniform Resource Identifiers (URI): Generic Syntax.

A namespace has a restricted set of characters, primarily chosen to aid transcribability and usability both in computer systems and in non-computer communications, and adhere to the Character and Escape Sequences defined in Uniform Resource Identifiers (URI): Generic Syntax.

The optional listing is a reference to an IOT-Thing in the namespace, and a delimiter can be used to reference a composite of an IOT-Thing within the namespace. Additional schemes and services can be added. A Uniform Resource Request can be communicated using various Uniform Resource Identifier schemes, such as the http Uniform Resource Locator. The Uniform Resource Locator shown below, for example, is a Uniform Resource Identifier where the scheme-specific portion is a Uniform Resource Request. The named representation of data, given by listing, is a representation of a reference to a second Uniform Resource Request.

Example http://localhost/pdcx:
request.talk?listing="staff.member@iotnamespace.com"

Verb Vocabulary IOT Module

The Verb Vocabulary IOT-Module provides actions for administering IOT-Verbs in an IOT-Verb vocabulary.

A first action adds an IOT-Verb Vocabulary as an IOT-Thing administered by IOT Memory Module. For example, the request is "set vocabulary:verb" and the action performed is: do so that there is an IOT-namespace where name="vocabulary" such that there is an IOT-Thing where name="verb" and this IOT-Thing is a verb vocabulary. In performance of the action, the "is a verb vocabulary" portion of the action sets said IOT-Thing attribute to indicate the IOT-Thing is a verb vocabulary.

A second action removes an IOT-Verb Vocabulary from IOT-Things administered by IOT Memory Module. A third action adds an IOT-Verb to an IOT-Verb Vocabulary. A fourth action searches an IOT-Verb Vocabulary for an IOT-Thing satisfying a satisfaction claim, and provides a representation of a reference to said IOT-Thing. A fifth action removes an IOT-Verb from an IOT-Verb Vocabulary.

In an embodiment, the Memory, Parser, and, Perform IOT-Modules can be combined and manufactured as a Core IOT-Module (see FIG. 5).

Elaboration of Terms

IOT-ActionBlock An IOT-ActionBlock is an IOT-List of IOT-Statements to be evaluated in an IOT-Context having a common local namespace. The common local namespace persists until the evaluation of the action block sequence is complete. The Perform IOT-Module interacts with Memory IOT-Module to set the local IOT-Context at the start of the action block sequence, and unset the local IOT-Context upon completion of the sequence.

IOT-Array An IOT-Array is an IOT-Thing representative of a collection of IOT-Things that can be referenced by indices.

IOT-Artifact An IOT-Artifact is an IOT-Thing an IOT-Module action can interact with.

IOT-Behavior IOT-behavior refers to the way in which a first IOT-Machine works in relationship to second IOT-Machines, as measured by a second IOT-Machine's IOT-Knowledge of said first IOT-Machine. Acceptability of a behavior is determined by the semantic norm (one or more rules that is/are enforced by the semantic configuration of the IOT-System). Behavior can be sanctioned in an effort to bring about compliance of the rules.

IOT-Capability An IOT-Thing representative of a grant of authority to perform an action, or, to perform an action on an IOT-Thing. In one example, the Capability is representative of a verb vocabulary and the grant of authority is to request a verb in the verb vocabulary be performed. In another embodiment, the grant of authority is access to an IOT-namespace. In yet another embodiment, the grant of authority is the right to request a URR.

IOT-Category An IOT-category is an IOT-Thing representative of a group to which an IOT-Thing can be a member of Inference rules can be used to infer if an IOT-Thing is a member of the IOT-Category.

IOT-Class An IOT-class is a collection of IOT-Things satisfying membership criterion that specifies exactly what is required for an IOT-Thing to be a member of the IOT-Class at any given time. The intension is the time dependent membership criterion. The extension of the IOT-class is the listing of all members at that time. Discipline actions are provided for different IOT-Thing classes, such as the IOT-Thing, IOT-List, and IOT-Set classes. This enables the Memory IOT-Module to administer IOT-Things according to the specification for the given class.

IOT-Concept An IOT-concept is an IOT-Thing that serves to designate an IOT-Category or IOT-class of IOT-Things, IOT-events, or IOT-relations.

IOT-Connectives The IOT-AND, IOT-EQUIVALENT, IOT-NAND, IOT-NOTEQUIVALENT, IOT-NOR, IOT-NOT, IOT-OR, IOT-XNOR, and IOT-XOR are logical connectors (IOT-LogicalConnectors) having a first IOT-Statement and a second IOT-Statement.

IOT-Context An IOT-Context is an IOT-Thing representative of the context in which an IOT-Module action performs an action. Context refers to the set of IOT-Things considered in performance of a statement. A context can be used to define scope, meaning the extension of IOT-Things in the subject matter.

A shared context is that set of IOT-Things common in performance to a multiplicity of IOT-Module actions. A local context is that set of IOT-Things unique to the performance of an IOT-Module action. A global context is that set of IOT-Things common in performance of IOT-Machine IOT-Module actions. An IOT-Context can be used as a capability to evaluate a request by defining the scope of IOT-Things available in evaluating the request.

IOT-CoordinateSystem An IOT-CoordinateSystem is an IOT-Thing representative of a multidimensional coordinate system enabling declarations defining the range of points, such as: There is an IOT-Thing where this IOT-Thing is an IOT-CoordinateSystem such that there is an X with range 0 . . . 2 and there is a Y with range 0 . . . 2, and there is a Z with range 0 . . . 2. This enables a listing to include a reference to the coordinates such as Graph[x=0, y=2] which is distinct from Graph[0][2].

IOT-Core Verb VocabularyIOT-Core Verb Vocabulary is an IOT-Thing representative of the set of IOT-Verbs available after IOT-system initialization. In the preferred embodiment these include: configure, parse, and perform. The corresponding IOT-Modules are Configure IOT-Module, Parser IOT-Module, and Perform IOT-Module.

IOT-Credential An IOT-Credential is a representation of an authorization generated by an IOT-Module action. An IOT-Credential can be multipart. A part can include configuration content, such as for configuring a task or service. A part can include a PKI certificate that binds a public key to an identifier. In the preferred embodiment, an IOT-Credential includes an X.509 Certificate including an identifier representative of an IOT-Listing administered by a Namespace Provider service.

IOT-Discipline An IOT-Discipline is an IOT-Thing representative of an IOT-Statement to be evaluated in performing a Memory IOT-Module action related to an IOT-Thing. Standard disciplines include set, get, and unset. Modifiers can be added to provide for before, as, and after actions; such as, before set, evaluate this statement; or after unset evaluate this statement.

IOT-Empty An IOT-Empty IOT-Thing is representative of an IOT-Thing that no longer exists in the IOT-Context. For example, to unset IOT-Thing seal:cipher the IOT-System can set the IOT-Thing to be an IOT-Empty IOT-Thing.

IOT-Event An IOT-Event is an IOT-Thing that happens (meaning a change in state) at a certain point in time, the occurrence of which can cause performance of a machine action.

IOT-Experience IOT-Experience is the change in IOT-Knowledge between the start of an action, and the end of the action. The overall IOT-experience of an IOT-System is expressed by the state of the IOT-Things in the IOT-System at a given moment in time, as compared to the a priori IOT-Knowledge.

IOT-HashTable An IOT-HashTable is an IOT-Thing representative of an associate array of IOT-Thing members wherein a discipline action transforms the key into the index of the array element of the IOT-Thing member. A discipline action resolves hash key collisions.

IOT-Hypernym An IOT-Hypernym is an IOT-Thing in which the IOT-Thing name includes the meaning of a more specified IOT-Thing name. An IOT-Hyponym is an IOT-Thing in which the IOT-Thing name is included within that of another IOT-Thing name. IF ever there is an IOT-Thing .x such that .x is an A, then .x is a B if A is a hyponym of B.

IOT-Knowledge IOT-Knowledge is the collective IOT-Things of an IOT-System, representative of facts, information, and IOT-Tasks, acquired through IOT-experience or IOT-learning.

IOT-Identifier An IOT-Identifier is a sequence of characters used to identify, or refer to an IOT-Thing. An IOT-Thing name is an IOT-Identifier.

IOT-Learning IOT-Learning is a machine action that configures IOT-understanding through the acquisition of a priori facts (IOT-Things that are true), skills (IOT-Things that can be performed) and information (IOT-Things).

IOT-List An IOT-List is an IOT-Thing representative of a sequence of IOT-Things that are members of the IOT-List. In an IOT-List, members may be addressed by ordinal position as instances, or in a sequence. In a circular IOT-List, the last member of the IOT-list references the first member of the IOT-List, Duplicate member names are permitted.

IOT-Listings An IOT-listing is a representation of a reference to an IOT-Thing wherein said representation is expressed in a grammatical syntax that can be parsed by an IOT module action to resolve said reference. The IOT-Thing identifier is the simplest form of an IOT-Listing. The grammar can specify a delimiter to denote the end of a first identifier string, and the start of a second. In the preferred embodiment, the listing "first.second" is interpreted as "there exists an IOT-Thing where name is equal to 'first' such that there exists an IOT-Thing where name is equal to 'second', which corresponds to the predicate logic statement "there exists .x where name is equal to 'first', such that there exists .x where name is equal to 'second'". An equivalent assertion is "There is a first such that there is a second".

An IOT-listing may be quantified by a namespace reference in an IOT-listing. By way of example, the listing "request:statement" is interpreted as "There exists namespace .x where name is equal to 'request', such that there exists .x where name is equal to 'statement'". In an embodiment, a namespace reference provides a shorthand notation for a representation of a reference to an IOT-Thing that provides the scope of things quantified by that namespace.

The statement "first(second=1 third=string)" is interpreted as "There exists .x where name is equal to 'first', such that ((there exist .y where name is equal to 'second' and value is equal to '1') and (there exists .z where name is equal to third and value is equal to string")). An equivalent statement is "There is a first such that there is a second=1 and third=string.

An IOT-identifier in a listing can be expressed as a reference to an IOT-Thing value such as the listing "{a}" which is interpreted as: "There exists .x (where name=a) such that there exists .y where name=value of (.x).

In the preferred embodiment, IOT-Modules interact with Memory IOT-Module to act upon IOT-Thing by reference to the IOT-Listing.

IOT-Machine An IOT-Machine includes one or more processors; memory; an input port; an output port; an optical reader; and, an optical identifier encoded with digital data that can be optically read and used by an IOT-Module machine action.

IOT-Module An IOT-Module is an embodiment that can be performed by a machine. Performance of the IOT-Module is a machine action, which may interact with a second IOT-Module action, such as the Memory IOT-Module action, to act upon an IOT-Thing.

IOT-Namespace (or more simply a namespace) is an IOT-Thing representative of a collection of IOT-Things, and provides scope, meaning the extension (range over which things extend) of IOT-Things in the subject matter, in comparison to all possible IOT-Things. A namespace provides a shorthand notation for a representation of a reference to an IOT-Thing that provides the scope of IOT-Things quantified by that namespace. An IOT-Thing quantified by a namespace, can itself be a namespace. This enables the listing a:b:c: to be interpreted as "There is a namespace 'a' such that there is a namespace 'b' such that there is a namespace 'c:'". A namespace may persist until system is terminated. A namespace may persist through the duration of a verb action. A namespace may persist while the machine is running. The set of available namespaces at a given moment is defined by the IOT-Context.

IOT-Protocol The Core IOT-Protocol is an application protocol defining the rules for performing configuration request to self-assemble a run-time IOT-Protocol. The Core IOT-Protocol functions as a request-response application protocol, independent of how the request is received or how the response is sent. In response to setting a request in the request IOT-Namespace, the Perform IOT-Module action performs the steps of interacting with the request to identify a verb; selecting an IOT-Verb action to satisfy the request; and, performing the IOT-Verb action. The response, if any, is in the response IOT-Namespace.

IOT-Queue An IOT-Queue is an ordered IOT-List in which insertion into the Queue occurs on one end, and removal from the Queue occurs on the other end.

IOT-RdfTriple An IOT-RdfTriple is an IOT-Thing representative of an RDF Triple. An IOT-RDFTriple has an IOT-Subject, IOT-Predicate, and a IOT-Object. An IOT-Subject is an IOT-Thing. An IOT-Predicate is an IOT-Thing. An IOT-Object is an IOT-Thing. See W3C RDF Schema 1.1, W3C Recommendation 25 Feb. 2014.

IOT-Reasoning IOT-Reasoning is a machine action that uses symbolic logic to infer an IOT-statement to perform and causes performance of said IOT-Statement. An embodiment may use the expert system described in Matrix controlled expert system producible from examples, U.S. Pat. No. 4,730,259 A.

IOT-Relation An IOT-relation describes how a first IOT-Thing relates to a second IOT-Thing.

IOT-Satisfaction Claim A satisfaction claim is an assertion about an IOT-Thing. A satisfaction claim asserts that one or more IOT-Things satisfy a given predicate. The <, <=, =, =>, and > predicates have their customary meaning. Logical connectives and quantifiers are used with satisfaction claims to make assertions about IOT-Things. Conjunction and disjunction group from left to right. The order of precedence is negation, conjunction, and then disjunction.

IOT-Schema An IOT-Schema is a specification describing a type of IOT-Thing that conforms to a set of properties, wherein a property can be referenced in an assertion about the IOT-Thing.

IOT-Service An IOT-Service is an IOT-Thing with an IOT-ActionBlock representative of a unit of work expressed as a sequence of IOT-Statements, to be performed to satisfy a request which may be on behalf of someone, or something.

IOT-Set An IOT-Set is an IOT-Thing representative of a collection of IOT-Things of the same type that are members of the Set, such that no duplicate member names are permitted.

IOT-Stack An IOT-Stack is a first IOT-Thing representative of the current instance, in which a second IOT-Thing can be pushed onto the IOT-Stack as the current instance, and subsequently popped off the IOT-Stack, restoring said IOT-Stack to the first IOT-Thing.

IOT-Statement An IOT-Statement is an IOT-Thing representative of a statement, such as a request to perform an action.

IOT-Statement Evaluation Evaluation of an IOT-Statement can result in one of three states: satisfied, unsatisfied, or failed, with the later indicating the IOT-System was unable to perform the statement. The state can be registered as an IOT-Thing, thus enabling performance of a first IOT-Module machine code to set the state information and a second IOT-Module to get the state information and use said information in a select action.

IOT-Study IOT-Study is a machine action to acquire information and register said information as IOT-Knowledge about a given subject (the grammatical constituent about which something is predicated).

IOT-System an IOT-System includes a multiplicity of IOT-Modules. In the preferred embodiment this includes a Bootstrap IOT-Module; a Configure IOT-Module; a Memory IOT-Module; a Perform IOT-Module; a Parser IOT-Module; an OKMS IOT-Module; and, a Perform IOT-Module.

IOT-Task An IOT-Task is an IOT-Thing with an IOT-ActionBlock. Wherein an IOT-ActionBlock is representative of a request to perform a sequence of IOT-Statements, the IOT-Task provides quantification of the action block by task name.

IOT-Thing An IOT-Thing is a machine memory representation of data in non-transitory memory that an IOT-module can interact with. IOT-Things are administered by the Memory IOT-Module.

IOT-Type An IOT-Type is an IOT-Thing representative of a type definition describing the requirements for an IOT-Thing to be classified as the type. An IOT-Module action interacts with Memory IOT-Module action to set (register) an IOT-Thing representative of the type. The registration action can also register a set of IOT-Thing Disciplines for administering representations of an IOT-Thing of this type definition.

IOT-Understanding IOT-Understanding is the ability of the machine to interact with IOT-concepts and IOT-relations to infer a conclusion and cause performance thereof, such as by IOT-Reasoning.

IOT-Verb An IOT-Thing with a representation of a reference to an embodiment that can be performed by a machine, is an IOT-Verb and the performance of the embodiment is a machine action referred to as the verb action. An IOT-Verb is also referred to as an actor, and the IOT-Verb action as the action performed, and an IOT-Thing it acts upon as an IOT-Thing artifact. A binding method may bind an IOT-Thing artifact as an IOT-Hypernym, or an IOT-Hyponym.

The IOT-Core Verb Vocabulary is an IOT-Thing representative of the set of IOT-Verbs available after IOT-system initialization. The IOT-Verb Vocabulary is an IOT-Thing representative of the set of all IOT-Verbs available at a moment in time. IOT-Verbs can be added to, or removed from the IOT-Verb Vocabulary. A set of related IOT-Verbs can be represented in a namespace or by an IOT-Category. For example, a set of IOT-Verbs related to a protocol can be grouped into a namespace such as the http namespace.

The IOT-Verb name is a representation of a word or phrase representative of the action to be performed. A first machine may be configured with words conforming to a first vocabulary, and a second machine may be configured with words conforming to a second vocabulary. An IOT-Verb performing a "set" action, has an IOT-Verb name given as "set" in a first machine, and given as "t h" in a second machine. An IOT-System can use a multiplicity of IOT-Verb Vocabularies, each conforming to a different language.

IOT-Verb Container A Verb Container IOT Module is a first addressable IOT-Module whose action resolves a representation of a listing to a second addressable IOT-Module embodied within said first addressable IOT-Module, and causes performance of the second address IOT-Module.

By way of example, if the assertion: "There is a .x where name is equal to socket, such that there is a .y where name is equal to connect" is not true, and the assertion "There is a .x where name is equal to socket and .x is a Verb Container" is true, then the socket verb action is performed with a reference to a representation of the desired verb name (in this example: socket.connect), and the IOT-Module action causes said desired action to be performed.

As shown in FIG. 4, there is a namespace where name is equal to system such that, there is an IOT-Thing where name is equal to socket such that there is an IOT-Thing where name is equal to connect. When said IOT-Thing has a representation of a reference to an IOT-Module embodiment, then said IOT-Thing is an IOT-Verb.

IOT-Verb Vocabulary An IOT-Thing that quantifies a set of IOT-Verbs is an IOT-Verb Vocabulary. IOT-Verbs can be added to, or removed from the IOT-Verb Vocabulary.

IOT-ViewPath An IOT-Viewpath is an IOT-Stack of IOT-Listings that are used, in the order specified, to resolve a relative IOT-Listing, and, using copy on write semantics, sets new and/or updated IOT-Things, relative to the top layer of the stack.

Example Application: Optical Key Management System

Several embodiments are related to key management. Various forms of public key infrastructures and cloud storage encryption are well known in the art. The Enterprise Key Management System (EKMS) from Box, Inc., for example, provides cloud services without any central key control. The customer uploads the file to the EKMS Box, and the EKMS Box APIs are used to scan file content in real-time as it is uploaded, and detects sensitive information based on the organization's policies, including industry and country regulations—GLBA, PCI, HIPAA, the EU Data Protection Act, UK ICO guidance, the Australian Privacy Amendment Act and US State Privacy Laws. The disadvantage to the system is that a user must first upload the file to the EKMS Box running on the Amazon Cloud, before the file is encrypted. Similarly, the user must manage the keys that are used to encrypt the content.

The embodiments seek to overcome the limitations by providing a key management system including an optical identifier encoded with pure random data, to generate a multiplicity of unique id.

This exemplary embodiment is an IOT-Machine wherein an optical identifier includes digital data representative of pure random numbers, and, an IOT-System providing optical identifier key management services.

This IOT-Module machine action provided includes the steps of: optically interrogating an optical identifier encoded with digital data; receiving a representation of digital data in non-transitory memory; algorithmically partitioning said representation into pure random data (PRD) parts stored in non-transitory memory; algorithmically hashing an identifier to generate a combination code in non-transitory memory; interacting with PRD parts in the order identified by combination code, to algorithmically generate a unique ID.

Additionally, the instant example provides for the concept of an IOT-module action. The IOT-Module action performs the steps of: receiving a representation of digital data from optical reader, said representation representative of Pure Random Data; algorithmically partitioning said representation into pure random data (PRD) parts, and, registering each said part in non-transitory memory as a named representation of data wherein the name is representative of the ordinal position of the PRD part and the value is representative of the partitioned pure random data.

In a preferred embodiment, machine code action interacts with Memory IOT-Action to use the private namespace, to store the representation of digital data as the value of an IOT-Thing. Machine code actions partition said value into ten parts, each part being 2048 bits, and each part registered as value of IOT-Things named private:PRD.part[0] through private:PRD.part[9].

An IOT-Module action interacts with a non-transitory memory representative of a combination code, wherein each of the digits represents a reference to a corresponding numbered PRD part in non-transitory memory, and interacts with said PRD part in the order specified by the combination code, to algorithmically generate a unique ID based on the combination code.

In an embodiment the unique ID can be algorithmically generated by performing an action to initialize unique ID to 0; and, for each digit in combination code, as digit, exclusive OR value of unique ID and value of PRD part named by the value of digit, as unique ID. Other algorithms can be employed to generate a unique ID using combination code and PRD data parts.

A predetermined combination code can be used by the embodiment for a specified purpose. For example, combination code 0-1-2-3-4-5-6-7-8-9 can be used to generate a unique ID representative of a device ID; and combination code 9-8-7-6-5-4-3-2-1-0 can be used to generate a unique ID representative of a device key.

In other cases, machine code is used to generate a combination code from an identifier, such as by performing a hash algorithm to map non-transitory memory data representative of an identifier, to non-transitory memory combination code. The combination code can then be used by machine code to interact with PRD data parts to algorithmically generate a unique id.

In the preferred embodiment, an IOT-Listing is representative of an identifier associated with content, and, an IOT-Thing value is representative of said content. IOT-Module action performs a hash algorithm to map the identifier to a combination code. The combination code is then used by IOT-Module action to generate a unique ID.

A unique ID can be used to represent a thing in the application domain. For example, a unique ID can be used to represent an identifier; a device; a user; an organization; an issued identification such as a state driver's license, a passport, a file; non-transitory media; a message; a module; a request; a response; content; a service; a key, a password, or, a physical item.

A machine with a second optical reader that a user can interact with using a second optical identifier, such as one embodied in an identification card, or, one to be associated with an item such as an optical identifier embodied as part of a UPC label, enables a second set of PRD parts to be used. An advantage in using the second set of PRD Parts is that the second optical identifier is not embedded in the machine and thus may be used with a second machine at a later time.

In the preferred embodiment, digital data includes a representation of 20480 bits of pure random data, and, the optically read representation of digital data is partitioned so that each PRD part is 2048 bits in size.

Using Generated Unique ID from the Optical Identifier

A machine action includes the steps of: interacting with a content identifier to generate a combination code in non-transitory memory; interacting with PRD parts in the order given by combination code, to algorithmically generate a generated unique id; and, using a cipher action to encrypt content using generated unique id as the password.

In the preferred embodiment, IOT-Module action is performed with a reference to an IOT-Listing. The action interacts with Memory IOT-Module action to reference an IOT-Thing. The action performs the steps of: performing a hash action to algorithmically hash said IOT-Thing identifier to generate a 10 digit combination code in non-transitory memory; interacting with PRD parts in the order given by combination code, to algorithmically generate a generated unique id; and, performing a cipher action to encrypt the IOT-Thing value using unique id as the password.

Referring to FIG. 47, IOT-Module action performs the steps of: setting the value of IOT-Thing request:content.identifier to an identifier representative of the content; setting the value of IOT-Thing request:content.seal.cipher to the name of the cipher; setting the value of IOT-Thing request:content.seal.password to the generated unique id; and, setting the value of IOT-Thing request:content.body to the unencrypted content.

Referring to FIG. 48, IOT-Module action performs the step of: performing the cipher, given by name as the value of request:content.seal.cipher, to encrypt the value of IOT-Thing request:content.body using the value of request:content.seal.password as the password.

In one embodiment, IOT-Thing request:content.seal.password is unset, the response content formatted in XML and stored in non-transitory media as encrypted content. A device having the same PRD parts, content identifier, and machine code for generating combination code and combination code password, can generate the same password at a later time, to decrypt the encrypted content.

In another embodiment, a public key is used as referenced in FIG. 49 and FIG. 50. The public key is used to encrypt a representation of the cipher name and the generated unique id, so that a corresponding private key can subsequently be used to decrypt the information.

Referring to FIG. 49, IOT-Module action formats IOT-Thing request:content.seal and its children, using XML as the value of request:content.seal. IOT-Things request:content.seal.cipher, and request:content.seal.password are unset.

Referring to FIG. 50, IOT-Module action performs a cipher action performing RSA algorithm on value of IOT-Thing request:content.seal using a public key produced by performing an asymmetric key algorithm. The encrypted content is base64 encoded and set as the value of request:content.seal.

Referring to FIG. 51, IOT-Module action formats IOT-Thing request:content and its children, using XML. IOT-Thing request:content is then set to the formatted XML content. IOT-Things request:content.identifier, request:content.seal, and request:content.body are unset.

The value of IOT-Thing request:content can be saved to non-transitory media. Alternatively, the value of IOT-Thing request:content can be communicated to a cloud storage service, such as Amazon Cloud.

Public and Private IOT-Thing Management

IOT-Machine has an input port to receive communications and an output port to send communications. A port may be wired, such as to a mobile device dock or installation within an appliance's housing, or could be wireless using protocols such as Bluetooth, ZigBee, LoPAN, WiFi, or other wireless communication protocols. The system may be embodied using a system on a chip.

IOT-Module action interacts with the Memory IOT-Module action to set the private and public namespaces, and to set discipline actions so that state changes are registered in non-volatile non-transitory storage, such as NVRAM or media. This enables IOT-Module actions to initialize the namespaces using stored IOT-Thing information, and, to store IOT-Thing information to reflect state changes.

A first predetermined combination code, such as combination code 0-1-2-3-4-5-6-7-8-9, is used to generate the unique ID representative of the device ID, and, a second predetermined combination code, such as combination code 9-8-7-6-5-4-3-2-1-0, is used to generate the unique ID representative of the device key.

The IOT-Machine action performs an asymmetric key generation algorithm to generate a public key private key pair. In one embodiment, openssl genrsa is performed. The action encrypts the private key using the value of device key as the password.

IOT-Module action interacts with Memory IOT-Module action to perform the steps: setting IOT-Thing private: device.privateKey to the value of encrypted private key; setting IOT-Thing private:device.key to the value of device key; setting IOT-Thing public:device.publicKey to the value of public key; and, setting IOT-Thing public:device.Id to the value of device ID The IOT-Module action includes: generating a combination code; algorithmically using combination code and PRD parts to generate a unique id; using unique id to seed random number generator; performing asymmetric key generation algorithm to generate a public key private key pair. When the private key is needed, it can be generated instead of storing it on storage media.

Using RSA algorithm, the value of public:device.publicKey can be used as the password to encrypt content, and the value of private:device.privateKey can be used as the password to decrypt content.

For content that is stored and retrieved by the IOT-Machine, the public and private key pair provides a safe and reliable method for securely storing and retrieving information.

Referring to FIG. 52, IOT-Machine-1 interacts with Non-Volatile Media Storage to store a representation of encrypted content, and, to subsequently retrieve said representation. IOT-Machine-2 can request IOT-Machine-1 to encrypt and store content, and subsequent retrieve and decrypt content. By way of example, IOT-Machine-1 receives request:content.identifier and request:content.body information from IOT-Machine-2, generate the request:content.seal.password using the value of request:content.identifier, set the request: content.seal.cipher, and perform the cipher action to encrypt request:content.body using the value of request:content.seal-.password as the password.

Authentication

A digital certificate from a signing authority may certify that an identifier is bound to a particular public key. The certificate includes an identifier; a public key; and, a digital signature from the signing authority. An embodiment can include additional information in the certificate.

Certificate Management

In one example, IOT-Module machine code actions obtain private key, public key, and issued digital certificate from representation of digital data provided by optical reader. In another embodiment, IOT-Module actions generate the private key and public key pair, generates the certificate signing request, communicate the request to a signing authority, and, receive a digitally signed certificate.

IOT-Module actions are performed to generate a certificate signing request with subject including a representation of the value of IOT-Thing public:deviceId; to send the certificate signing request to a Certificate Authority Device; and, to receive a digitally signed certificate. The digitally signed certificate provides an assertion from the Certificate Authority that the corresponding public key is bound to the subject identifier.

A first IOT-Machine can use a network protocol, such as the network search protocol described in "Internet of Things and Inter-cooperativfe Computational Technologies for Collective Intelligence", Bessis et al, 2013, Springer Hedelberg, N.Y., Dordrecht, London, ISBN 978-3-642-34951-1, to locate a second IOT-Machine such as that of one offering a Certificate Authority Service.

The steps include: generating certificate signing request wherein subject includes a representation of value of public: deviceId, as value of about:device.csr; formatting a request message as value of request:cert.sign, said request including value of about:device.csr; sending value of request:cert.sign; receiving response representative of signed certificate; and, setting value of public:device.{public:deviceId}.certificate to representation of signed certificate wherein {public:deviceId} is the value of IOT-Thing public:deviceId.

Referring again to FIG. 52, a first IOT-Machine can be the signing authority for a second IOT-Machine. Said first IOT-Machine receiving a certificate signing request wherein subject includes a representation of first IOT-Machine public:deviceId; validating the request; digitally signing the certificate; setting public:device.{public: deviceId}.certificate to representation of signed certificate wherein {public:deviceId} is the value of IOT first IOT-Machine public:deviceId.

In this manner, the first IOT-Machine IOT-System can provide Certificate Management Services and be responsive to a request for a copy of an issued certificate for a requested deviceId. IOT-Module actions perform the steps of: receiving a request for a requested deviceId certificate wherein said request includes a request:deviceId; validating the request; setting response:certificate to the value of public: device. {request:deviceId},certificate; formatting the response as response:formatted; and, sending the value of response:formatted.

Directed Content

Content that is directed to an identifier bound to a private-public key pair can be protected by using said public key to encrypt the seal. The IOT-Module action interacts with IOT-Machine providing Certificate Management Service to obtain a representation of issued certificate corresponding to identifier, said certificate having a public key.

IOT-Machine actions include: setting request:content. header.to to the value of identifier; setting request:content. header.from to the value of public:device.id; setting request: content.body to the value of the content; setting request: content.seal.cipher to the name of the cipher action algorithm; and, setting request:content.seal.password to a generated unique id.

IOT-Machine action can include the steps of: performing a hash algorithm on the value of IOT-Thing request:content.body and performing a cipher action to generate a digital signature by digitally signing said hash, and setting IOT-Thing request:content.header.signature to digital signature.

IOT-Module action performs the step of: performing the cipher, given by name as the value of request:content.seal.cipher, to encrypt the value of IOT-Thing request:content.body using the value of request:content.seal.password as the password.

IOT-Module action formats IOT-Thing request:content.seal and its children using XML, as the value of request:content.seal. IOT-Things request:content.seal.cipher, and request:content.seal.password are unset.

IOT-Module action performs a cipher action performing RSA algorithm on value of IOT-Thing request:content.seal using said public key, and base64 encodes the encrypted content, and, sets the value of request:content.seal to the base64 encoded encrypted content.

An embodiment can include steps to enable an administrative IOT-Thing to be representative of the name of seal cipher algorithm used and the value of the password used. In such an embodiment the steps can include: setting value of request:content.admin.password, to value of generated unique id; setting value of request:content.admin.cipher, to the name of the cipher action algorithm; formatting request:content:admin, as an XML inline document, as value of request:content.admin; encrypting value of request:content:admin using administrator public key; unsetting request:content.admin.password; and, unsetting request:content.admin.cipher.

FIG. 53 shows an IOT-Machine with a BlueTooth interface, to receive communicated content, to encrypt said content; and respond with formatted encrypted content. Cell phone application using the BlueTooth interface, communicates formatted encrypted content to IOT-Machine, and in response thereto, receives formatted unencrypted.

IOT-Machine and IOT-System can be configured to be paired to an authenticated device wherein said device communicates an identifier and a corresponding issued certificate, and in response thereto, IOT-Module action registering the identifier and issued certificate. In an embodiment, the IOT-Module action can communicate a request to an authenticated device to authenticate a certificate. This enables certificate revocation lists to be used in managing the certificates.

IOT-Machine and IOT-System can be configured with an application protocol for sending and receiving communications, such as an Email protocol, or an HTTP protocol.

With respect to the IOT-System, the configuration requires the use of the encryption IOT-Module, such as the OpenSSL IOT-Module.

The optical identifier key management system can be embodied as OIKMS IOT-Module and the device can communicate with an IOT-Machine, or be incorporated as a component of an IOT-Machine. Similarly, the OIKMS IOT-Module can be configured for use in an IOT-Machine, and corresponding IOT-Verbs and actions added to the IOT Verb Vocabulary.

Digital data encoded in optical identifier can include identity data authorized by an authorizing identity agent, such as a PKI certificate. Alternatively, a representation of the content cipher algorithm and the content password, are also encrypted using an administrator's public key. An administrator with corresponding private key can interact with encrypted content to request a copy of the encrypted content body, to decrypt the content and to scan content to ensure content complies with organization policies.

Implementations of the embodiments can use a multiplicity of identities. A first identity is the device ID and can have a first public-private key pair. A second identity is derived from a second optical identifier that is in the possession of a user of the device, and the user ID can have a second public-private key pair. This enables the system to use the user ID in subscribing to service provider services, whilst managing the device IDs for devices owned by the user. A media access control address (MAC Address), can be a programmed address, or a burned in address, and is used to identify a network interface controller (NIC). An IP Address is a numeric label assigned to each device in a computer network using Internet Protocol for communication. DNS translates a domain name to an IP Address. Dynamic DNS enables the device to reconnect at a second location and update its corresponding IP address. A single device can have a multiplicity of NICs, a multiplicity of IP addresses, and a multiplicity of domain names associated with the machine.

A device identifier may be associated with a device, independent of the MAC Address, the NIC, the DNS host name, and the IP address. This enables a plurality of devices to self-assembly an active namespace overlay network through which the devices can be identified and communicate securely.

A device may use a representation of digital data encoded in an optical identifier as an identifier in subscribing to a service, thus eliminating the need for the subscriber to assign the DNN listing. Some devices may provide a superset of functionality over and above that of the '508 publication Namespace Management System services.

A device can derive its identity from the digital data encoded in an optical identifier. The IOT-Memory Module provides a set of actions to administer named representations of data, and the relationships between them, as IOT-Things in non-transitory memory, according to the IOT-Class, with the default class being IOT-Thing. An IOT-class is a collection of IOT-Things satisfying membership criterion that specifies exactly what is required for an IOT-Thing to be a member of the IOT-Class at a given moment in time.

A subscriber registers a set of URRs for communicating with the subscriber, thus enabling an IOT-System to select a URR from the set of URRs based on the self-assembled actions of the system.

An IOT-Thing with a representation of a reference to an embodiment that can be performed by a machine is an IOT-Verb and the performance of the embodiment is a machine action referred to as the verb action. This provides backward capability to the requirement of the Namespace Management System's built-in service being loaded as a module within a shared library, whilst simultaneously enabling additional embodiments that may be mechanical, electronic, optical, or stored in non-transitory memory. By way of example but not limitation, a representation of an embodiment can be encoded in the optical identifier.

A multiplicity of IOT-Systems can register services, provide services, discover services, communicate with services, and participate in one or more namespaces.

The above teachings enable the Internet of Me. One view of the Internet of Things is an outward view from the centroid of the Internet, and includes the things that are connected from the centroid to the furthest edge devices. An inward view from an edge device toward the centroid, includes the Internet of Services. The above embodiments can provide an Internet of Me wherein the configurable IOT-System provides identification; authentication; authorization; secure communications; and, administers state information; interacts with service provider services; and, is acting on an entity's behalf. The IOT-System provides an active namespace for the entity's edge devices. Two such IOT-Systems can subscribe to a third IOT-System providing a namespace provider service and send/receive communicated communications between them.

Another aspect is a Namespace Provider IOT-Machine with an IOT-system (NSPI), using Optical Key Management System and an identity provided by an optical identifier, to offer secure and authenticatable services, to manage an IOT-Namespace including a set of IOT-Things, provisioned on behalf of a subscriber. These identities are encoded in an optical identifier as described earlier in this disclosure.

An IOT-Machine with an IOT-System may be responsive to a subscriber request by evaluating said request within an IOT-Context including subscriber directed assembly of non-transitory machine performable IOT-Module embodiments, verb vocabularies, configured tasks, configured services, and inference rules; on a per subscriber basis.

Configured with a multiplicity of application protocols, the NSPI provides a configurable, networkable, communication enabled device, providing secure communication and automation in the Internet of Things.

NSPI administers a multiplicity of verb vocabularies including: a core verb vocabulary; an NSPI verb vocabulary required to perform NSPI IOT-System; a non-subscriber verb vocabulary (NSPI-NS); and, a subscriber verb vocabulary (NSPI-S). A subscriber verb vocabulary can be augmented with additional verbs configured at the subscription request of the subscriber.

NSPI administers a multiplicity of IOT-Namespaces including: an anonymous IOT-Namespace; a public IOT-Namespace; a private IOT-Namespace; and, a subscriber IOT-Namespace.

In response to receiving a representation of a request to subscribe to NSPI, the machine code actions performs the steps of: parsing said representation into a request IOT-Namespace; validating the request; provisioning an IOT-Listing representative of the requestor; issuing a credential providing authorization and identity; and, providing a response including a representation of the provisioned IOT-Listing as the subscriber, and issued credential.

In response to receiving a representation of a request from a subscriber, the NSPI machine code actions performs the steps of: parsing said representation into a request IOT-Namespace; setting an IOT-Context; evaluating inference rules to infer an IOT-Statement to perform and the IOT-Context in which to perform said IOT-Statement; performing said IOT-Statement; resetting the IOT-Context; performing a format action to format the response IOT-Namespace; and, sending response.

A multiplicity of IOT-Systems can register services, provide services, discover services, communicate with services, and participate in or more dynamic network namespaces.

Function of the Nspi

The IOT-System performs a Bootstrap IOT-module action including the steps of: configuring the core verb vocabulary and corresponding IOT-Module actions; using optically read digital data to set the device identifier and device key; configuring an application domain verb vocabulary and corresponding IOT-Module actions; and, initializing IOT-Things in non-volatile memory required as a prior knowledge necessary to offer services.

Referring to FIG. 25, Core Verb Vocabulary is used in the bootstrap to boot the IOT-Machine (BOOT-State.0), and configure the NSPI Verb Vocabulary (BOOT-State.1). NSPI administers a multiplicity of Verb Vocabularies including a subscriber verb vocabulary (NSPI-S BOOT-State.2) and a non-subscriber verb vocabulary (NSPI-NS BOOT-State.2).

NSPI is configured to use the NSPI Verb Vocabulary to provide a request-response service action in BOOT-State.3 including the steps of: receiving a representation of a request; parsing said representation into a request IOT-Namespace as an IOT-Statement; evaluating IOT-Statement to set the IOT-Context; performing said IOT-Statement; performing a format action to format the response IOT-Namespace; resetting the IOT-Context; and, sending response.

The step of evaluating the request includes the step of evaluating inference rules to infer an IOT-Context and an IOT-Statement to perform using said IOT-Context. A validated subscriber request is evaluated in the context of the subscriber verb vocabulary viewed over the NSPI-S verb vocabulary. Otherwise, the request is evaluated in the context of the NSPI-NS verb vocabulary.

In response to receiving an NSPI subscription request including an identifier and a certificate signing request, the IOT-Machine action includes the steps of: validating the request satisfies the requirements for being a member subscriber; setting an IOT-Listing representative of said identifier; and, generating a response including a digital certificate including an identifier representative of said IOT-Listing. In the preferred embodiment, requirements for being a member include the request having a representation of a certificate signing request, and, the digital certificate is an X509 certificate generated by the NSPI. The step of setting an IOT-Listing includes setting subscriber: {identifier}.profile where {identifier} is a representation of the identifier. The embodiment can extend the profile to include a set of IOT-Things representative of the identifier. For example, a capability IOT-Thing representative of the IOT-Verbs the subscriber is given the capability to request; a certificate IOT-Thing representative of the generated digital certificate; and, a namespace IOT-Thing representative of a set of namespaces the subscriber has access to. An embodiment can add additional IOT-Things to extend the profile.

A first NSPI subscriber can offer a service to a second NSPI subscriber. The second NSPI subscriber must subscribe to the first NSPI subscriber service offering. In response to receiving a request to subscribe to the first NSPI subscriber service offering, the IOT-Machine action includes the steps of: validating the request satisfies the requirements for being a member subscriber of said service offering; and, setting a capability IOT-Thing granting the second NSPI subscriber's identifier authority to request said service. Referring to FIG. 56, the embodiment can add a URR capability IOT-Thing granting the second NSPI subscriber's identifier authority to request said URR.

Exemplary application domain subscriber verbs and actions are listed in FIG. 26, while non-subscriber verbs and actions are listed in FIG. 27. Actions are embodied as IOT-Modules configured in the IOT-System. Exemplary inference rules are listed in FIG. 28.

The embodiment uses a multiplicity of IOT-Namespaces. Each time a request is received, the machine actions set an IOT-Context to include only those IOT-Namespaces pertinent to satisfying the request.

The embodiment enables a first verb vocabulary for unauthenticated requests, such as an initial subscribe request to subscribe to the NSPI.

A subscriber can request the NSPI to provision an IOT-Namespace on behalf of the subscriber. A subsequent request from said subscriber would be evaluated in an IOT-Context with a Verb Vocabulary including the configure verb to permit the subscriber to configure the IOT-Namespace.

Additionally, a subscriber can request the NSPI to provision an IOT-Namespace, and may further request said IOT-Namespace to have private or public scope. A private IOT-Namespace has scope, meaning included in the IOT-Context, only for said subscriber's requests. A public IOT-Namespace has scope, meaning included in the IOT-Context, for any subscribers request. An embodiment can use IOT-Viewpathing when a subscriber requests a provisioned IOT-Namespace that already exists. In this context, the subscriber request can be granted, and the provisioned IOT-Namespace viewed over the currently available public IOT-Namespace.

Referring to FIG. 29, a NSPI-1 provides services from an access point, NSPI-2 provides services at the cloud level (i.e., such as from Amazon Cloud), and, NSPI-3 provides services behind a firewall. NSPI-3 can subscribe to NSPI-2.

Devices with optical identifier sim cards can connect to a communication network, and said devices can self-assemble an active namespace through which the devices can be identified, communicate, and have state information retained.

A user interacting with such a device can subscribe to the active namespace and identify themselves using optical identifiers in their possession. The active namespace can administer a profile of the user, apply rules specific to the user, and otherwise be responsive to a said user request. Using such an implementation, a first user of the Amazon Echo would be able to identify themselves and have a unique interaction from a second user.

Application Example: Wireless Device Enabled Locking System Using Public/Private Keys U.S. Pat. No. 9,077,716 B2 teaches that the system uses an algorithm for random number generation, e.g., a Public Key; and that the Public key, along with an encryption algorithm, is used to generate the Encryption Key. The specification teaches that both the Security Server and the ISS Lock must always use the same algorithm to generate a Public Key from which an Encryption Key can be derived. Failure to use the same algorithm, and hence the same starting Public Key, would render the encrypted data unreadable by the ISS Lock. This disadvantage to the invention described in that patent is the reliance on a single starting key and algorithm for every encrypted communication to the lock, and communicating the Public Key and Encryption Key from the Security Server to the mobile device. Furthermore, the Security Server providing authentication for a user to interact with the lock does not convey that authorization to the lock. Instead, it conveys that authorization to the user mobile device. Furthermore, the Security Server providing authentication for a user to interact with the lock cannot limit the type of authorization, such as the authority to open a lock, but not to leave the lock in an unlocked position.

To address these limitations, the Security Server further embodies registration of a representation of a public key, such as an SSH public key, corresponding to a lock identifier, and ISS lock is further embodied with a representation of the corresponding private key.

Mobile device communicates authentication request to Security Server, said request further including a representation of a command intended for the lock identified by the lock identifier.

Upon authenticating the request, the Security Server interacts with encryption engine and a representation of mobile device identifier as a key, to encrypt representation of authorized command intended for lock identified by lock identifier as first key block data.

The Security Server uses cipher service and a representation of the public key registered for lock with specified lock id, to encrypt a representation of mobile device identifier as second key block data.

The Security Server then sends the Public Key, the Encryption Key and the Authentication Content to the application.

The mobile device communicates a message intended for the ISS lock. The message includes a representation of the first key block data, the second key block data, and the mobile device identifier.

In response to receiving the message, the ISS lock uses private key corresponding to public key of lock identifier, to decrypt the second key block data, and compares the response data to the mobile device identifier, and if satisfied, a representation of mobile device identifier is used with cipher service to decrypt first key block data, and compares the response data to the list of available commands, and performs said command.

In an embodiment, the ISS Lock is further having an IOT-System with IOT-Modules, and in response to receiving a communication, the IOT-System registers a representation of the first key block data as a first IOT-Thing, a representation of the second key block data as a second IOT-Thing, and a representation of the mobile device identifier as a third IOT-Thing.

The IOT-System interacts with the OpenSSL IOT-module to perform actions enabling the IOT-System to decrypt the content of the second IOT-Thing using private key, and register the decrypted content as a fourth IOT-Thing. The IOT-System asserts that the third IOT-Thing and the fourth IOT-Thing are equivalent, and upon success, the IOT-System performs actions to decrypt the first IOT-Thing as a fifth IOT-Thing. The IOT-System then interacts with the fifth IOT-Thing as an IOT-Statement to evaluate and evaluates said statement.

In the embodiment, a multiplicity of IOT-Verbs are configured with actions representative of the desired mechanical actuator embodiments corresponding to the IOT-Verb verb names. By way of example, Lock, Unlock, Open, and Close.

Additional Application Example: Systems, Apparatus, and Methods of a Solar Energy Grid Integrated System with Energy Storage Appliance U.S. Pat. No. 8,463,449 B2 describes systems, apparatus, and methods for selling energy back to a utility power grid. The inventive disclosure seeks to provide more sophisticated: control mechanisms to permit electric utilities and others to effectively monitor and control distributed energy resources, such as storage units capable of storing electricity and reselling it to the grid on command; and, demand side management tasks using aggregated resources to manage localized constraints on the utility grid (e.g., substation, feeder-line, residence, etc.). The disclosure notes that "internet user interface 214 may be a personal computer, a smart phone, or other smart devices capable of internet access".

Internet user interface 214 can be embodied as further including an IOT-System, and an optical reader with an optical identifier. OKIMS IOT-Module actions generate a private and public key pair.

The system performs the steps of: receiving, in response to discharging the energy onto the grid, a representation of a bitcoin; encrypting representation of bitcoin using device key as encrypted data; and, storing encrypted data in non-transitory memory.

The system performs the steps of: receiving, in response to sending a request for available configuration documents, a response communication including information representative of an advertisement describing a configuration document to upgrade the system, a purchase price, and information describing cost savings; algorithmically calculating a Return On Investment (ROI), and algorithmically determining if the Return On Investment meets a predefined threshold value; receiving a public key; performing a BitCoin IOT-Module action to send the bitcoin; receiving the configuration document; and, causing the Perform IOT Module action to perform the configure action.

Additional Application Example: Optical Identifier Authentication System.

This example shows a Namespace Provider IOT-Machine, an Optical Identifier Key Management System, and, Optical Identifiers with Index-Encoded Data.

The use of security holograms as an optical visual device is well known in the start of the art. The paper, Hologram Counterfeiting: Problems and Solutions, Published in Proc. SPIE Vol. 1210, pp. 66-76, Optical Security and Anticounterfeiting Systems, William F. Fagan; Ed. (SPIE Homepage) April 1990, provides a detailed description of means to counterfeit a security hologram.

Anti-counterfeit measures have advanced since 1990, but as these measures become more complex, it can be harder for a person to remember all the features of an original security hologram. Robert Smith noted in the Keesing Journal of Documents & Identity in 2011, "The danger is that the OVD [Optical Visual Device] itself becomes so complex that it is impossible for an inspector to remember all the features that distinguish the genuine article." Smith also noted that "Many simulations look good enough to pass visual inspection even if they contain inaccuracies that would rapidly be detected upon level two or three inspection."

Additionally, what are often termed "holographic identifier" labels are actually not holograms at all, but simply embossed lenticular image stickers. Where these stickers are difficult to copy, they carry little or no identification data other than a quantitative image that changes with perspective, and thus no quantified digital data.

Specifically this example applies to authenticating an item by associating a manufactured optical identifier with embedded digital data to the item including the steps: using a device with an optical reader to interrogate optical identifier to generate a representation of digital identifier from digital data; setting IOT-Thing information representative of said representation with a network accessible system; and, subsequently using a device with an optical reader to interrogate optical identifier to generate a representation of digital identifier from digital data; and getting IOT-Thing information representative of said representation from a network accessible system.

Incorporating optical identifiers into the manufacturing process enables supply chain tracking as well as proof of authenticity. Incorporating optical identifiers into production of a limited series, such as a limited edition work of art, enables authentication of the work of art at a later date.

A first machine is configured to interact with optical identifier system to generate a corresponding digital identifier (DID); and, communicate a statement declaring something about the DID.

An optical identifier system, coupled with a bar code scanner, enables a second machine to scan both the Global Trade Item Number (GTIN) and the optical identifier so that a statement can declare something about both items, such as the statement: Declare that there is a GTIN "323900014398" such that there is a DID "A03F92163C31856B352DE". The statement declares that, the GTIN given as "323900014398" has associated therewith a DID given as "A03F92163C31856B352DE". Thus, the DID can be used as a unique serial number for the given UPC.

Labels can be manufactured with optical identifiers, and used in the production line, such as with a Zebra G-Series GK Printer to print product barcodes onto the label. The label can be affixed to the product and optically interrogated to add the GTIN and serial number to a data management system.

When a user is at the retail location, the user can interact with a cell phone application to interact with a device to which the cell phone application can communicate, to obtain the DID, to algorithmically generate a request, and communicate the request to the data management system to verify the GTIN and serial number were previously registered. In this respect, the user will know the item is authentic.

A cell phone application uses cell phone operating system APIs to cause the reader device to optically interrogate the optical identifier and generate the DID. The application uses cell phone operating system APIs to send a request to the Data Management System to verify the UPC and DID were previously registered, and receives a response, and uses cell phone operating system APIs to convey a representation of the response to the cell phone user.

The embodiments can also be used with Electronic Product Codes. An Electronic Product Code (EPC) is a universal identifier that gives a unique identity to a specific physical object. Global Trade Item Number (GTIN) by itself does not correspond to an Electronic Product Code (EPC) because a GTIN identifies a class, not an individual trade item. The combination of a GTIN and a unique serial number, however, does correspond to an EPC. This is called a serialized global trade item number (SGTIN).

A Pure Identity EPC URI is the primary representation of an EPC as an Internet Uniform Resource Identifier (URI). The Pure Identity EPC URI is the form that is used to identify a physical object in documents, databases or computer programs, in the same way a URL identifies a website's resource or location.

Referring to FIG. 22, the EPC Tag Data Standard, Version 1.9, Ratified, November 2014, defines the pure identity URI form of the EPC (EPC URI) as illustrated. In an embodiment, the optical identifier can be encoded with digital data representative of an EPC, or a component thereof. This enables an IOT-Module action to interact with a representation of digital data that has been optically read, to represent the EPC in the IOT-System using the satisfaction claim: there is an urn such that there is an epc such that there is a schema such that there is a component) such that there is a component2 can be used. In the embodiment, the identifiers would be replaced by the corresponding values where appropriate.

The satisfaction claim can be part of an IOT-Statement. By prefixing the claim with "Declare that", the IOT-Module action will interact with the Memory manager to set the necessary IOT-Things so that the satisfaction claim will be true. The declare IOT-Verb interacts with IOT-Memory Manager to set the necessary IOT-Things so that the satisfaction claim is true. When prefixing the satisfaction claim with "Assert that", then the IOT-Module action will test the satisfaction claim and set the response to indicate if the claim is true. Additional IOT-Verbs can be added by the embodiment to perform additional actions, such as an action for adding detailed information to the company prefix, the item referenced, or the serial number; an action to look up and report information; and, an action to unset a previously registered IOT-Thing.

Referring to FIG. 23, the SGTIN can be represented in the IOT-System using the satisfaction claim: There is an urn such that there is an epc such that there is a id such that there is a sgtin such that there is a companyPrefix such that there is an itemRefAndIndicator such that there is a SerialNumber.

Although described in terms of the SGTIN, one skilled in the art can apply this to various Electronic Product Codes, such as but not limited to, the Serial Shipping Container Code, or the Global Document Type Identifier.

An Item Namespace Provider IOT-System (I-NSPI) is a network accessible Namespace Provider IOT-Machine with an IOT-system (NSPI).

In response to receiving a subscription request including a first DID, the action includes the steps of validating the request satisfies the requirements for being a member subscriber, provisioning an IOT-Listing representative of said DID; and, generating a response including a digital certificate including an identifier representative of said IOT-Listing. In the preferred embodiment, requirements for being a member include the request having a representation of a certificate signing request. In the preferred embodiment, the digital certificate is an X509 certificate issued by the I-NSPI.

In response to receiving a provision request including a first DID and a company prefix identifier, the action includes the steps of validating the first DID is a subscriber; and, provisioning an IOT-Namespace representative of said company prefix identifier.

In response to receiving a declaration request including a representation of the first DID, a company prefix, and, an item DID, the IOT-Module actions test the assertion of the IOT-Listing representative of the first DID to see if the first DID has authority to make a declaration in company prefix IOT-Namespace, and if satisfied, sets an item DID IOT-Listing in said IOT-Namespace; and, communicates a response indicting if the request is satisfied.

In response to receiving an assertion request including a representation of the first DID, a company prefix, and, an item DID, the IOT-Module actions test to see if the item DID IOT-Listing is set in company prefix IOT-Namespace; and, communicates a response indicting if the item DID IOT-Listing was set.

Secure communication can be provided through the use of optical identifier key management system and device.

In the preferred embodiment, optical reader further includes a 2d optical scanner for reading a GTIN code.

In response to receiving a provision request including a first DID and a GTIN identifier having an indicator, a company prefix, an item reference, and a checksum, the action includes the steps of: validating the first DID is a subscriber; and, provisioning an IOT-Namespace representative of the GTIN company prefix, and setting an IOT-Thing representative of the item reference within said IOT-Namespace.

In response to receiving a declaration request including a first DID, a GTIN identifier having an indicator, a company prefix, an item reference, and a checksum, and, an item DID, the IOT-Module actions test the assertion of the IOT-Listing representative of the first DID to see if the first DID has authority to make a declaration in GTIN company prefix IOT-Namespace, and if satisfied, sets an item DID IOT-Listing in said IOT-Namespace; and, communicates a response indicting if the request is satisfied. If satisfied, the following assertion is true: There is a Company Prefix IOT-Namespace such that there is an Item Reference such that there is an item DID is true.

In response to receiving an assertion request including a GTIN identifier having an indicator, a company prefix, an item reference, and a checksum, and, an item DID, the IOT-Module action test to see if the following assertion is true: There is a Company Prefix IOT-Namespace such that there is an Item Reference such that there is an item DID, and communicates a response indicting the results thereof.

In the embodiment, inference rules can be used to evaluate the type of identifier, such as a GTIN-14, GTIN-12, EAN-8, UCC-12, or other symbology, to provide appropriate declaration or assertion as required by the embodiment.

The I-NSPI can be configured with the BitCoin IOT-Module. An IOT-Module action of the I-NSPI algorithmically generates an asymmetric public and private key pair (the I-NSPI private and public key). An IOT-Module action uses the I-NSPI public key to algorithmically receive bitcoins and the I-NSPI private key to algorithmically transfer a bitcoin.

In response to receiving a digitally signed declaration claim request, the request including a representation of a DID representative of a subscriber (Subscriber-DID), and a DID representative of a thing (Thing-DID), the I-NSPI IOT-Module action validates the request, and sets a set of IOT-Things to satisfy the declaration.

The I-NSPI IOT-Module actions algorithmically uses the Thing-DID to generate an asymmetric public and private key pair. The I-NSPI module actions, using the I-NSPI private key and Thing DID public key, algorithmically records in a bitcoin blockchain information representative of the declaration, such as the Thing-DID and the Subscriber-DID.

In response to receiving a digitally signed update request, the request including a representation of a DID representative of a first subscriber, a DID representative of a thing (Thing-DID), and information to update (such as a location, a subscriber owner), the I-NSPI IOT-Module action validates the request, and sets a set of IOT-Things to satisfy the request.

The I-NSPI module actions, using the Thing DID private key private key and Thing DID public key, algorithmically records in a bitcoin blockchain information representative of the update request.

In response to receiving a digitally signed transfer request, the request including a representation of a DID representative of a first subscriber (Subscriber-DID), and a DID representative of a thing (Thing-DID), and a public key representative of new owner (NewOwner key), the I-NSPI IOT-Module action validates the request, and sets a set of IOT-Things to satisfy the request.

The I-NSPI module actions, using the Thing DID private key, and the NewOwner key, to record the ownership transfer information in the blockchain.

Figure 78:
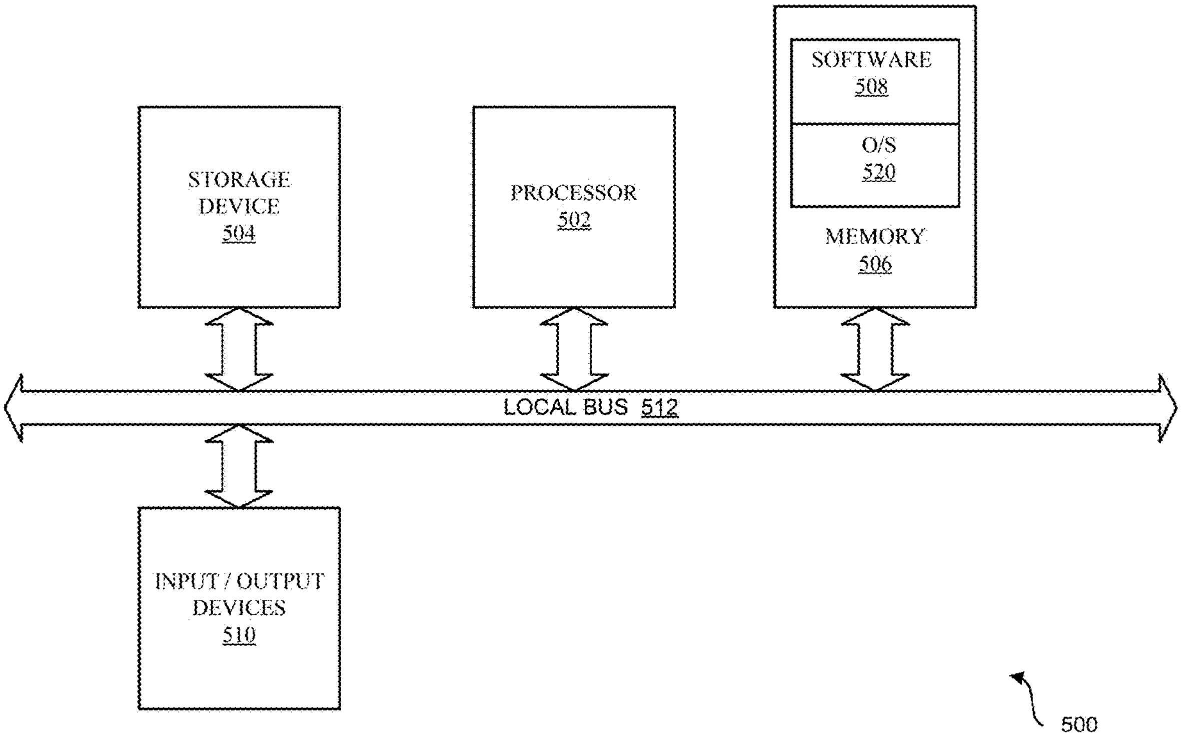
FIG. 78 is a schematic diagram illustrating an example of a system for executing functionality of the present invention.

As previously mentioned, the present system for executing the functionality described in detail above may be a computer, an example of which is shown in the schematic diagram of FIG. 78. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A system for securing a resource content, comprising a processor and a non-volatile memory containing instructions that, when executed by the processor provide:

a combination code generator (GCC) configured to perform the steps of:

receiving from an optical identifier a first input sequence and a first panel context;

generating a first computed combination code;

receiving from an optical identifier a second input sequence and a second panel context; and generating a second computed combination code;

a set panels module (SC) configured to perform the steps of:
receiving the first computed combination code and the first panel context; and
re-ordering the panels of the first panel context to set the second panel context; and
a hash key generator (HKG), configured to perform the steps of:
receiving the second panel context and the second combination code; and
converting the second combination code and the second panel context into a first hash key.

2. The system of claim 1, further configured to provide a cipher configured to perform the steps of:
receiving the first hash key and the resource content; and
encrypting the resource content with the first hash key to produce a ciphered content.

3. The system of claim 2, further configured to provide an asymmetric key generator (AKG) configured to perform the steps of:
receiving the first hash key; and
producing an asymmetric key pair comprising a public key and a private key.

4. The system of claim 3, further configured to provide a distributed ledger technology module (DLT) configured to perform the step of ledgering an entry onto a decentralized ledger comprising a representation of the first hash key and the public key.

5. A computer based method comprising the steps of:
executing a panel data generator (PDG), further comprising the steps of:
receiving from an optical identifier a first input;
converting the first input into an ordinal panel context comprising an ordered character sequence of a predetermined size;
partitioning the ordinal panel context into a plurality of n panels of size m, wherein each panel contains m ordered characters in an order of the panel context; and
assigning a unique panel identifier to each panel of the panel context wherein each panel identifier references the contents of the corresponding assigned panel; and
forming an ordinal panel context comprising a sequence of the unique panel identifiers corresponding to the panel context; and
executing a combination code generator (CCG), further comprising the steps of:
receiving from an optical identifier the panel context;
forming a first combination code comprising a plurality characters comprising one or more panel identifiers.

6. The method of claim 5 wherein the first combination code comprises a subset of the n panel identifiers.

7. The method of claim 6 wherein the first combination code comprises at least one repeated panel identifier.

8. The method of claim 6 wherein the first combination code omits at least one of the n panel identifiers.

9. The method of claim 5, wherein the first input comprises the output of an electromagnetic waveform (EMW) device and/or an encoded data reader (DDR) machine.

10. The method of claim 9, wherein the EMW and/or DDR machine read the first input from a quick response (QR) code.

11. The method of claim 5, wherein the first input comprises the output of a random data source.

12. The method of claim 11, wherein the random data source comprises a noise source.

13. The method of claim 12, wherein the noise source further comprises an environmental noise source.

14. The method of claim 12, wherein the noise source further comprises a video frame.

15. The method of claim 5, further comprising the steps of:
executing a hash key generator (HKG), further comprising the steps of:
receiving a first hash input;
receiving the panel context as a second hash input; and
computing a hash key from the first hash input and the second hash input.

16. The method of claim 15, wherein computing the hash key comprises executing a secure hash algorithm.

17. The method of claim 15, wherein the first hash input comprises the first combination code.

18. The method of claim 17, further comprising executing a cipher comprising the steps of:
receiving the hash key;
receiving a resource content of a resource identified by a resource identifier; and
encrypting the resource content with the hash key to produce a ciphered content.

19. The method of claim 18, wherein the CCG first input comprises the resource identifier.

20. A computer based method for securing a resource content, comprising the steps of;
receiving from an optical identifier a first input sequence and a first panel context as input to a combination code generator (GCC);
generating by the GCC a first computed combination code;
receiving the first computed combination code and the first panel context by a set panels module (SC);
re-ordering the panels of the first panel context by the SC to set a second panel context;
receiving from an optical identifier a second input sequence and the second panel context as input to the GCC;
generating by the GCC a second computed combination code;
receiving the second panel context and the second combination code by a hash key generator (HKG); and
converting by the HKG the second combination code and the second panel context into a first hash key.

21. The method of claim 20, further comprising the steps of:
receiving by a cipher the first hash key and the resource content; and
encrypting the resource content with the first hash key to produce a ciphered content.

22. The method of claim 21, further comprising the steps of:
receiving by an asymmetric key generator (AKG) the first hash key; and
producing, by the AKG, an asymmetric key pair comprising a public key and a private key.

23. The method of claim 22, further comprising the step of ledgering an entry onto a decentralized ledger comprising a representation of the first hash key and the public key.

* * * * *